US010419780B2

(12) United States Patent
Mizuno

(10) Patent No.: US 10,419,780 B2
(45) Date of Patent: Sep. 17, 2019

(54) IMAGE PROCESSING SYSTEM AND IMAGE PROCESSING METHOD

(71) Applicant: MegaChips Corporation, Osaka-shi (JP)

(72) Inventor: Yusuke Mizuno, Osaka (JP)

(73) Assignee: MEGACHIPS CORPORATION, Osaka (JP)

( * ) Notice: Subject to any disclaimer, the term of this patent is extended or adjusted under 35 U.S.C. 154(b) by 407 days.

(21) Appl. No.: 15/376,027

(22) Filed: Dec. 12, 2016

(65) Prior Publication Data

US 2017/0171562 A1  Jun. 15, 2017

(30) Foreign Application Priority Data

Dec. 14, 2015  (JP) .................................. 2015-243220

(51) Int. Cl.
*H04N 19/63* (2014.01)
*H04N 19/124* (2014.01)
(Continued)

(52) U.S. Cl.
CPC ........... *H04N 19/63* (2014.11); *H04N 19/124* (2014.11); *H04N 19/162* (2014.11); *H04N 19/17* (2014.11); *H04N 19/186* (2014.11)

(58) Field of Classification Search
None
See application file for complete search history.

(56) References Cited

U.S. PATENT DOCUMENTS

| 6,775,412 B1 | 8/2004 | Nister et al. |
| 7,792,376 B2 | 9/2010 | Mizuno |

(Continued)

FOREIGN PATENT DOCUMENTS

| JP | 2001-520466 | 10/2001 |
| JP | 2005-165688 | 6/2005 |

(Continued)

OTHER PUBLICATIONS

"T. 800 Information technology—JPEG 2000 image coding system: Core coding system Annex H-Coding of images with regions of interest", International Standard ISO/IEC 15444-1 ITU-T Recommendation, 2002, 209 pgs.

(Continued)

*Primary Examiner* — Bernard Krasnic
(74) *Attorney, Agent, or Firm* — XSensus LLP

(57) ABSTRACT

An ROI in a first image and a second image are synthesized by synthesizing first wavelet coefficient data corresponding to the first image and second wavelet coefficient data corresponding to the second image. An ROI coefficient and a non-ROI coefficient in the first wavelet coefficient data are determined on the basis of a mask for the first wavelet coefficient data, and the ROI coefficient and a wavelet coefficient in the second wavelet coefficient data, which is corresponding to the non-ROI coefficient, are synthesized. When the above coefficient synthesis is performed after a decomposition level of the first wavelet coefficient data is increased, the first wavelet coefficient data is adjusted on the basis of auxiliary wavelet coefficient data corresponding to an auxiliary image which can be equated with the first image before increasing the decomposition level.

19 Claims, 55 Drawing Sheets

(51) Int. Cl.
*H04N 19/162* (2014.01)
*H04N 19/17* (2014.01)
*H04N 19/186* (2014.01)

(56) References Cited

U.S. PATENT DOCUMENTS

| | | |
|---|---|---|
| 8,223,207 B2 | 7/2012 | Baba et al. |
| 2004/0264794 A1 | 12/2004 | Nister et al. |
| 2005/0271290 A1 | 12/2005 | Nister et al. |
| 2014/0307972 A1* | 10/2014 | Mizuno .................. G06T 5/002 |
| | | 382/195 |
| 2017/0013278 A1* | 1/2017 | Mizuno ................ H04N 19/172 |

FOREIGN PATENT DOCUMENTS

| | | |
|---|---|---|
| JP | 2006-93784 | 4/2006 |
| JP | 2006-203409 | 8/2006 |
| JP | 2007-88897 | 4/2007 |
| JP | 2009-199363 | 9/2009 |
| JP | 2013-254291 | 12/2013 |

OTHER PUBLICATIONS

Takeo Ogita, et al., "A study on JPEG2000 Transcoder Based on Automatic ROI Extraction" Proceedings of the 30th Annual Conference of the Institute of Image Electronics Engineers of Japan 2002, Jun. 19, 2002, pp. 115-116 (with two unedited computer generated English language translation).

\* cited by examiner

F I G. 7
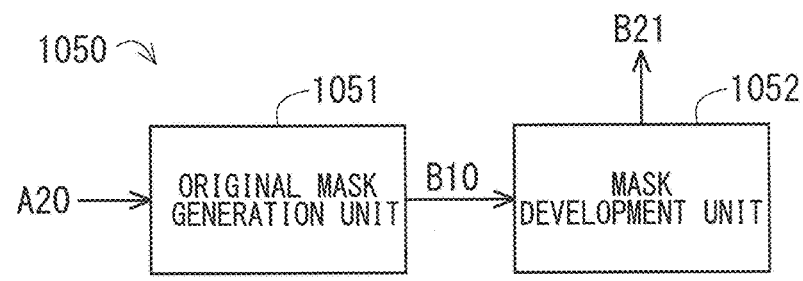
F I G. 8
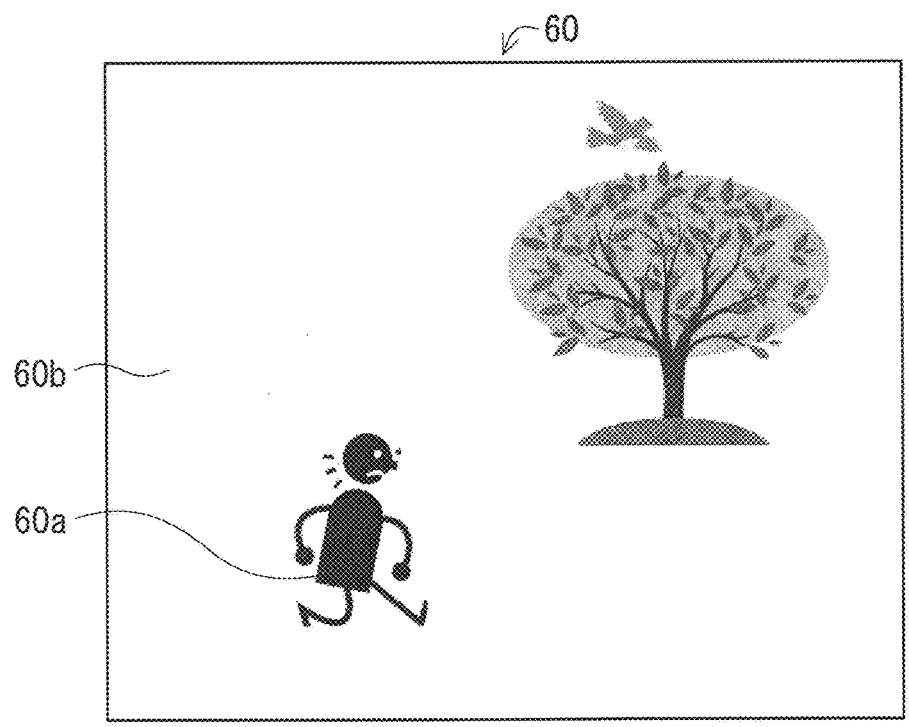

F I G. 1 1
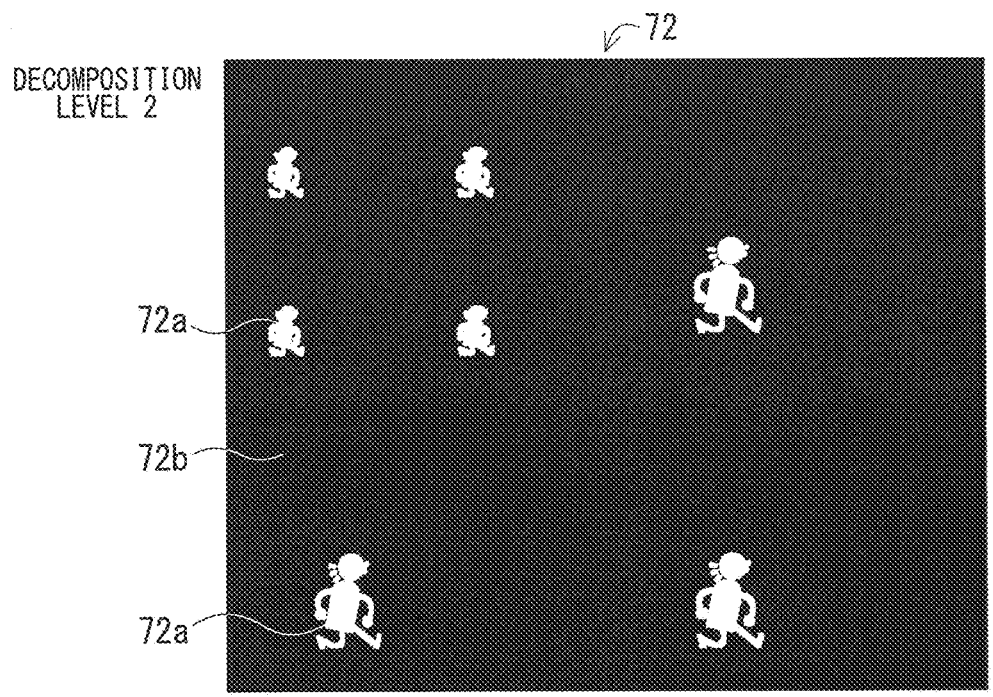
F I G. 1 2
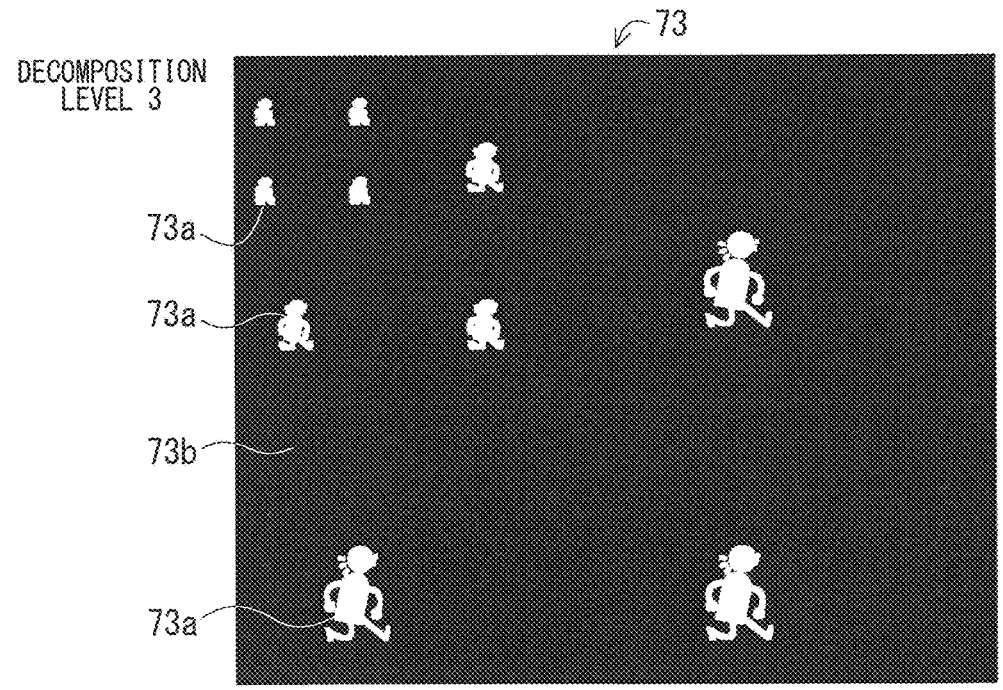

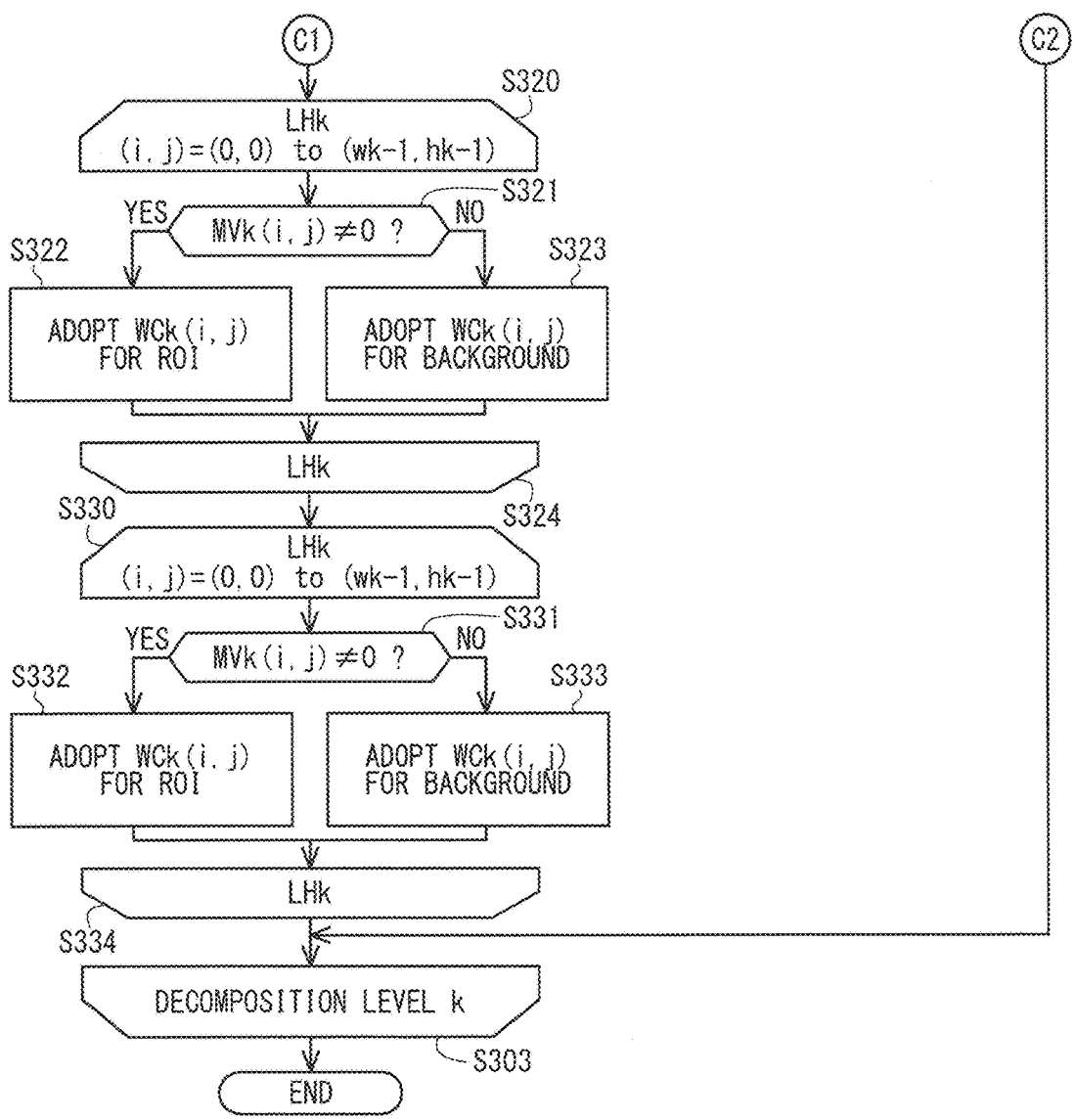

F I G . 2 0
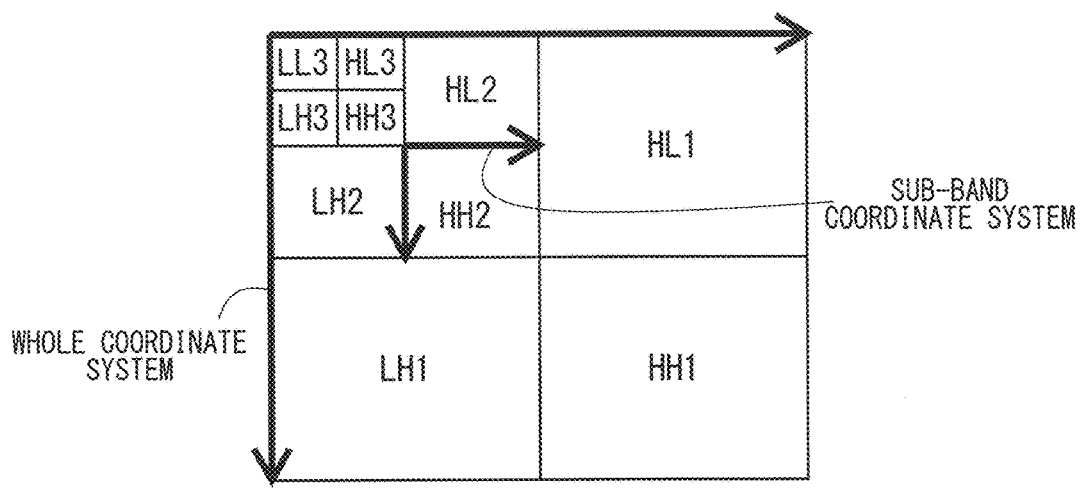

F I G. 2 1
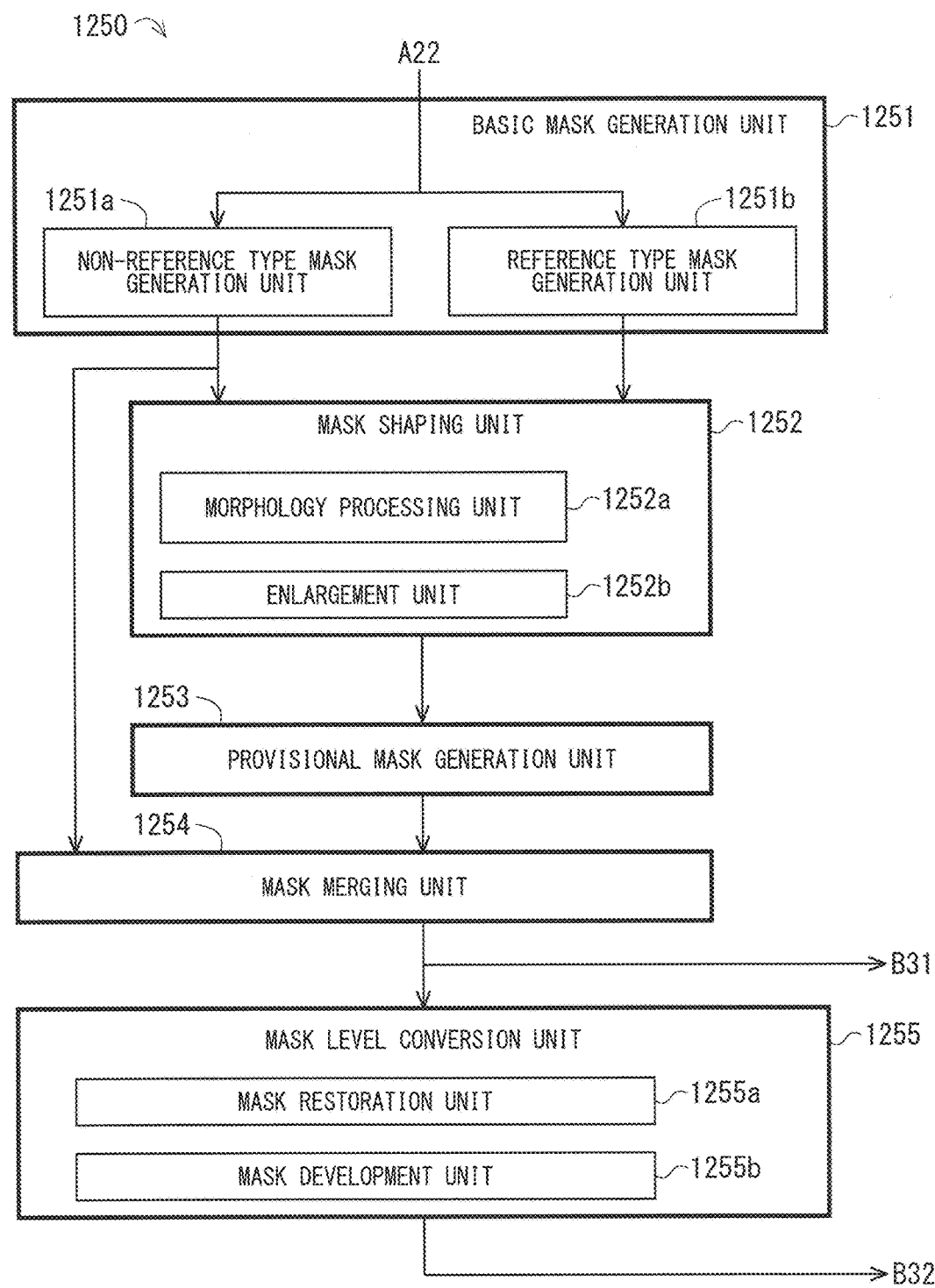

F I G . 2 5
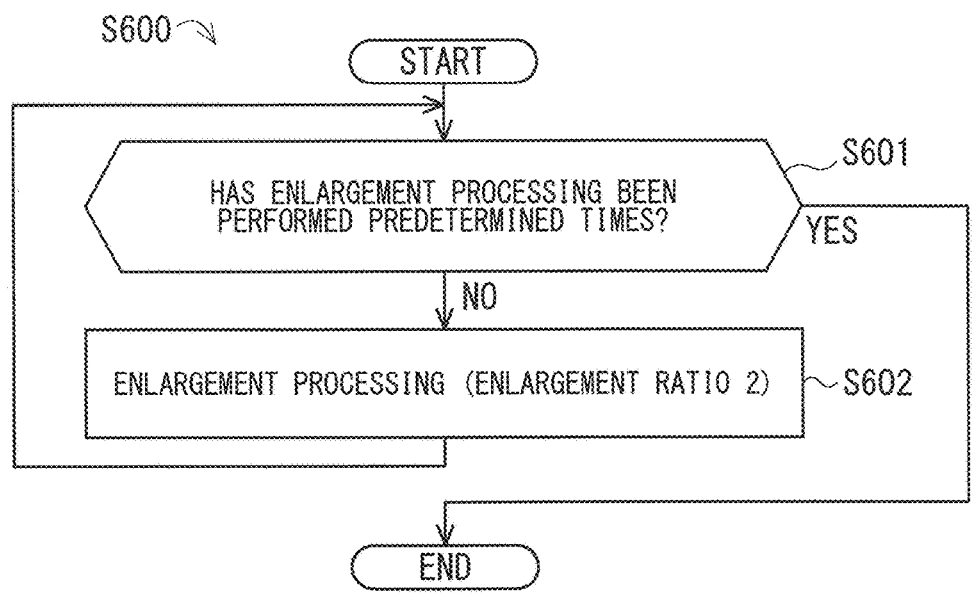
F I G . 2 6
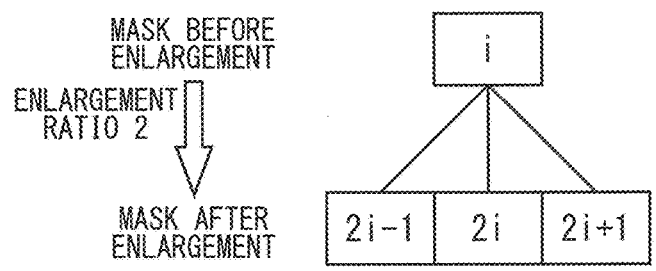

F I G . 3 2
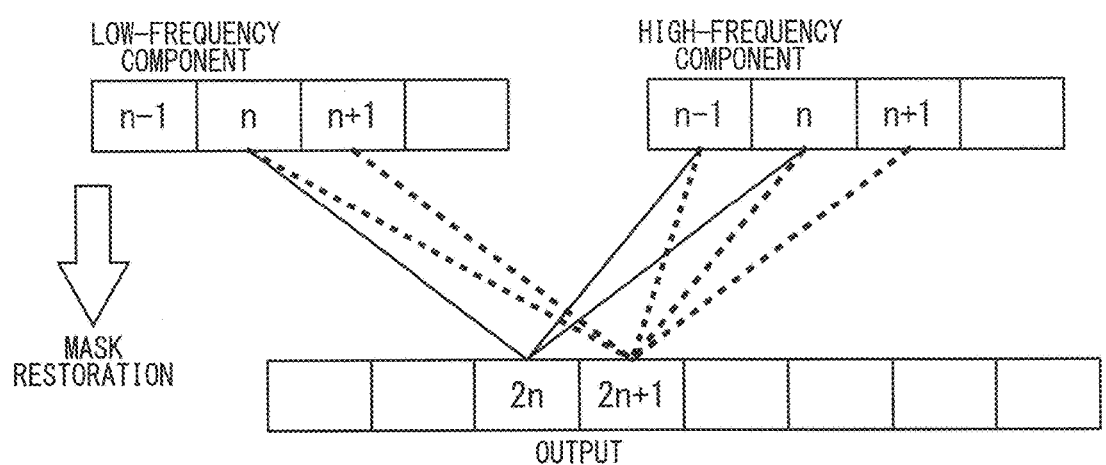

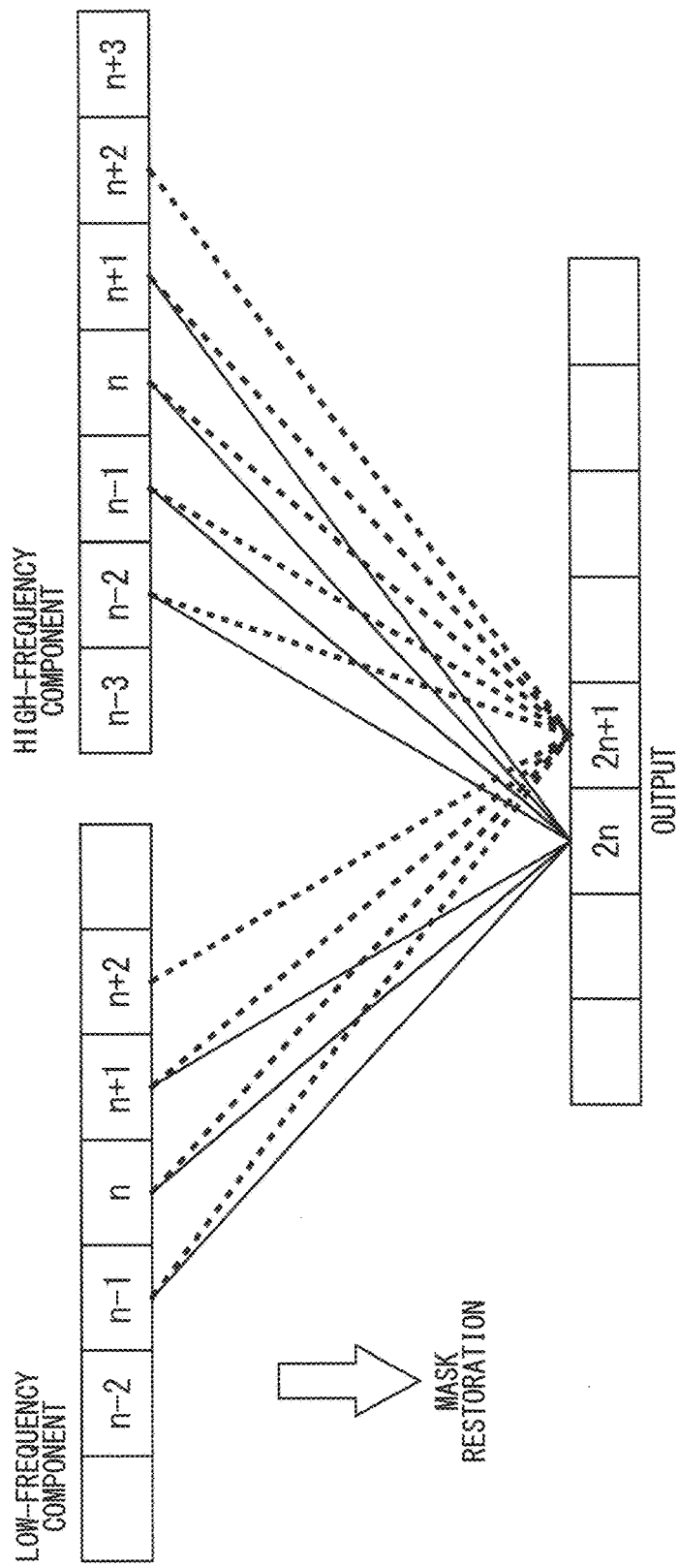

F I G . 3 5
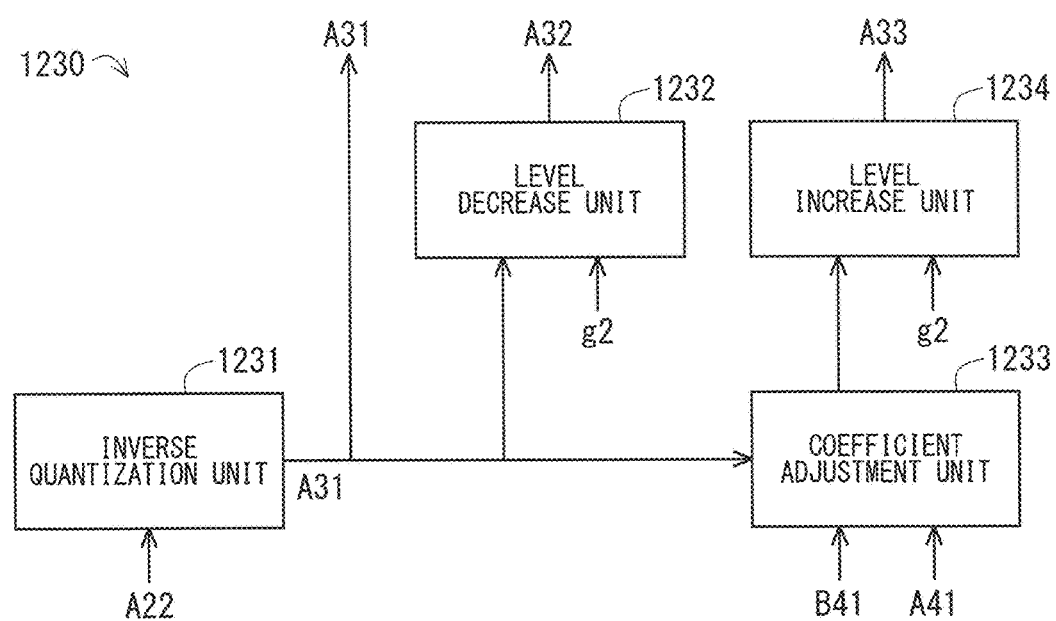

FIRST IMAGE

ORIGINAL MASK FOR FIG. 38

F I G . 4 0
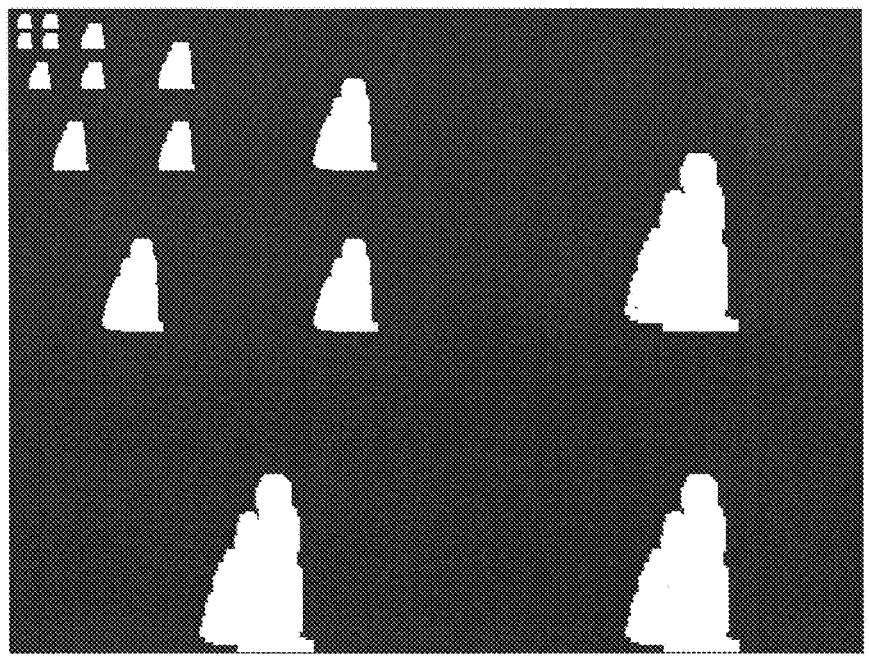
F I G . 4 1

REFERENCE TYPE MASK

DECOMPOSITION LEVEL 2 OF FIG. 42 (MORPHOLOGIZED)

ENLARGE MASK OF FIG. 43 (SHAPED MASK)

DEVELOP MASK OF FIG. 44 TO DECOMPOSITION LEVEL 5 (PROVISIONAL MASK)

F I G. 4 8
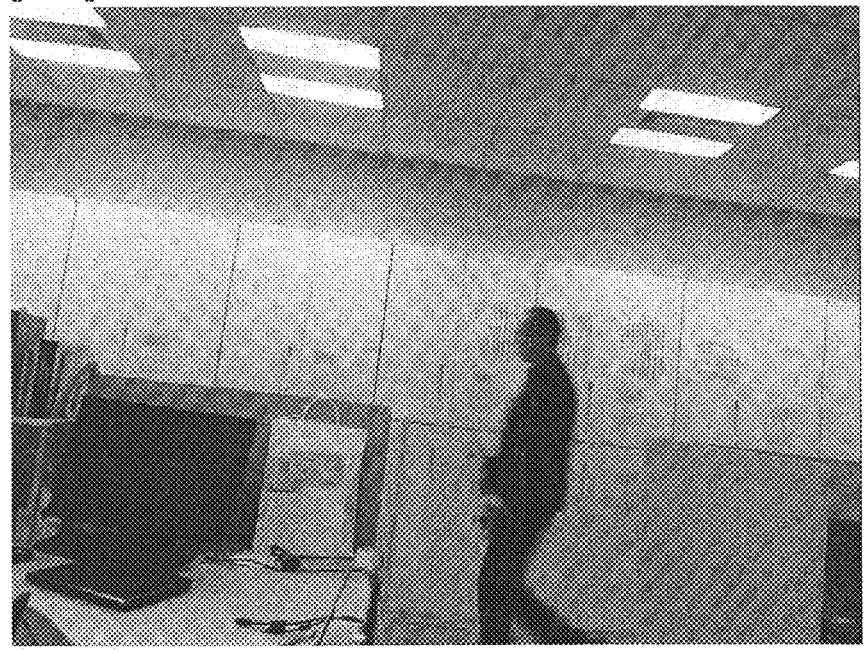
F I G. 4 9
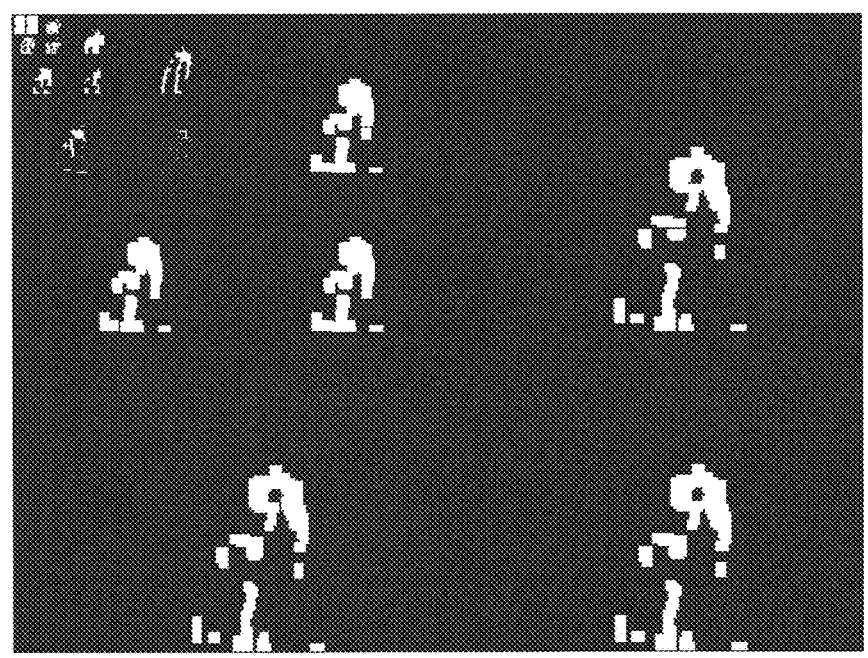

SYNTHESIS USING MASK OF FIG. 49.
g2 = 6, g1 = 5.
SECOND IMAGE IS FULL BLACK.

SYNTHESIS USING MASK OF FIG. 49.
g2 = 6, g1 = 5.

F I G. 5 2
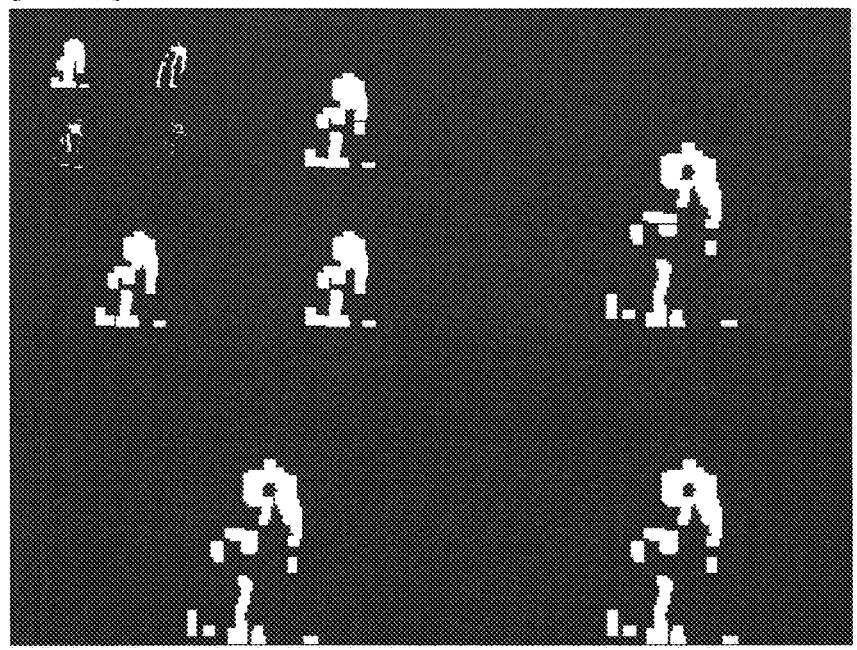
F I G. 5 3

SYNTHESIS USING MASK OF FIG. 52.
g2 = 3, g1 = 5.

RESTORE MASK OF FIG. 46.
g2 = 0, g1 = 5.

SYNTHESIS USING MASK OF FIG. 55.
g2 = 0, g1 = 5.

F I G . 5 8
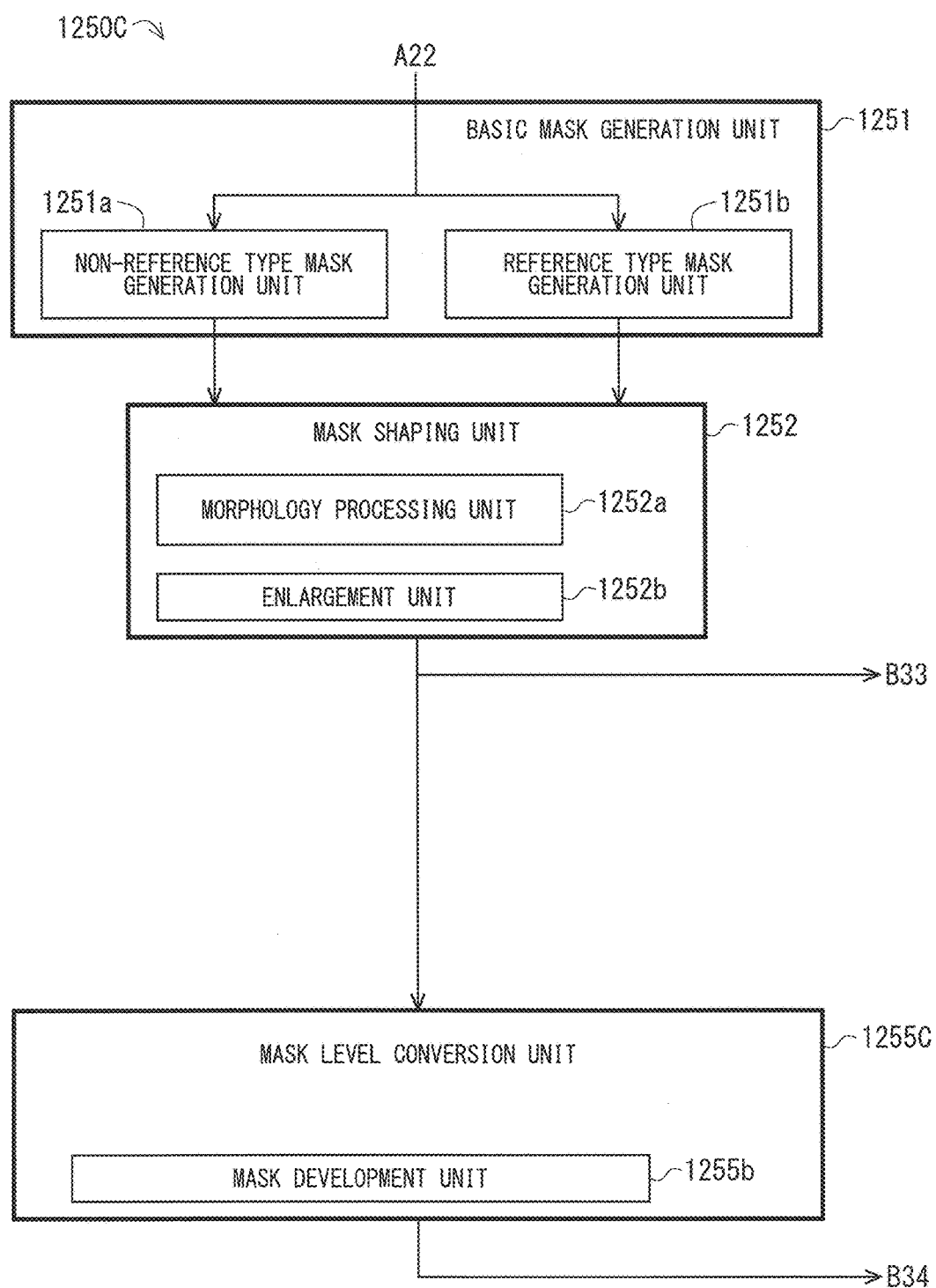

F I G. 6 0
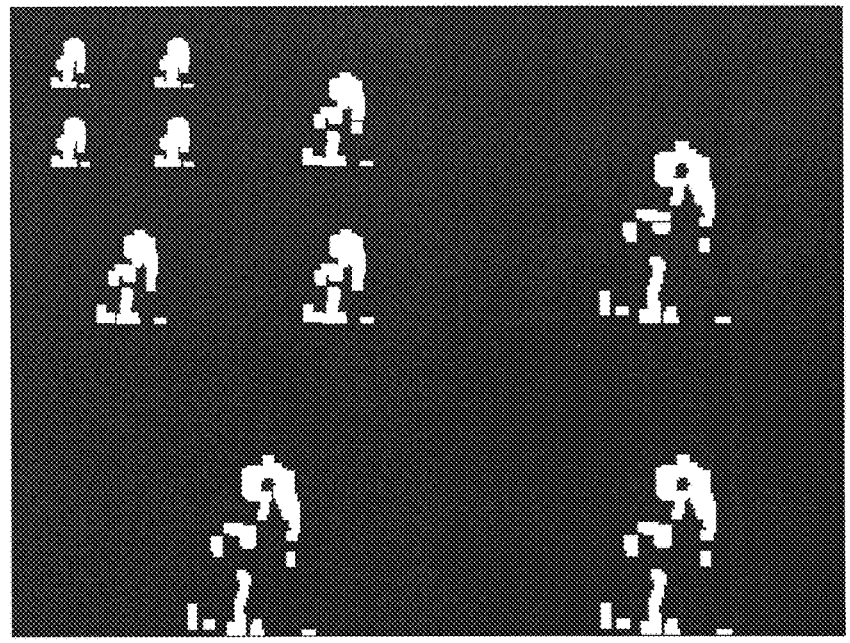
F I G. 6 1
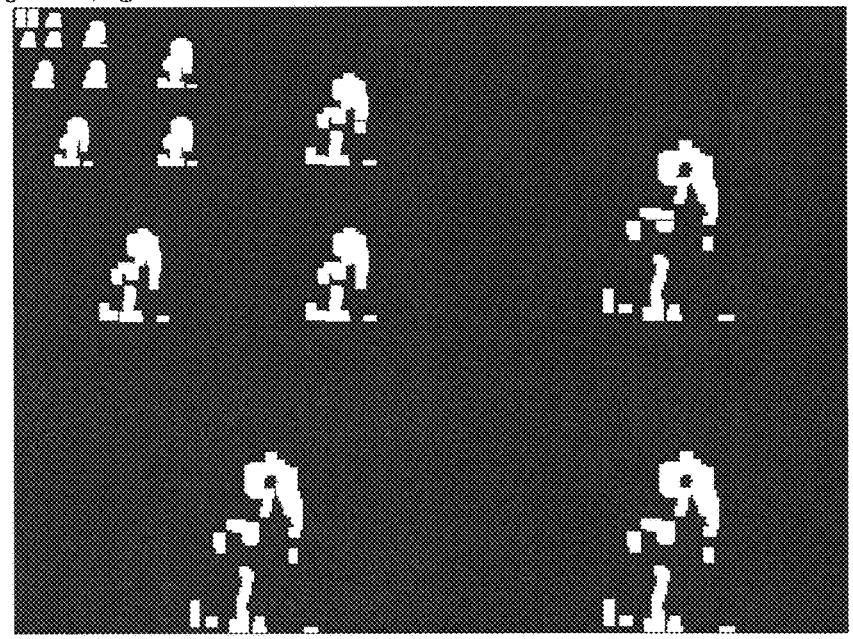

F I G . 6 4
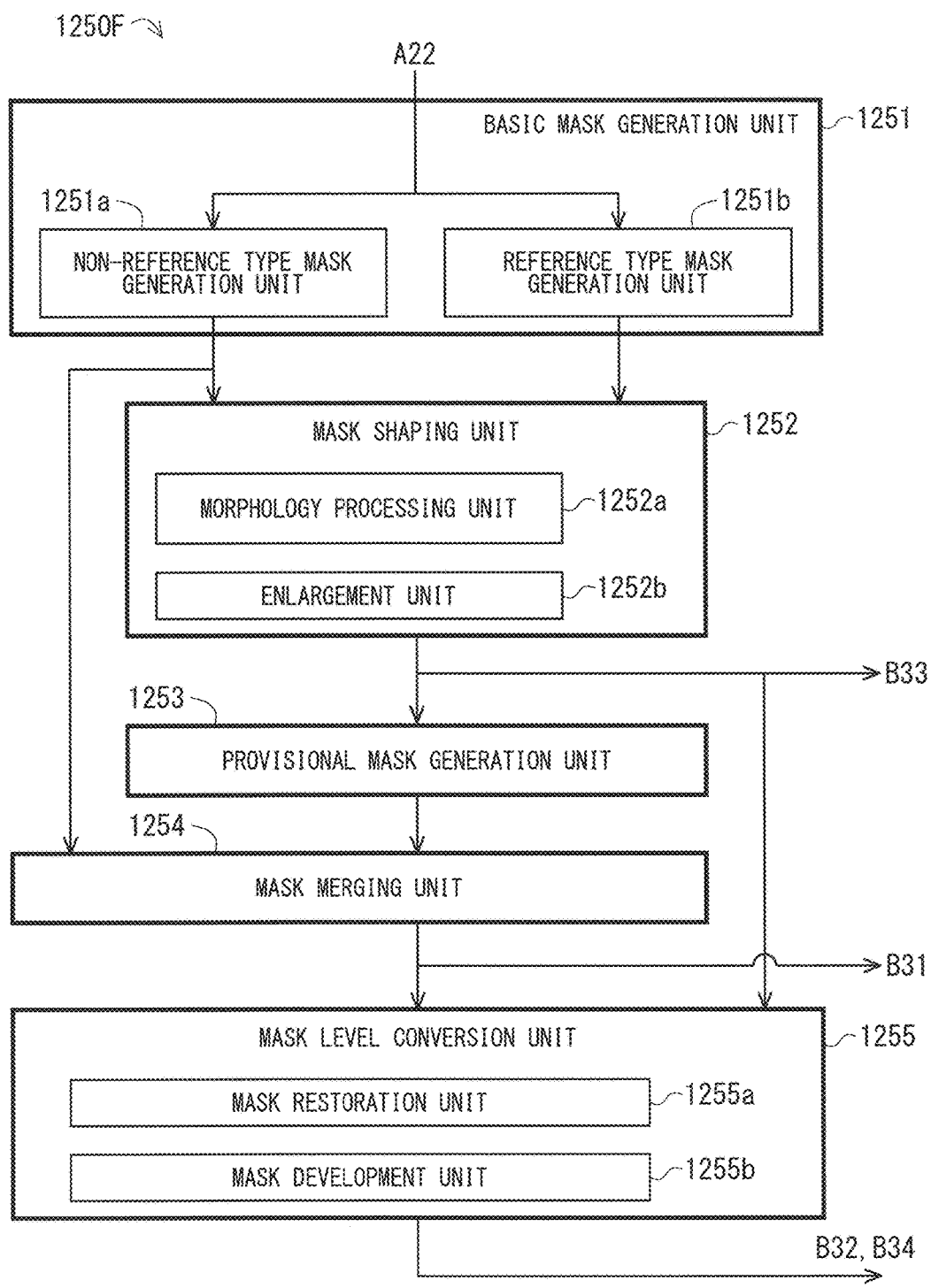

F I G . 6 5
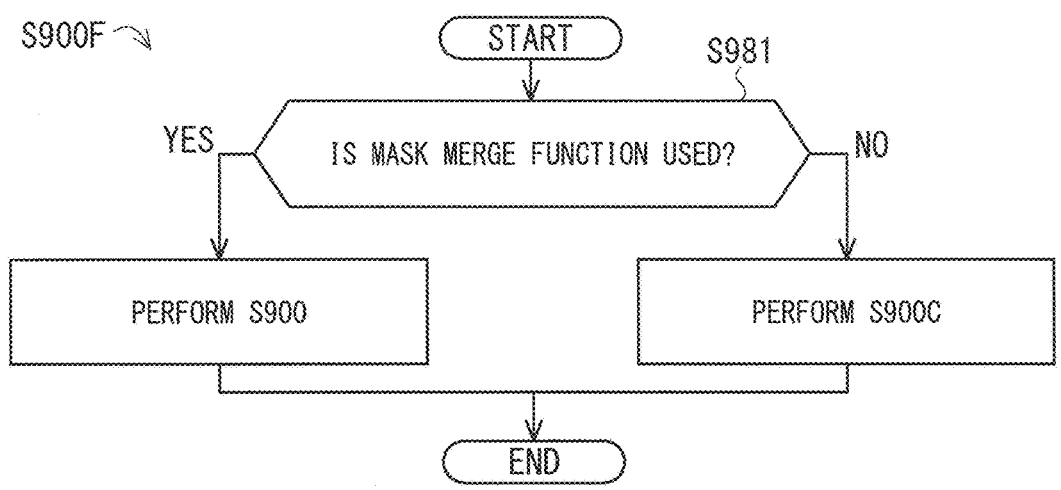

FIG. 66

QUANTIZED WAVELET IMAGE FOR Y

| LL3 | HL3 | HL2 | HL1 |
| LH3 | HH3 | | |
| LH2 | HH2 | |
| LH1 | HH1 |

QUANTIZED WAVELET IMAGE FOR Cb

| LL3 | HL3 | HL2 | HL1 |
| LH3 | HH3 | | |
| LH2 | HH2 | |
| LH1 | HH1 |

QUANTIZED WAVELET IMAGE FOR Cr

| LL3 | HL3 | HL2 | HL1 |
| LH3 | HH3 | | |
| LH2 | HH2 | |
| LH1 | HH1 |

MAKE REFERENCE TO ALL →

REFERENCE TYPE MASK

| LL3 | HL3 | HL2 | HL1 |
| LH3 | HH3 | | |
| LH2 | HH2 | |
| LH1 | HH1 |

RESTORE EXTERNALLY-ACQUIRED MASK TO DECOMPOSITION LEVEL 3.
g2 = 3, g1 = 5.

SYNTHESIS USING MASK OF FIG. 75.
g2 = 3, g1 = 5.

RESTORE EXTERNALLY-ACQUIRED MASK TO DECOMPOSITION LEVEL 0.
g2 = 0, g1 = 5.

SYNTHESIS USING MASK OF FIG. 77.
g2 = 0, g1 = 5.

F I G . 7 9
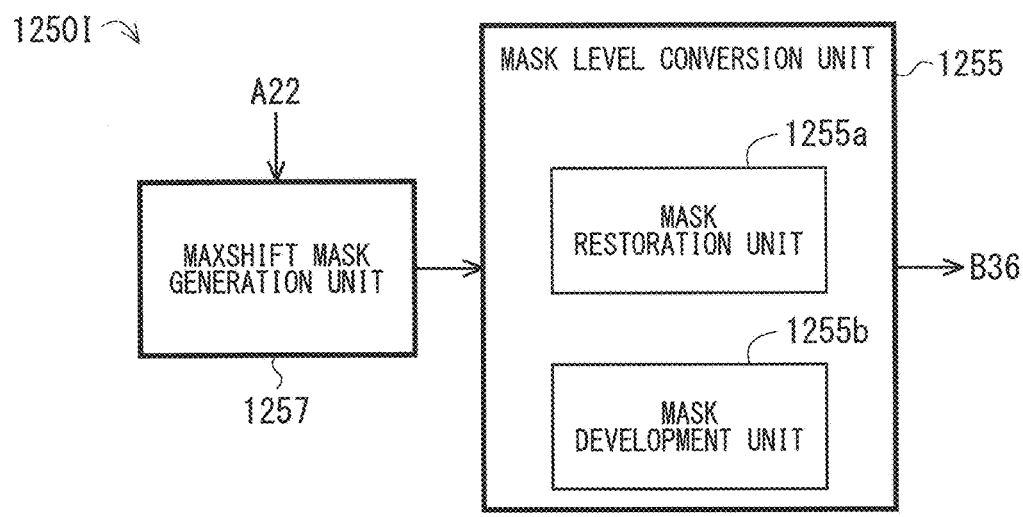

IMAGE PROCESSING SYSTEM AND IMAGE PROCESSING METHOD

BACKGROUND OF THE INVENTION

Field of the Invention

The present invention relates to an image processing system and an image processing method.

Description of the Background Art

In Japanese Patent Application Laid Open Gazette Nos. 2013-254291, 2007-088897, and 2006-093784, disclosed is a technique for detecting a moving body in a moving image. Further, in Japanese Patent Application Laid Open Gazette Nos. 2009-199363 and 2005-165688, disclosed is a technique using a particle filter to track a moving body. By using such a moving body detection technique, the moving body in the image can be cut out as an ROI (Region Of Interest).

Further, another technique is well known where with a still image captured by a digital camera as an object, a foreground image and a background image are separated from the whole image by a graph cut method. By using such an image separation technique, the foreground image can be cut out as an ROI.

A relevant technique is disclosed in "A study on JPEG2000 Transcoder Based on Automatic ROI Extraction", Takeo OGITA and Hiroshi WATANABE, Proceedings of the 30th Annual Conference of the Institute of Image Electronics Engineers of Japan 2002, Jun. 19, 2002, pp. 115-116.

SUMMARY OF THE INVENTION

As described above, various techniques for automatically setting an ROI have been developed. It is thought to be still technically difficult, however, to detect a desired region to be set as an ROI with high accuracy.

For example, it is difficult to correctly determine a contour of an ROI, in other words, a border between an ROI and a non-ROI. For this reason, an ROI is sometimes set to have a portion which locally protrudes from the desired region, or conversely, to have a portion in which the desired region is locally eroded. Further, an ROI is sometimes set to have a defect in the desired region. In other words, though the entire desired region should be originally set as an ROI, it is determined that there is a non-ROI in the desired region, and then the non-ROI forms the defect of the ROI. Even when an insufficient ROI having such a defective portion on the contour thereof and/or in the inside thereof is synthesized with another image, it may be felt that the synthetic image is unnatural.

It is an object of the present invention to provide a technique that makes it possible to generate a synthetic image having a repaired ROI even when an insufficient ROI is used and further to adjust the state of synthesis. It is another object of the present invention to provide its relevant techniques.

The present invention is intended for an image processing system. According to a first aspect of the present invention, the image processing system includes circuitry configured to generate first wavelet coefficient data from quantized wavelet coefficient data for a first image having an ROI (Region Of Interest), generate second wavelet coefficient data from data of a second image to be synthesized with the ROI in the first image, prepare a mask to be used for determining whether each wavelet coefficient included in the first wavelet coefficient data is an ROI coefficient related to the ROI or a non-ROI coefficient related to a non-ROI, generate synthesized coefficient data by determining the ROI coefficient and the non-ROI coefficient in the first wavelet coefficient data on the basis of the mask and synthesizing the ROI coefficient and a wavelet coefficient in the second wavelet coefficient data, which is corresponding to the non-ROI coefficient, and generate synthetic image data by performing inverse wavelet transformation on the synthesized coefficient data until a decomposition level becomes a predetermined end level. It is assumed that the decomposition level of the quantized wavelet coefficient data is g1 and the decomposition level of the first wavelet coefficient data, the second wavelet coefficient data, and the mask which are used in generating the synthesized coefficient data is g2 The circuitry is configured to, when g2=g1, prepare the mask having the decomposition level of g1, generate the first wavelet coefficient data having the decomposition level of g1 by performing inverse quantization on the quantized wavelet coefficient data, and generate the synthetic image data by using the mask having the decomposition level of g1 and the first wavelet coefficient data having the decomposition level of g1, which is generated by inverse quantization, when g2<g1, prepare the mask having the decomposition level of g2, generate the first wavelet coefficient data having the decomposition level of g1 by performing inverse quantization on the quantized wavelet coefficient data, decrease the decomposition level of the first wavelet coefficient data by performing inverse wavelet transformation on the first wavelet coefficient data having the decomposition level of g1 until the decomposition level becomes g2, and generate the synthetic image data by using the mask having the decomposition level of g2 and the first wavelet coefficient data having the decomposition level of g2, which is generated by decreasing the decomposition level, and when g2>g1, prepare the mask having the decomposition level of g2 and the mask having the decomposition level of g1, generate the first wavelet coefficient data having the decomposition level of g1 by performing inverse quantization on the quantized wavelet coefficient data, adjust the first wavelet coefficient data having the decomposition level of g1 by performing a coefficient adjustment process using an auxiliary wavelet coefficient data which is wavelet coefficient data for an auxiliary image which can be equated with the first image and has the decomposition level of g1, increase the decomposition level of the first wavelet coefficient data by performing wavelet transformation on the first wavelet coefficient data adjusted by the coefficient adjustment process until the decomposition level becomes g2, and generate the synthetic image data by using the mask having the decomposition level of g2 and the first wavelet coefficient data having the decomposition level of g2, which is generated by increasing the decomposition level. The coefficient adjustment process is a process of determining the ROI coefficient and the non-ROI coefficient in the first wavelet coefficient data having the decomposition level of g1 on the basis of the mask having the decomposition level of g1 and synthesizing the ROI coefficient and a wavelet coefficient in the auxiliary wavelet coefficient data, which is corresponding to the non-ROI coefficient.

According to a second aspect of the present invention, in the image processing system of the first aspect, the circuitry is configured to perform the coefficient adjustment process only on an LL sub-band of the first wavelet coefficient data having the decomposition level of g1.

According to a third aspect of the present invention, in the image processing system of the first or second aspect, the circuitry is configured to generate a non-reference type mask having the decomposition level of g1 from the quantized wavelet coefficient data in accordance with a non-reference type estimation rule when the non-ROI coefficient is set to 0 in the quantized wavelet coefficient data, generate a reference type mask having the decomposition level of g1 from the quantized wavelet coefficient data in accordance with a reference type estimation rule when the non-ROI coefficient is set to 0 in the quantized wavelet coefficient data, generate a shaped mask having the same mask size as that of the mask and the decomposition level of 0 by performing a shaping process, from a predetermined sub-band mask in the non-reference type mask or the reference type mask, generate a provisional mask having the decomposition level of g1 by developing the shaped mask into a sub-band structure having the decomposition level of g1, generate the mask having the decomposition level of g1 by partially merging the provisional mask and the non-reference type mask in a unit of sub-band, and generate the mask having the decomposition level of g2 from the mask having the decomposition level of g1, which is generated by merging. It is assumed that under a sub-band coordinate system defined for each of a quantized wavelet image provided by the quantized wavelet coefficient data, the non-reference type mask, and the reference type mask, a quantized wavelet coefficient value and a mask value at the coordinates (i,j) in a sub-band of decomposition level k are $QC_k(i,j)$ and $MV_k(i,j)$, respectively. The non-reference type estimation rule includes a rule defining that when $QC_k(i,j)$ is 0, $MV_k(i,j)$ of the non-reference type mask is set as a non-ROI indication value indicating that the value is corresponding to the non-ROI, and when $QC_k(i,j)$ is not 0, $MV_k(i,j)$ of the non-reference type mask is set as an ROI indication value indicating that the value is corresponding to the ROI. The reference type estimation rule includes a first mask value setting rule defining that when a plurality of sub-bands of decomposition level k are present in the quantized wavelet image and at least one $QC_k(i,j)$ is not 0, all the values of $MV_k(i,j)$ of the reference type mask are set as the ROI indication value, and a second mask value setting rule defining that when a plurality of sub-bands of decomposition level k are present in the quantized wavelet image and all the values of $QC_k(i,j)$ are 0, all the values of $MV_k(i,j)$ of the reference type mask are set as the non-ROI indication value.

According to a fourth aspect of the present invention, in the image processing system of the first or second aspect, the circuitry is configured to generate a non-reference type mask having the decomposition level of g1 from the quantized wavelet coefficient data in accordance with a non-reference type estimation rule when the non-ROI coefficient is set to 0 in the quantized wavelet coefficient data, generate a shaped mask having the same mask size as that of the mask and the decomposition level of 0 by performing a shaping process, from a predetermined sub-band mask in the non-reference type mask, generate a provisional mask having the decomposition level of g1 by developing the shaped mask into a sub-band structure having the decomposition level of g1, generate the mask having the decomposition level of g1 by partially merging the provisional mask and the non-reference type mask in a unit of sub-band, and generate the mask having the decomposition level of g2 from the mask having the decomposition level of g1, which is generated by merging. It is assumed that under a sub-band coordinate system defined for each of a quantized wavelet image provided by the quantized wavelet coefficient data, and the non-reference type mask, a quantized wavelet coefficient value and a mask value at the coordinates (i,j) in a sub-band of decomposition level k are $QC_k(i,j)$ and $MV_k(i,j)$, respectively. The non-reference type estimation rule includes a rule defining that when $QC_k(i,j)$ is 0, $MV_k(i,j)$ of the non-reference type mask is set as a non-ROI indication value indicating that the value is corresponding to the non-ROI, and when $QC_k(i,j)$ is not 0, $MV_k(i,j)$ of the non-reference type mask is set as an ROI indication value indicating that the value is corresponding to the ROI.

According to a fifth aspect of the present invention, in the image processing system of the third or fourth aspect, the circuitry is configured to generate the mask having the decomposition level of g1 by adopting the provisional mask for a low decomposition side sub-band of the mask and adopting the non-reference type mask for a high decomposition side sub-band of the mask.

According to a sixth aspect of the present invention, in the image processing system of any one of the third to fifth aspects, the shaping process includes a morphology processing and an enlargement processing.

According to a seventh aspect of the present invention, in the image processing system of the first or second aspect, the circuitry is configured to generate a basic mask having the decomposition level of g1 by determining whether each wavelet coefficient included in the quantized wavelet coefficient data is 0 or not when the non-ROI coefficient is set to 0 in the quantized wavelet coefficient data, generate a shaped mask having the same mask size as that of the mask and the decomposition level of 0 by performing a shaping process, from a predetermined sub-band mask in the basic mask, and generate the mask having the decomposition level of g1 and the mask having the decomposition level of g2 from the shaped mask.

According to an eighth aspect of the present invention, in the image processing system of the seventh aspect, the shaping process includes a morphology processing and an enlargement processing.

According to a ninth aspect of the present invention, in the image processing system of the seventh or eighth aspect, the circuitry is configured to generate a non-reference type mask having the decomposition level of g1 as the basic mask, from the quantized wavelet coefficient data in accordance with a non-reference type estimation rule. It is assumed that under a sub-band coordinate system defined for each of a quantized wavelet image provided by the quantized wavelet coefficient data, and the non-reference type mask, a quantized wavelet coefficient value and a mask value at the coordinates (i,j) in a sub-band of decomposition level k are $QC_k(i,j)$ and $MV_k(i,j)$, respectively. The non-reference type estimation rule includes a rule defining that when $QC_k(i,j)$ is 0, $MV_k(i,j)$ of the non-reference type mask is set as a non-ROI indication value indicating that the value is corresponding to the non-ROI, and when $QC_k(i,j)$ is not 0, $MV_k(i,j)$ of the non-reference type mask is set as an ROI indication value indicating that the value is corresponding to the ROI.

According to a tenth aspect of the present invention, in the image processing system of any one of the seventh to ninth aspects, the circuitry is configured to generate a reference type mask having the decomposition level of g1 as the basic mask, from the quantized wavelet coefficient data in accordance with a reference type estimation rule. It is assumed that under a sub-band coordinate system defined for each of a quantized wavelet image provided by the quantized wavelet coefficient data, and the reference type mask, a quantized wavelet coefficient value and a mask value at the coordinates (i,j) in a sub-band of decomposition level k are $QC_k(i,j)$ and $MV_k(i,j)$, respectively. The reference type estimation rule includes a first mask value setting rule defining that when a plurality of sub-bands of decomposition level k are present in the quantized wavelet image and at least one $QC_k(i,j)$ is not 0, all the values of $MV_k(i,j)$ of the reference type mask are set as an ROI indication value indicating that the value is corresponding to the ROI, and a second mask value setting rule defining that when a plurality of sub-bands of decomposition level k are present in the quantized wavelet image and all the values of $QC_k(i,j)$ are 0, all the values of $MV_k(i,j)$ of the reference type mask are set as a non-ROI indication value indicating that the value is corresponding to the non-ROI.

According to an eleventh aspect of the present invention, in the image processing system of the third or tenth aspect, the reference type estimation rule further includes a third mask value setting rule defining that when only one sub-band of decomposition level k is present in the quantized wavelet image and $QC_k(i,j)$ is not 0, the value of $MV_k(i,j)$ of the reference type mask is set as the ROI indication value, and a fourth mask value setting rule defining that when only one sub-band of decomposition level k is present in the quantized wavelet image and $QC_k(i,j)$ is 0, the value of $MV_k(i,j)$ of the reference type mask is set as the non-ROI indication value.

According to a twelfth aspect of the present invention, in the image processing system of the third or tenth aspect, the quantized wavelet coefficient data includes a plurality of pieces of quantized wavelet coefficient data for a plurality of color space components, the first mask value setting rule is applied when at least one of all the values of $QC_k(i,j)$ is not 0, which are present in a plurality of quantized wavelet images for the plurality of color space components, and the second mask value setting rule is applied when all the values of $QC_k(i,j)$ are 0, which are present in the plurality of quantized wavelet images.

According to a thirteenth aspect of the present invention, in the image processing system of the twelfth aspect, the plurality of color space components are a luminance component and two types of color difference components.

According to a fourteenth aspect of the present invention, in the image processing system of any one of the first to thirteenth aspects, when the mask having the decomposition level of g1 is supplied from the outside of the circuitry, the circuitry is configured to generate the mask having the decomposition level of g2 from the externally-acquired mask.

According to a fifteenth aspect of the present invention, in the image processing system of any one of the first to fourteenth aspects, when the mask having the decomposition level of 0 is supplied from the outside of the circuitry, the circuitry is configured to generate the mask having the decomposition level of g1 and the mask having the decomposition level of g2 from the externally-acquired mask.

According to a sixteenth aspect of the present invention, in the image processing system of any one of the first to fifteenth aspects, when the quantized wavelet coefficient data is in conformity with the Maxshift method, the circuitry is configured to generate the mask having the decomposition level of g1 from the quantized wavelet coefficient data in conformity with the Maxshift method and generate the mask having the decomposition level of g2 from the mask having the decomposition level of g1.

According to a seventeenth aspect of the present invention, the image processing system includes circuitry configured to generate first wavelet coefficient data from quantized wavelet coefficient data for a first image having an ROI (Region Of Interest), generate second wavelet coefficient data from data of a second image to be synthesized with the ROI in the first image, prepare a mask to be used for determining whether each wavelet coefficient included in the first wavelet coefficient data is an ROI coefficient related to the ROI or a non-ROI coefficient related to a non-ROI, generate synthesized coefficient data by determining the ROI coefficient and the non-ROI coefficient in the first wavelet coefficient data on the basis of the mask and synthesizing the ROI coefficient and a wavelet coefficient in the second wavelet coefficient data, which is corresponding to the non-ROI coefficient, and generate synthetic image data by performing inverse wavelet transformation on the synthesized coefficient data until a decomposition level becomes a predetermined end level. It is assumed that the decomposition level of the quantized wavelet coefficient data is g1. The circuitry is configured to generate a non-reference type mask having the decomposition level of g1 from the quantized wavelet coefficient data in accordance with a non-reference type estimation rule when the non-ROI coefficient is set to 0 in the quantized wavelet coefficient data, generate a reference type mask having the decomposition level of g1 from the quantized wavelet coefficient data in accordance with a reference type estimation rule when the non-ROI coefficient is set to 0 in the quantized wavelet coefficient data, generate a shaped mask having the same mask size as that of the mask and the decomposition level of 0 by performing a shaping process, from a predetermined sub-band mask in the non-reference type mask or the reference type mask, generate a provisional mask having the decomposition level of g1 by developing the shaped mask into a sub-band structure having the decomposition level of g1, and generate the mask having the decomposition level of g1 by partially merging the provisional mask and the non-reference type mask in a unit of sub-band. It is assumed that under a sub-band coordinate system defined for each of a quantized wavelet image provided by the quantized wavelet coefficient data, the non-reference type mask, and the reference type mask, a quantized wavelet coefficient value and a mask value at the coordinates (i,j) in a sub-band of decomposition level k are $QC_k(i,j)$ and $MV_k(i,j)$, respectively. The non-reference type estimation rule includes a rule defining that when $QC_k(i,j)$ is 0, $MV_k(i,j)$ of the non-reference type mask is set to a non-ROI indication value indicating that the value is corresponding to the non-ROI, and when $QC_k(i,j)$ is not 0, $MV_k(i,j)$ of the non-reference type mask is set to an ROI indication value indicating that the value is corresponding to the ROI. The reference type estimation rule includes a first mask value setting rule defining that when a plurality of sub-bands of decomposition level k are present in the quantized wavelet image and at least one $QC_k(i,j)$ is not 0, all the values of $MV_k(i,j)$ of the reference type mask are set as the ROI indication value, and a second mask value setting rule defining that when a plurality of sub-bands of decomposition level k are present in the quantized wavelet image and all the values of $QC_k(i,j)$ are 0, all the values of $MV_k(i,j)$ of the reference type mask are set as the non-ROI indication value.

According to an eighteenth aspect of the present invention, the image processing system includes circuitry configured to generate first wavelet coefficient data from quantized wavelet coefficient data for a first image having an ROI (Region Of Interest), generate second wavelet coefficient data from data of a second image to be synthesized with the ROI in the first image, prepare a mask to be used for determining whether each wavelet coefficient included in the first wavelet coefficient data is an ROI coefficient related to the ROI or a non-ROI coefficient related to a non-ROI, generate synthesized coefficient data by determining the ROI coefficient and the non-ROI coefficient in the first wavelet coefficient data on the basis of the mask and synthesizing the ROI coefficient and a wavelet coefficient in the second wavelet coefficient data, which is corresponding to the non-ROI coefficient, and generate synthetic image data by performing inverse wavelet transformation on the synthesized coefficient data until a decomposition level becomes a predetermined end level. It is assumed that the decomposition level of the quantized wavelet coefficient data is g1. The circuitry is configured to generate a non-reference type mask having the decomposition level of g1 from the quantized wavelet coefficient data in accordance with a non-reference type estimation rule when the non-ROI coefficient is set to 0 in the quantized wavelet coefficient data, generate a shaped mask having the same mask size as that of the mask and the decomposition level of 0 by performing a shaping process, from a predetermined sub-band mask in the non-reference type mask, generate a provisional mask having the decomposition level of g1 by developing the shaped mask into a sub-band structure having the decomposition level of g1, generate the mask having the decomposition level of g1 by partially merging the provisional mask and the non-reference type mask in a unit of sub-band, and generate the mask having the decomposition level of g2 from the mask having the decomposition level of g1, which is generated by merging. It is assumed that under a sub-band coordinate system defined for each of a quantized wavelet image provided by the quantized wavelet coefficient data, and the non-reference type mask, a quantized wavelet coefficient value and a mask value at the coordinates (i,j) in a sub-band of decomposition level k are QCk(i,j) and MVk(i,j), respectively. The non-reference type estimation rule includes a rule defining that when QCk(i,j) is 0, MVk(i,j) of the non-reference type mask is set to a non-ROI indication value indicating that the value is corresponding to the non-ROI, and when QCk(i,j) is not 0, MVk(i,j) of the non-reference type mask is set to an ROI indication value indicating that the value is corresponding to the ROI.

According to a nineteenth aspect of the present invention, in the image processing system of the seventeenth or eighteenth aspect, it is assumed that the decomposition level of the first wavelet coefficient data, the second wavelet coefficient data, and the mask which are used in generating the synthesized coefficient data is g2, the circuitry is configured to generate the first wavelet coefficient data having the decomposition level of g2, generate the second wavelet coefficient data having the decomposition level of g2, and generate the mask having the decomposition level of g2 from the mask having the decomposition level of g1, which is generated by merging.

According to a twentieth aspect of the present invention, the image processing system includes circuitry configured to generate first wavelet coefficient data from quantized wavelet coefficient data for a first image having an ROI (Region Of Interest), generate second wavelet coefficient data from data of a second image to be synthesized with the ROI in the first image, prepare a mask to be used for determining whether each wavelet coefficient included in the first wavelet coefficient data is an ROI coefficient related to the ROI or a non-ROI coefficient related to a non-ROI, generate synthesized coefficient data by determining the ROI coefficient and the non-ROI coefficient in the first wavelet coefficient data on the basis of the mask and synthesizing the ROI coefficient and a wavelet coefficient in the second wavelet coefficient data, which is corresponding to the non-ROI coefficient, and generate synthetic image data by performing inverse wavelet transformation on the synthesized coefficient data until a decomposition level becomes a predetermined end level. It is assumed that the decomposition level of the quantized wavelet coefficient data is g1, and the decomposition level of the first wavelet coefficient data, the second wavelet coefficient data, and the mask which are used in generating the synthesized coefficient data is g2. The circuitry is configured to generate a basic mask having the decomposition level of g1 by determining whether each wavelet coefficient included in the quantized wavelet coefficient data is 0 or not when the non-ROI coefficient is set to 0 in the quantized wavelet coefficient data, generate a shaped mask having the same mask size as that of the mask and the decomposition level of 0 by performing a shaping process, from a predetermined sub-band mask in the basic mask, and generate the mask having the decomposition level of g1 and the mask having the decomposition level of g2 from the shaped mask.

The present invention is also intended for an image processing method. According to a twenty-first aspect of the present invention, the image processing method includes generating first wavelet coefficient data from quantized wavelet coefficient data for a first image having an ROI (Region Of Interest), generating second wavelet coefficient data from data of a second image to be synthesized with the ROI in the first image, preparing a mask to be used for determining whether each wavelet coefficient included in the first wavelet coefficient data is an ROI coefficient related to the ROI or a non-ROI coefficient related to a non-ROI, generating synthesized coefficient data by determining the ROI coefficient and the non-ROI coefficient in the first wavelet coefficient data on the basis of the mask and synthesizing the ROI coefficient and a wavelet coefficient in the second wavelet coefficient data, which is corresponding to the non-ROI coefficient, and generating synthetic image data by performing inverse wavelet transformation on the synthesized coefficient data until a decomposition level becomes a predetermined end level. It is assumed that the decomposition level of the quantized wavelet coefficient data is g1, and the decomposition level of the first wavelet coefficient data, the second wavelet coefficient data, and the mask which are used in generating the synthesized coefficient data is g2. The image processing method includes, when g2=g1, preparing the mask having the decomposition level of g1, generating the first wavelet coefficient data having the decomposition level of g1 by performing inverse quantization on the quantized wavelet coefficient data, and generating the synthetic image data by using the mask having the decomposition level of g1 and the first wavelet coefficient data having the decomposition level of g1, which is generated by inverse quantization, when g2<g1, preparing the mask having the decomposition level of g2, generating the first wavelet coefficient data having the decomposition level of g1 by performing inverse quantization on the quantized wavelet coefficient data, decreasing the decomposition level of the first wavelet coefficient data by performing inverse wavelet transformation on the first wavelet coefficient data having the decomposition level of g1 until the decomposition level becomes g2, and generating the synthetic image data by using the mask having the decomposition level of g2 and the first wavelet coefficient data having the decomposition level of g2, which is generated by decreasing the decomposition level, and when g2>g1, preparing the mask having the decomposition level of g2 and the mask having the decomposition level of g1, generating the first wavelet coefficient data having the decomposition level of g1 by performing inverse quantization on the quantized wavelet coefficient data, adjusting the first wavelet coefficient data having the decomposition level of g1 by performing a coefficient adjustment process using an auxiliary wavelet coefficient data which is wavelet coefficient data for an auxiliary image which can be equated with the first image and has the decomposition level of g1, increasing the decomposition level of the first wavelet coefficient data by performing wavelet transformation on the first wavelet coefficient data adjusted by the coefficient adjustment process until the decomposition level becomes g2, and generating the synthetic image data by using the mask having the decomposition level of g2 and the first wavelet coefficient data having the decomposition level of g2, which is generated by increasing the decomposition level. The coefficient adjustment process is a process of determining the ROI coefficient and the non-ROI coefficient in the first wavelet coefficient data having the decomposition level of g1 on the basis of the mask having the decomposition level of g1 and synthesizing the ROI coefficient and a wavelet coefficient in the auxiliary wavelet coefficient data, which is corresponding to the non-ROI coefficient.

According to the present invention, the synthesis between the ROI in the first image and the second image is performed by using the first wavelet coefficient data and the second wavelet coefficient data into which first image data and second image data are converted, respectively. Further, the determination of the ROI in the first image is performed by determining the ROI coefficient in the first wavelet coefficient data. Therefore, even when an insufficient ROI is used, a repaired ROI can be provided in the synthetic image. In other words, an excellent synthetic image can be achieved as compared with the case where the first image data and the second image data are synthesized without any processing performed. Further, by controlling the decomposition level with g2 in the synthesis between the first wavelet coefficient data and the second wavelet coefficient data, it is possible to adjust the state of synthesis (repair of the ROI, extension of the ROI, and the like). Furthermore, since the first wavelet coefficient data is adjusted by performing the coefficient adjustment process before the synthesis with the second wavelet coefficient data, it is possible to increase the image quality of the synthetic image.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a block diagram showing a mask generation unit in accordance with the first preferred embodiment;

FIG. 8 is a view showing an exemplary first image in accordance with the first preferred embodiment;

FIG. 11 is a view showing a developed mask (decomposition level 2) in accordance with the first preferred embodiment;

FIG. 12 is a view showing a developed mask (decomposition level 3) in accordance with the first preferred embodiment;

FIGS. 18 and 19 are flowcharts showing a synthesis execution process in accordance with the first preferred embodiment;

FIG. 20 is a view showing a whole coordinate system and a sub-band coordinate system in accordance with the first preferred embodiment;

FIG. 21 is a block diagram showing a mask preparation unit in accordance with the first preferred embodiment;

FIG. 25 is a flowchart showing a mask enlargement process in accordance with the first preferred embodiment;

FIG. 26 is a diagram showing the mask enlargement process in accordance with the first preferred embodiment (one-dimensionally shown);

FIG. 32 is a diagram showing the mask restoration process in a case where a 5×3 filter is used for the wavelet transformation in accordance with the first preferred embodiment;

FIG. 33 is a diagram showing the mask restoration process in a case where a Daubechies 9×7 filter is used for the wavelet transformation in accordance with the first preferred embodiment;

FIG. 35 is a block diagram showing a first preparation unit in accordance with the first preferred embodiment;

FIG. 40 is a view showing a mask obtained by developing the mask of FIG. 39 to decomposition level 5;

FIG. 41 is a view showing a non-reference type mask for the image of FIG. 38;

FIGS. 47 and 48 are views each showing a synthetic image using the mask of FIG. 46;

FIG. 49 is a view showing a mask obtained by developing the mask of FIG. 46 to decomposition level 6;

FIG. 52 is a view showing a mask obtained by restoring the mask of FIG. 46 to decomposition level 3;

FIGS. 53 and 54 are views each showing a synthetic image using the mask of FIG. 52;

FIG. 58 is a block diagram showing a first example of a mask preparation unit in accordance with a third preferred embodiment;

FIGS. 60 and 61 are views each showing an exemplary mask in accordance with the third preferred embodiment;

FIG. 64 is a block diagram showing a mask preparation unit in accordance with a fourth preferred embodiment;

FIG. 65 is a flowchart showing an operation of the mask preparation unit in accordance with the fourth preferred embodiment;

FIG. 66 is a conceptual diagram showing generation of the reference type mask in accordance with a fifth preferred embodiment;

FIG. 79 is a block diagram showing a mask preparation unit in accordance with a seventh preferred embodiment;

DESCRIPTION OF THE PREFERRED EMBODIMENTS

The First Preferred Embodiment

<Overview of System>

Figure 1:
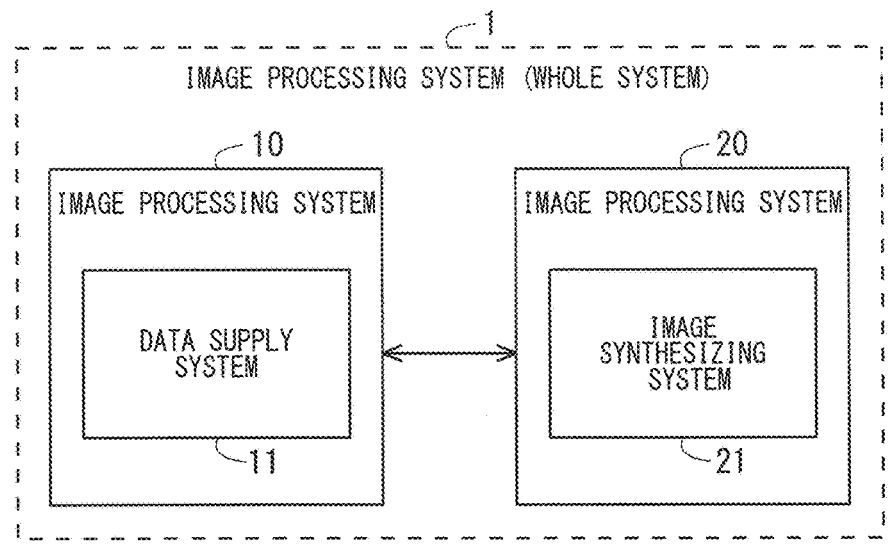
FIG. 1 is a conceptual diagram showing an image processing system in accordance with a first preferred embodiment.

FIG. 1 is a conceptual diagram showing an image processing system 1 in accordance with the first preferred embodiment. As shown in FIG. 1, the image processing system 1 includes two image processing systems 10 and 20. One image processing system 10 includes a data supply system 11, and the other image processing system 20 includes an image synthesizing system 21. The image synthesizing system 21 performs an image synthesis process. The data supply system 11 outputs data to be used in the image synthesis process. Hereinafter, sometimes, the image processing system 1 is referred to as a whole system 1, the data supply system 11 is referred to as a supply system 11, and the image synthesizing system 21 is referred to as a synthesizing system 21.

The image processing system 10 may be constituted of only the supply system 11 or may further include other processing system(s). Similarly, the image processing system 20 may be constituted of only the synthesizing system 21 or may further include other processing system(s). Further, as can be seen from FIG. 1, the supply system 11 is included in the image processing system 10 and also included in the whole system 1. Similarly, the synthesizing system 21 is included in the image processing system 20 and also included in the whole system 1.

The image processing systems 10 and 20 are each provided as a semiconductor integrated circuit. Specifically, various functions and processings of the image processing systems 10 and 20 are implemented by the circuits, in other words, by hardware. Some of or all of the functions and processings, however, may be implemented by a program which causes a microprocessor to function, in other words, by software.

<Example of Whole System 1>

Figure 2:
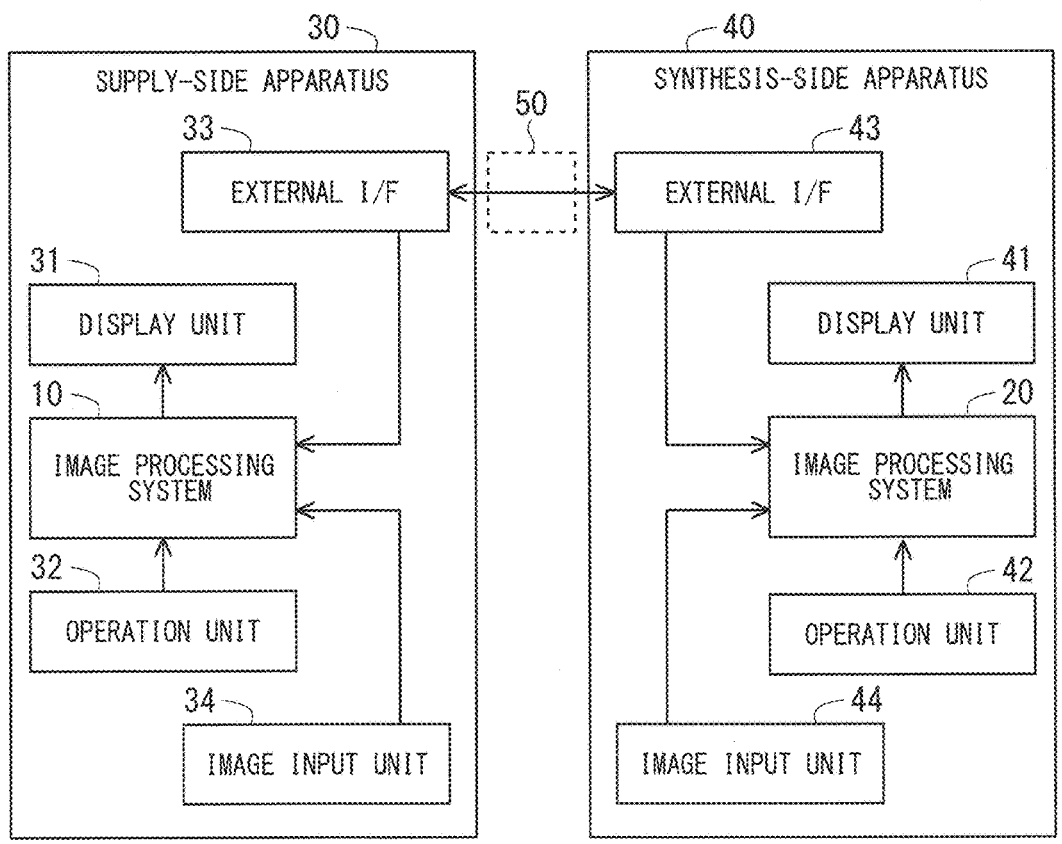
FIG. 2 is a block diagram showing the image processing system in accordance with the first preferred embodiment.

FIG. 2 shows an application example of the whole system 1. In the example of FIG. 2, the image processing system 10 is provided in a data supply-side apparatus 30, and the image processing system 20 is provided in an image synthesis-side apparatus 40. Hereinafter, the data supply-side apparatus 30 is sometimes referred to as a supply-side apparatus 30, and the image synthesis-side apparatus 40 is sometimes referred to as a synthesis-side apparatus 40. Though it is assumed that a user of the supply-side apparatus 30 is different from that of the synthesis-side apparatus 40, this is only one exemplary case.

The supply-side apparatus 30 includes a display unit 31, an operation unit 32, an external interface 33, and an image input unit 34, as well as the image processing system 10. The synthesis-side apparatus 40 includes a display unit 41, an operation unit 42, an external interface 43, and an image input unit 44, as well as the image processing system 20. Hereinafter, the external interfaces 33 and 43 are sometimes referred to as I/Fs 33 and 43.

Though the display units 31 and 41 are formed of, for example, liquid crystal displays, the display units 31 and 41 may be formed of different types of display devices. The operation units 32 and 42 are operating media by which a user inputs instructions, data, and the like to the apparatuses 30 and 40, in other words, to the image processing systems 10 and 20. The operation units 32 and 42 are each constituted of one or some of a keyboard, a mouse, a button, a switch, and the like.

The I/F 33 is a part for performing input/output of signals between the supply-side apparatus 30 and the outside of the apparatus. Similarly, the I/F 43 is a part for performing input/output of signals between the synthesis-side apparatus 40 and the outside of the apparatus. By using the I/Fs 33 and 43, transfer of information (data, instructions, and the like) can be achieved between the supply-side apparatus 30 and the synthesis-side apparatus 40.

Specifically, the I/Fs 33 and 43 include communication interfaces, and communication between the supply-side apparatus 30 and the synthesis-side apparatus 40 can be thereby achieved by using the I/Fs 33 and 43. As the communication method between the supply-side apparatus 30 and the synthesis-side apparatus 40, any one of wired communication, wireless communication, and combination thereof may be adopted. The information transfer between the supply-side apparatus 30 and the synthesis-side apparatus 40 is performed through a medium 50. When such a communication as described above is performed, the medium 50 is a wired or wireless communication medium (in other words, communication channel).

The I/Fs 33 and 43 may each include an interface for external memory medium, as well as or instead of the communication interface. In such a case, the information transfer between the supply-side apparatus 30 and the synthesis-side apparatus 40 can be performed through the external memory medium, and the external memory medium corresponds to the medium 50 which is interposed between the supply-side apparatus 30 and the synthesis-side apparatus 40.

The image input unit 34 is formed of a digital camera. Alternatively, the image input unit 34 may be a memory device which supplies image data. The image input unit 44 also has the same constitution as the image input unit 34. Further, the image input units 34 and 44 may be formed of different types of devices.

The respective constitutions of the supply-side apparatus 30 and the synthesis-side apparatus 40 are not limited to those shown in FIG. 2. Specifically, some of the above-described constituent elements may be omitted or additional constituent element(s) may be provided.

<Example of Supply System 11>

Figure 3:
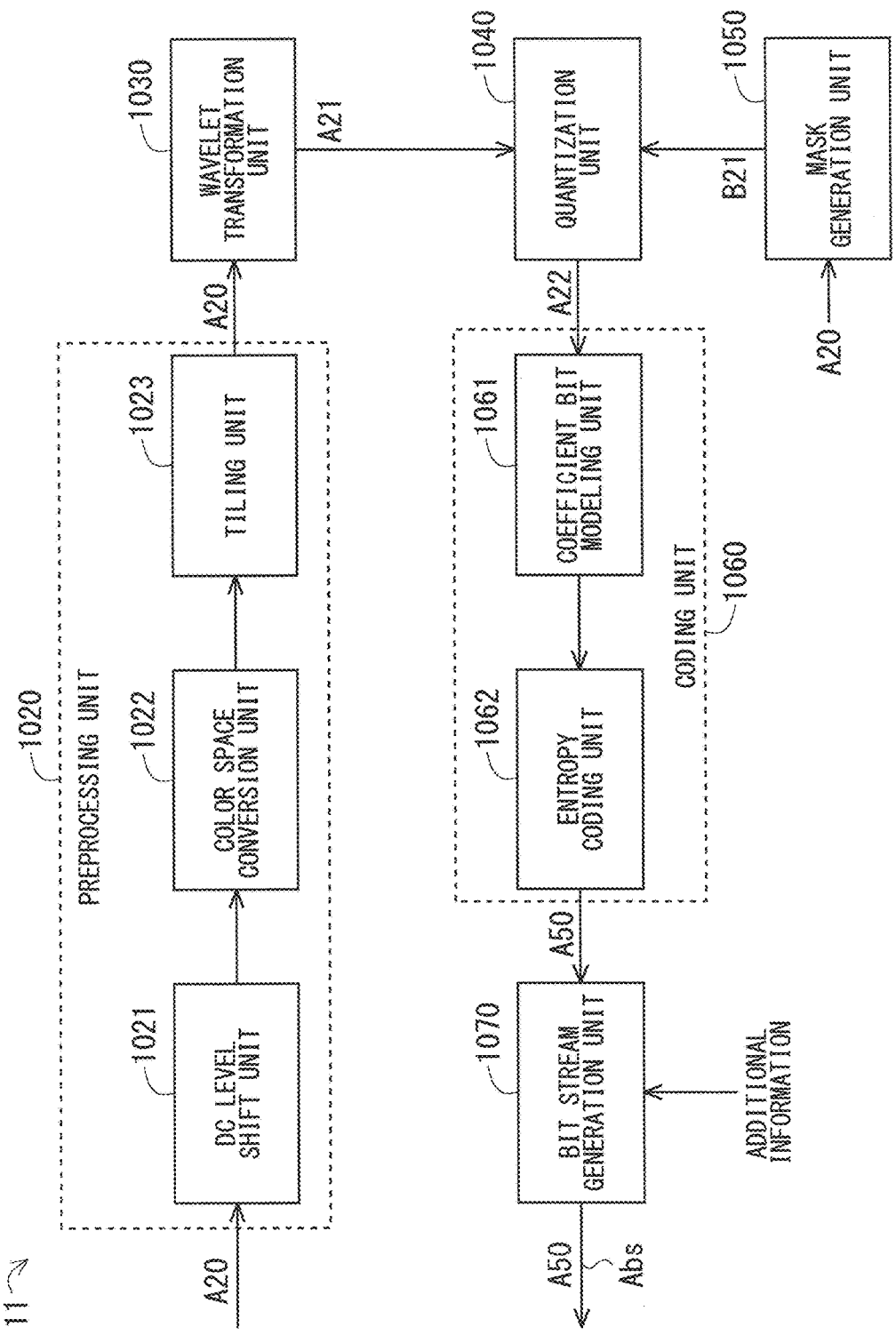
FIG. 3 is a block diagram showing a data supply system in accordance with the first preferred embodiment.

FIG. 3 shows an exemplary constitution of the supply system 11. The supply system 11 has a function of coding image data as described below. With this coding function, the supply system 11 codes first image data A20 which are data of a first image, which is to be supplied to the synthesizing system 21, to thereby generate coded image data A50. Further, the coded image data A50 is sometimes referred to simply as coded data A50.

Furthermore, in general, coding is adopted for compression of image data.

Therefore, the words of "compression" and "coding" are sometimes used as synonymous words, and for example, image compression is sometimes referred to as image coding or image compression-coding. Similarly, the words of "expansion" and "decoding" are sometimes used as synonymous words, and for example, image expansion is sometimes referred to as image decoding or image expansion-decoding.

The coded data A50 is outputted from the supply system 11 as a bit stream for coded data A50 (hereinafter, referred to as coded bit stream) Abs and supplied to the synthesizing system 21.

The first image is an image including an ROI (Region Of Interest) and provides a main image in image synthesis performed in the synthesizing system 21. The first image may be an image captured by the digital camera or the like, or computer graphics.

In the exemplary constitution of FIG. 3, the supply system 11 includes a preprocessing unit 1020, a wavelet transformation unit 1030, a quantization unit 1040, a mask generation unit 1050, a coding unit 1060, and a bit stream generation unit 1070.

<Preprocessing Unit 1020>

The preprocessing unit 1020 performs a predetermined preprocessing on first image data A20. In the exemplary constitution of FIG. 3, the preprocessing unit 1020 includes a DC level shift unit 1021, a color space conversion unit 1022, and a tiling unit 1023.

The DC level shift unit 1021 converts a DC level of the first image data A20 as necessary. The color space conversion unit 1022 converts a color space of the image data after being subjected to the DC-level conversion. For example, a RGB component is converted into a YCbCr component (consisting of a luminance component Y and color difference components Cb and Cr). The tiling unit 1023 divides the image data after being subjected to the color-space conversion into a plurality of region components each of which is called a "tile" and has a rectangular shape. Then, the tiling unit 1023 supplies the image data to the wavelet transformation unit 1030 in a unit of tile. Further, it is not always necessary to divide the image data into the tiles, and a frame of image data outputted from the color space conversion unit 1022 may be directly supplied to the wavelet transformation unit 1030.

<Wavelet Transformation Unit 1030>

The wavelet transformation unit 1030 performs a wavelet transformation process. Specifically, the wavelet transformation unit 1030 performs integer-type or real-number-type discrete wavelet transformation (DWT) on the first image data A20 after being subjected to the preprocessing, and outputs a transformation coefficient obtained as the result of the DWT. Hereinafter, the transformation coefficient is sometimes referred to as, for example, a wavelet transformation coefficient or a wavelet coefficient. Further, the data (a group of wavelet coefficients) generated by performing the wavelet transformation on the first image data A20 is referred to as first wavelet coefficient data A21.

In the wavelet transformation, two-dimensional image data is decomposed into a high-frequency component and a low-frequency component. The frequency decomposition is also termed, for example, band division or band decomposition. Each of the band components obtained by the frequency decomposition (i.e., each of the low-frequency component and the high-frequency component) is also referred to as a sub-band. Herein, following the basic scheme of JPEG (Joint Photographic Experts Group) 2000, adopted is an octave division scheme in which only the sub-bands on the low-frequency side obtained by the frequency decomposition both in the vertical and horizontal directions are recursively band-divided. The number of executions of the recursive band division is termed a decomposition level. The information on the decomposition level accompanies the wavelet coefficient data.

The wavelet transformation unit 1030 decomposes the first image data A20 to a predetermined decomposition level. When the decomposition level is in a range of about 3 to 5, in general, an excellent coding efficiency can be achieved. Further, in the wavelet transformation unit 1030, the predetermined decomposition level is sometimes referred to as an initial decomposition level.

Figure 4:
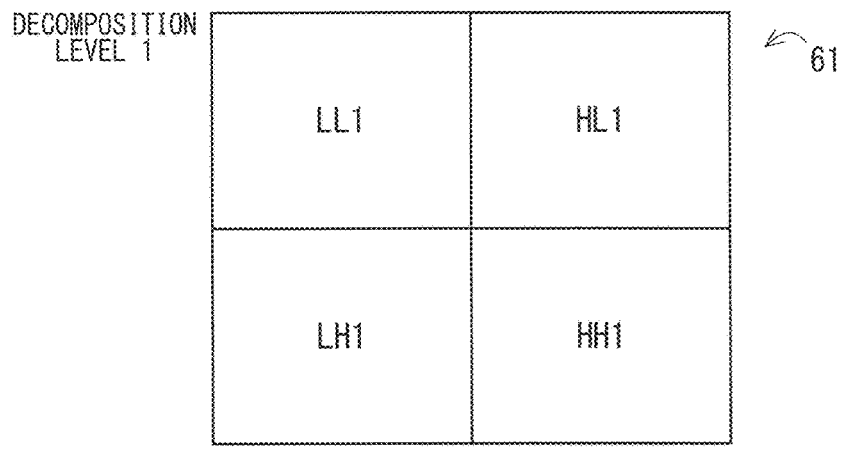
FIG. 4 is a view showing a Mallat-type wavelet plane (decomposition level 1) in accordance with the first preferred embodiment.
Figure 5:
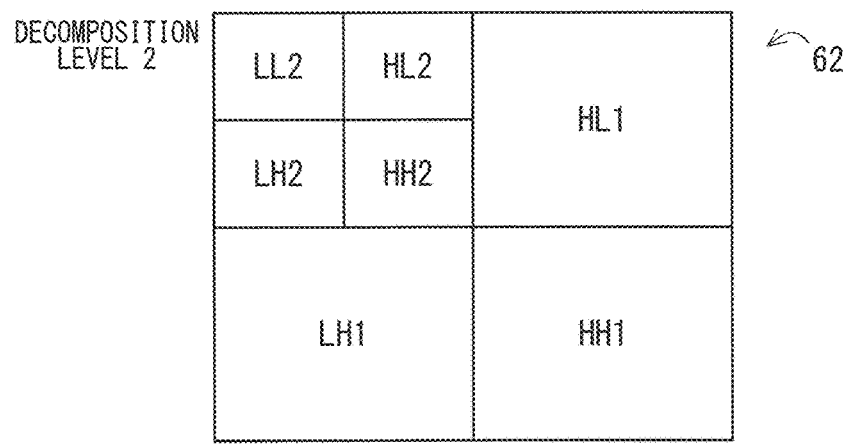
FIG. 5 is a view showing a Mallat-type wavelet plane (decomposition level 2) in accordance with the first preferred embodiment.
Figure 6:
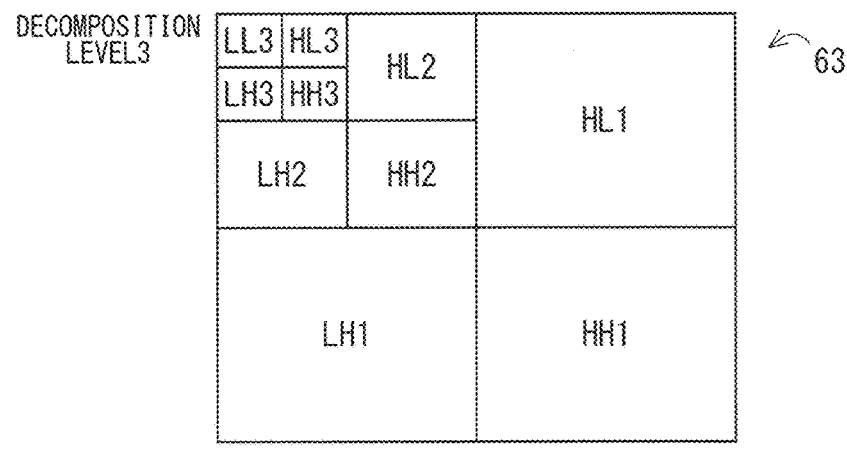
FIG. 6 is a view showing a Mallat-type wavelet plane (decomposition level 3) in accordance with the first preferred embodiment.

FIGS. 4 to 6 are views showing Mallat-type wavelet planes 61 to 63 in the two-dimensional wavelet transformation, respectively. In the exemplary cases of FIGS. 4 to 6, at the decomposition level 1 (see FIG. 4), the input image (two-dimensional image) is subjected to the frequency decomposition with respect to both the vertical and horizontal directions. The image is thereby decomposed into four sub-bands HH1, HL1, LH1, and LL1, as shown in the wavelet plane 61 of FIG. 4. The sub-band LL1 obtained at the decomposition level 1 is further decomposed into four sub-bands HH2, HL2, LH2, and LL2 at the decomposition level 2 (see the wavelet plane 62 of FIG. 5). The sub-band LL2 obtained at the decomposition level 2 is further decomposed into four sub-bands HH3, HL3, LH3, and LL3 at the decomposition level 3 (see the wavelet plane 63 of FIG. 6).

As to the notation on the two-dimensional wavelet transformation, for example, HL1 is a sub-band consisting of a horizontal high-frequency component H and a vertical low-frequency component L at the decomposition level 1. The notation is generalized as "XYm" (Each of X and Y is either one of H and L. m is an integer not smaller than 1). Specifically, a sub-band consisting of a horizontal sub-band X and a vertical sub-band Y at a decomposition level m is represented as "XYm".

Hereinafter, each of the sub-bands LL1, LL2, . . . is sometimes abbreviated as an LL sub-band or an LL component. Further, the sub-band LL1 is sometimes referred to as an LL1 sub-band or an LL1 component. The same applies to other sub-bands.

Herein, each of the wavelet planes (see FIGS. 4 to 6) is a data group in which calculation result data of the wavelet transformation is two-dimensionally arrayed, being associated with an arrangement of pixels in an original image (an image which is not subjected to the wavelet transformation yet). For example, in a region represented as the sub-band LL1 on the wavelet plane, the calculation result data (LL component data) obtained by using a pixel in the original image as a pixel of interest are arranged corresponding to the position of the pixel of interest in the original image. Further, the wavelet plane is sometimes termed a wavelet space or a wavelet region. Furthermore, the wavelet plane is sometimes termed a wavelet image in a case where coefficient values which are two-dimensionally arrayed are regarded as pixel values.

At the decomposition level 1, the sub-band LL1 corresponds to essential information of the image. Further, with the sub-band LL1, it is possible to provide an image having a size that is ¼ the image obtained before the decomposition (in other words, an image obtained by reducing the image before the decomposition by a reduction ratio of 1/2). The sub-band HL1 corresponds to information of an edge extending in the vertical direction, and the sub-band LH1 corresponds to information of an edge extending in the horizontal direction. The sub-band HH1 corresponds to information of an edge extending in an oblique direction. The same applies to those at other decomposition levels. For example, the sub-bands LL2, HL2, LH2, and HH2 at the decomposition level 2 have the same relationship as that of the sub-bands LL1, HL1, LH1, and HH1 in a case where the sub-band LL1 obtained before the decomposition is regarded as the original image.

Hereinafter, when the original image which is not subjected to the wavelet transformation yet corresponds to the decomposition level 0, the original image is sometimes referred to as a wavelet image of decomposition level 0 or wavelet plane of decomposition level 0.

Further, it is assumed that the sub-band which is decomposed most in the wavelet plane is referred to as a highest-order sub-band. Specifically, in the wavelet plane 63 of decomposition level 3 (see FIG. 6), the highest-order sub-bands are LL3, HL3, LH3, and HH3. In generalized notation, in the wavelet plane of decomposition level k, the highest-order sub-bands are LLk, HLk, LHk, and HHk. Furthermore, among the sub-bands obtained by decomposition performed the same number of times, it is assumed that the sub-band LL is referred to as a lowest-frequency sub-band and the sub-band HH is referred to as a highest-frequency sub-band.

In the Mallat-type wavelet transformation, as described above, the LL component is recursively decomposed both in the horizontal and vertical directions the same number of times. Further, in the Mallat-type wavelet transformation, as described later, the sub-band is synthesized in a reverse procedure of the decomposition. It is not necessary, however, that the L component and the H component in each of the horizontal and vertical directions are decomposed and synthesized the same number of times. In other words, wavelet transformation which is different in type from the Mallat-type one may be used.

Further, description will be made on an exemplary case where the upper left end in the original image and the wavelet image is adopted as a point of origin of a coordinate system (whole coordinate system, see FIG. 20 described later) and it is assumed that the point of origin is 0, an L-component output of the wavelet transformation is an even number, and an H-component output thereof is an odd number. It may be assumed, however, that the L-component output is an odd number and the H-component output is an even number. The wavelet planes (see FIGS. 4 to 6) are each a conceptual plane in which the even-numbered and odd-numbered outputs of the wavelet transformation are relocated by sub-bands.

<Quantization Unit 1040>

With reference back to FIG. 3, the quantization unit 1040 performs a quantization process. Specifically, the quantization unit 1040 performs scalar quantization on the first wavelet coefficient data A21 supplied from the wavelet transformation unit 1030 on the basis of a quantization step size, to thereby generate quantized wavelet coefficient data A22. The quantization step size is set in accordance with, for example, a target image quality.

Herein, the quantized wavelet coefficient data A22 has the same data structure as that of the wavelet coefficient data A21. For this reason, by the quantized wavelet coefficient data A22, like the wavelet coefficient data A21, the wavelet image is provided. The wavelet image provided by the quantized wavelet coefficient data A22 is sometimes referred to as a quantized wavelet image.

Particularly, the quantization unit 1040 performs a coefficient determination process for determining a coefficient related to the ROI in the first image (hereinafter, referred to also as an ROI coefficient) and another coefficient related to the non-ROI in the first image (hereinafter, referred to also as a non-ROI coefficient) in the pieces of data (i.e., coefficient values) constituting the first wavelet coefficient data A21. Then, the quantization unit 1040 performs quantization of the first wavelet coefficient data A21 so that the non-ROI coefficient after the quantization may become 0. Such quantization can be achieved by, for example, the technique for determining a quantization value on the basis of a norm (see Japanese Patent Application Laid Open Gazette No. 2006-203409).

The quantization unit 1040 performs the coefficient determination process on the basis of mask data B21 supplied from the mask generation unit 1050. The mask data B21 provides a mask to be used for determining the ROI coefficient and the non-ROI coefficient in the first wavelet coefficient data A21.

<Mask Generation Unit 1050>

The mask generation unit 1050 performs a mask generation process. Specifically, the mask generation unit 1050 generates the mask data B21 which are data of the mask to be used for determining the ROI coefficient and the non-ROI coefficient in the first wavelet coefficient data A21.

FIG. 7 shows an exemplary constitution of the mask generation unit 1050. In the exemplary constitution of FIG. 7, the mask generation unit 1050 includes an original mask generation unit 1051 and a mask development unit 1052.

<Original Mask Generation Unit 1051>

The original mask generation unit 1051 performs an original mask generation process. Specifically, the original mask generation unit 1051 generates original mask data B10 which are data of the original mask to be used for determining the ROI and the non-ROI in the entire range of the first image on the basis of the first image data A20.

The original mask generation unit 1051 can be implemented by various mask generation techniques. For example, a technique for detecting a moving body in a moving image is well known, and by using the moving body detection technique, a mask in which the moving body in the moving image is set as an ROI can be generated. As to the moving body detection technique, for example, see Japanese Patent Application Laid Open Gazette Nos. 2013-254291, 2007-088897, and 2006-093784. Further, in Japanese Patent Application Laid Open Gazette Nos. 2009-199363 and 2005-165688, for example, disclosed is a technique using a particle filter to track a moving body. By using such a moving body tracking technique, it is possible to increase the moving body detection accuracy and reduce the amount of computation.

Further, another technique is well known where with a still image captured by a digital camera as an object, a foreground image and a background image are separated from the whole image by a graph cut method. When the original mask generation unit 1051 is implemented by using such an image separation technique, a mask in which the foreground image is set as the ROI can be generated.

Furthermore, the original mask generation unit 1051 performs the preprocessing as appropriate in the mask generation. When the first image data A20 is captured image data (Bayer data) which is captured by a digital camera, for example, the Bayer data is converted into RGB color data. When the first image has a large size, a reduction process is performed to reduce the amount of computation. Further, in order to extract the feature value, color space conversion into black and white, YUV, HSV, or the like is performed.

FIG. 8 shows an exemplary first image 60. In the first image 60, it is assumed that the part of a moving person is set as an ROI 60a and the other part is set as a non-ROI 60b.

Figure 9:
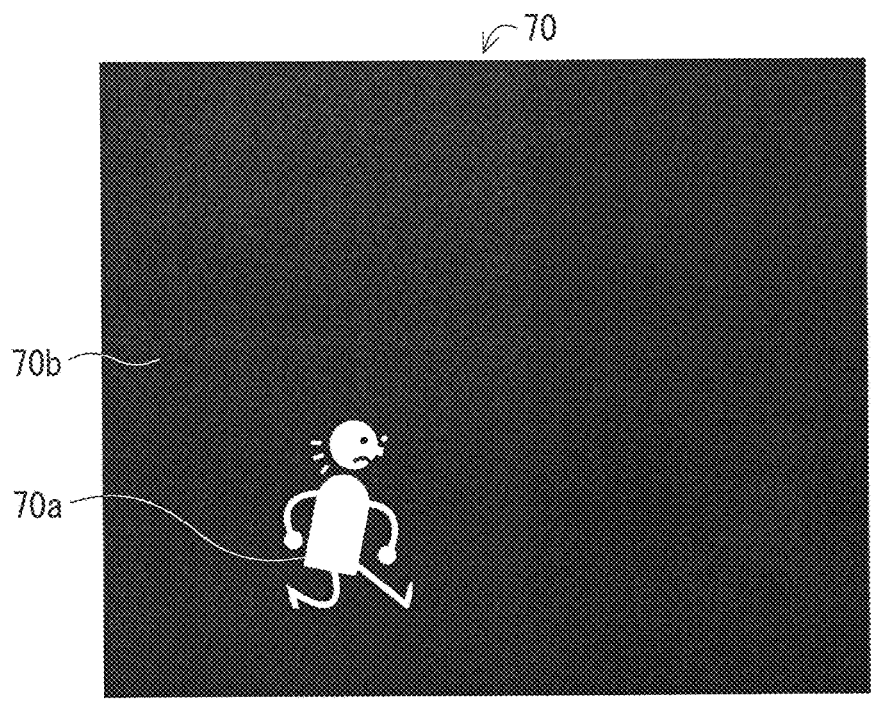
FIG. 9 is a view showing an exemplary original mask in accordance with the first preferred embodiment.

FIG. 9 shows an original mask 70 corresponding to the whole range of the first image 60. The original mask 70 can be understood as an image indicating whether each pixel in the first image 60 belongs to the ROI 60a or the non-ROI 60b. The original mask 70 has an ROI corresponding portion 70a and a non-ROI corresponding portion 70b corresponding to the ROI 60a and the non-ROI 60b in the first image 60, respectively. In FIG. 9, the white portion is the ROI corresponding portion 70a and the black portion is the non-ROI corresponding portion 70b.

Further, in the moving image, the original mask 70 may be generated for all the frame images or may be generated for every certain number of frames or every certain times. The same applies to a case where still images are sequentially inputted.

<Mask Development Unit 1052>

The mask development unit 1052 performs a mask development process. Specifically, the mask development unit 1052 develops the ROI corresponding portion 70a and the non-ROI corresponding portion 70b in the original mask 70 for each sub-band included in the first wavelet coefficient data A21 (in other words, for each sub-band included in the wavelet image corresponding to the first wavelet coefficient data A21). By performing such a mask development process, a developed mask which is a mask for the first wavelet coefficient data A21 is generated. As to the mask development, for example, see Japanese Patent Application Laid Open Gazette No. 2006-203409 and Japanese Unexamined Patent Application Publication (Translation of PCT Application) No. 2001-520466, and INTERNATIONAL STANDARD ISO/IEC 15444-1 ITU-T RECOMMENDATION T.800 Information technology—JPEG 2000 image coding system: Core coding system Annex H—Coding of images with regions of interest.

The developed mask generated by the mask development unit 1052 is the above-described mask to be used for determining the ROI coefficient and the non-ROI coefficient in the first wavelet coefficient data A21. Specifically, the mask generation unit 1050 generates and outputs the data of the developed mask as the above-described mask data B21.

Figure 10:
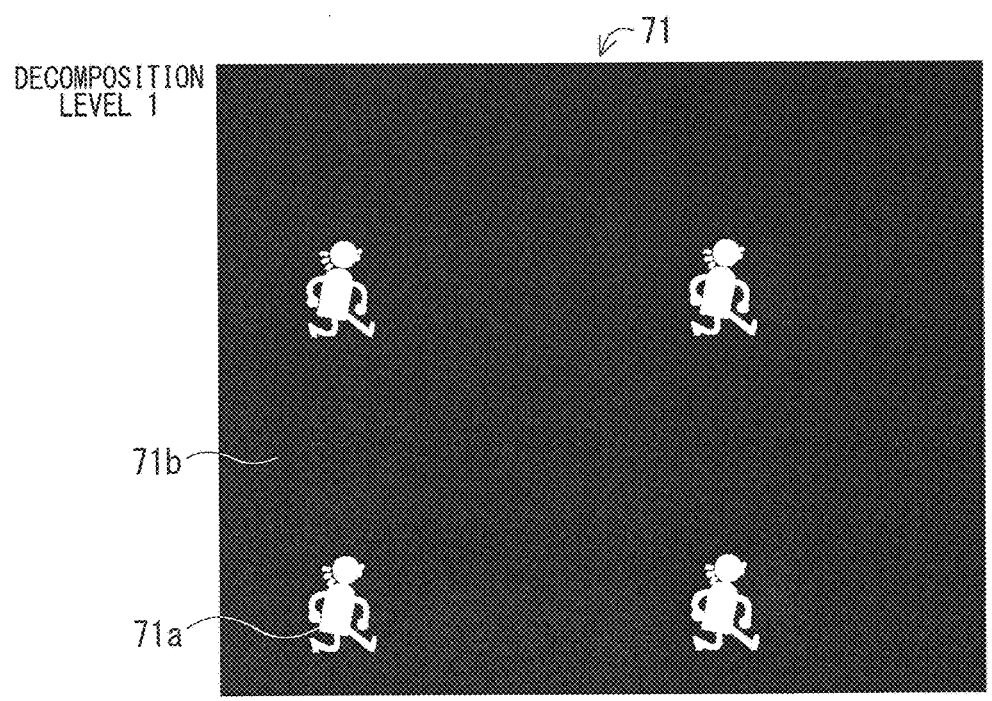
FIG. 10 is a view showing a developed mask (decomposition level 1) in accordance with the first preferred embodiment.

FIGS. 10 to 12 are views showing developed masks 71, 72, and 73 in which the original mask 70 of FIG. 9 is developed on the wavelet planes 61 to 63 (see FIGS. 4 to 6) of decomposition levels 1, 2, and 3, respectively. In the developed masks 71, 72, and 73, the ROI corresponding portions 71a, 72a, and 73a are represented in white, and the non-ROI corresponding portions 71b, 72b, and 73b are represented in black.

Herein, the developed mask can be understood as an aggregate of masks for the sub-bands included in the wavelet image to be masked. In other words, assuming that a mask of each sub-band is referred to as a sub-band mask, the developed mask can be understood as an aggregate of the sub-band masks. It is assumed, for example, that part of the developed mask, which is used for the LL sub-band, is referred to as an LL sub-band mask. The same applies to the other respective parts corresponding to the other sub-bands. The decomposition level of the developed mask accompanies the data of the developed mask.

Figure 13:
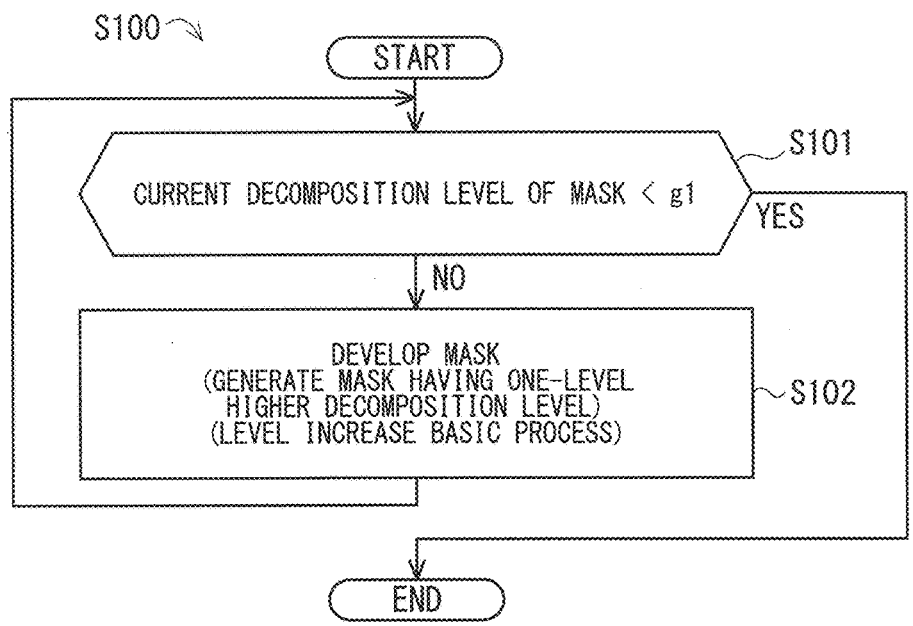
FIG. 13 is a flowchart showing a mask development process in accordance with the first preferred embodiment.

FIG. 13 is a flowchart showing the mask development process. In the mask development process S100 of FIG. 13, performed is a process S102 of increasing the decomposition level of the mask by one level (hereinafter, referred to also as a level increase basic process). When the decomposition level of the first wavelet coefficient data A21 is 2 or higher, the level increase basic process S102 is repeated until the mask having the same decomposition level as that of the first wavelet coefficient data A21 is obtained (see Step S101). Further, in Step S101 of FIG. 13, the decomposition level of the first wavelet coefficient data A21 is represented as g1.

In the level increase basic process S102, the current mask to be processed is converted into a new mask for a new wavelet plane having a decomposition level which is one-level higher than that of the current wavelet plane to which the current mask is applied. Further, when the current mask is the original mask, the above-described current wavelet plane corresponds to the original image before the wavelet transformation. By representing the original image as the wavelet plane of decomposition level 0, as described above, it can be understood that the current wavelet plane also includes the original image.

The level increase basic process S102 is recursively repeated. Specifically, by setting the new mask to a next current mask, the level increase basic process S102 is performed again. Further, the level increase basic process S102 is repeated in accordance with the method of the wavelet transformation. When the above-described Mallat-type method is adopted (see FIGS. 4 to 6), for example, in the wavelet plane, only the lowest-frequency sub-band LL is recursively decomposed. For this reason, the mask development is also recursively performed only on the part corresponding to the sub-band LL.

The level increase basic process S102 is performed on the basis of a predetermined mask development condition, and the mask development condition depends on the number of taps of a filter used for the wavelet transformation.

Figure 14:
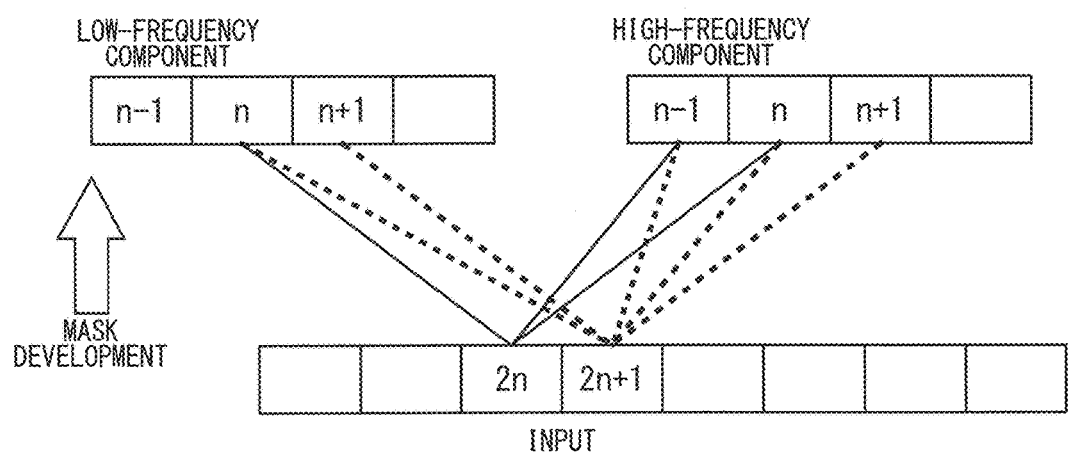
FIG. 14 is a diagram showing the mask development process in a case where a 5×3 filter is used for the wavelet transformation in accordance with the first preferred embodiment.

When a 5×3 filter is used in an arithmetic operation of the wavelet transformation, for example, the mask development condition includes two conditions (referred to as a first development condition and a second development condition) based on FIG. 14. In the 5×3 filter, a low-pass filter on the decomposition side has five taps and a high-pass filter on the decomposition side has three taps.

The first development condition: When the even-numbered (represented as the 2n-th where n is an integer) data on the current wavelet plane are associated with the ROI by the current mask, the new mask is formed so that the n-th data of the low-frequency component (corresponding to output data on the low-pass filter side) on the new wavelet plane may be associated with the ROI. Along with that, the new mask is formed so that the {n−1}th data and the n-th data of the high-frequency component (corresponding to output data on the high-pass filter side) on the new wavelet plane may be associated with the ROI.

The second development condition: When the {2n+1}th data on the current wavelet plane are associated with the ROI by the current mask, the new mask is formed so that the n-th data and the {n+1}th data of the low-frequency component and the {n−1}th data to the {n+1}th data of the high-frequency component on the new wavelet plane may be associated with the ROI.

Figure 15:
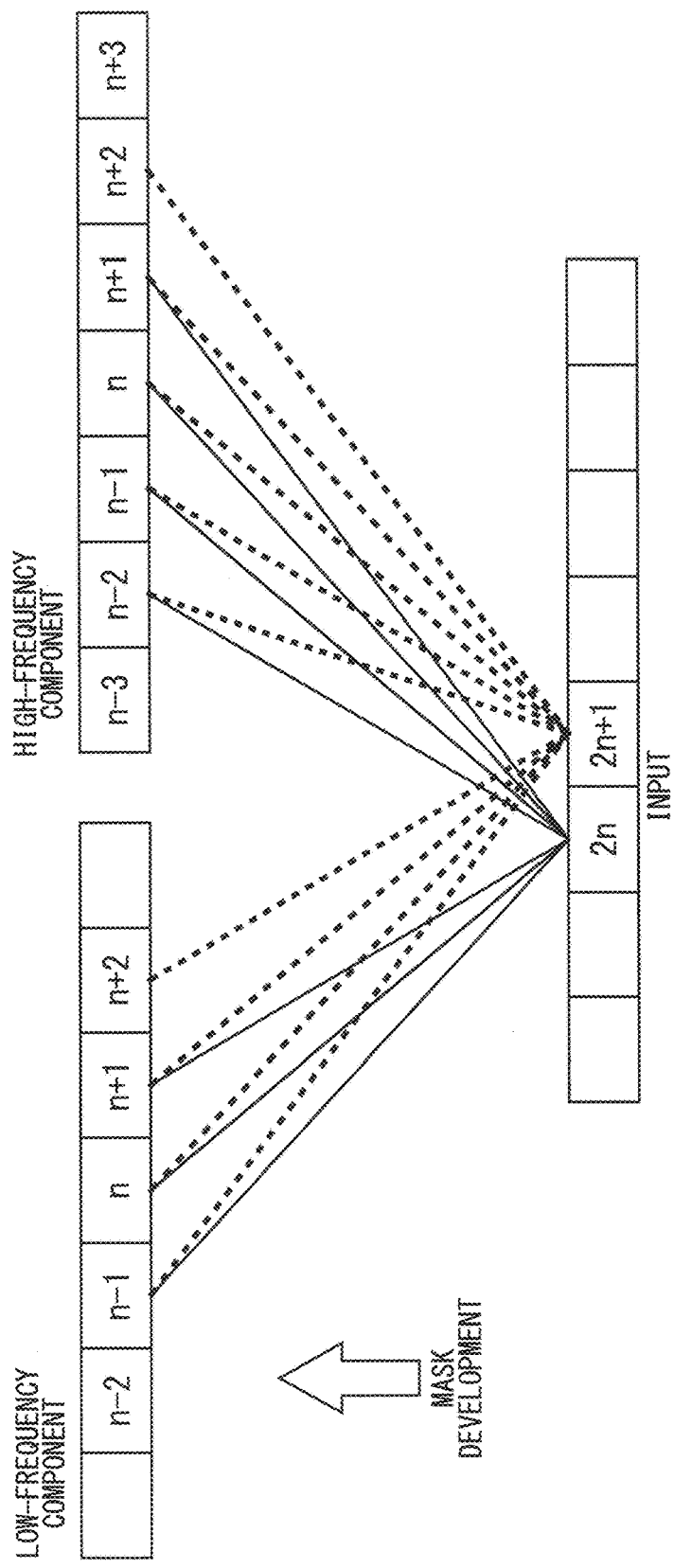
FIG. 15 is a diagram showing the mask development process in a case where a Daubechies 9×7 filter is used for the wavelet transformation in accordance with the first preferred embodiment.

Further, when a Daubechies 9×7 filter is used in an arithmetic operation of the wavelet transformation, the mask development condition includes two conditions (referred to as a third development condition and a fourth development condition) based on FIG. 15. In the Daubechies 9×7 filter, a low-pass filter on the decomposition side has nine taps and a high-pass filter on the decomposition side has seven taps.

The third development condition: When the 2n-th data on the current wavelet plane are associated with the ROI by the current mask, the new mask is formed so that the {n−1}th data to the {n+1}th data of the low-frequency component and the {n−2}th data to the {n+1}th data of the high-frequency component on the new wavelet plane may be associated with the ROI.

The fourth development condition: When the {2n+1}th data on the current wavelet plane are associated with the ROI by the current mask, the new mask is formed so that the {n−1}th data to the {n+2}th data of the low-frequency component and the {n−2}th data to the {n+2}th data of the high-frequency component on the new wavelet plane may be associated with the ROI.

When the decomposition level of the first wavelet coefficient data A21 is 3, the mask generation unit 1050 generates the developed mask 73 of decomposition level 3 (see FIG. 12), and supplies the developed mask 73 to the quantization unit 1040. The quantization unit 1040 performs the coefficient determination process on the first wavelet coefficient data A21 of decomposition level 3, i.e., the wavelet image 63 of decomposition level 3 (see FIG. 6) on the basis of the distinction between the ROI corresponding portion 73a and the non-ROI corresponding portion 73b in the developed mask 73. Then, as described above, on the basis of a coefficient determination result, the quantization unit 1040 generates the quantized wavelet coefficient data A22 of decomposition level 3 so that the value of the non-ROI coefficient in the first wavelet coefficient data A21, after the quantization, may become 0.

<Coding Unit 1060>

With reference back to FIG. 3, the coding unit 1060 performs a coding process. Specifically, the coding unit 1060 performs a predetermined coding on the quantized wavelet coefficient data A22 generated by the quantization unit 1040, to thereby generate the coded data A50. In the predetermined coding, for example, entropy coding is performed in accordance with EBCOT (Embedded Block Coding with Optimized Truncation) for bit-plane coding. In the exemplary constitution of FIG. 3, the coding unit 1060 includes a coefficient bit modeling unit 1061 and an entropy coding unit 1062.

The coefficient bit modeling unit 1061 performs a bit modeling process on the quantized wavelet coefficient.

Herein, the bit modeling process is performed by using the already-known technique, and detailed description will be omitted.

The coefficient bit modeling unit 1061 divides the inputted sub-band into regions each having about 32×32 or 64×64 size, the regions being termed "code blocks". Then, the coefficient bit modeling unit 1061 assigns bit values constituting a binary value of each quantized wavelet coefficient in the code block to different bit planes, respectively. The bit modeling process is performed in a unit of bit plane.

The entropy coding unit 1062 performs entropy coding on the data generated by the coefficient bit modeling unit 1061, to thereby generate coded image data. As the entropy coding, for example, the already-known arithmetic coding is used.

Further, the coding unit 1060 may control the amount of codes by performing rate control on the coded image data generated by the entropy coding unit 1062.

<Bit Stream Generation Unit 1070>

The bit stream generation unit 1070 performs a bit stream generation process. Specifically, the bit stream generation unit 1070 multiplexes the coded data A50 outputted from the coding unit 1060 with additional information, to thereby generate the coded bit stream Abs in conformity with JPEG 2000. As the additional information, for example, used is (are) header information, a layer structure, scalability information, a quantization table, or/and the like.

<Operation of Supply System 11>

Figure 16:
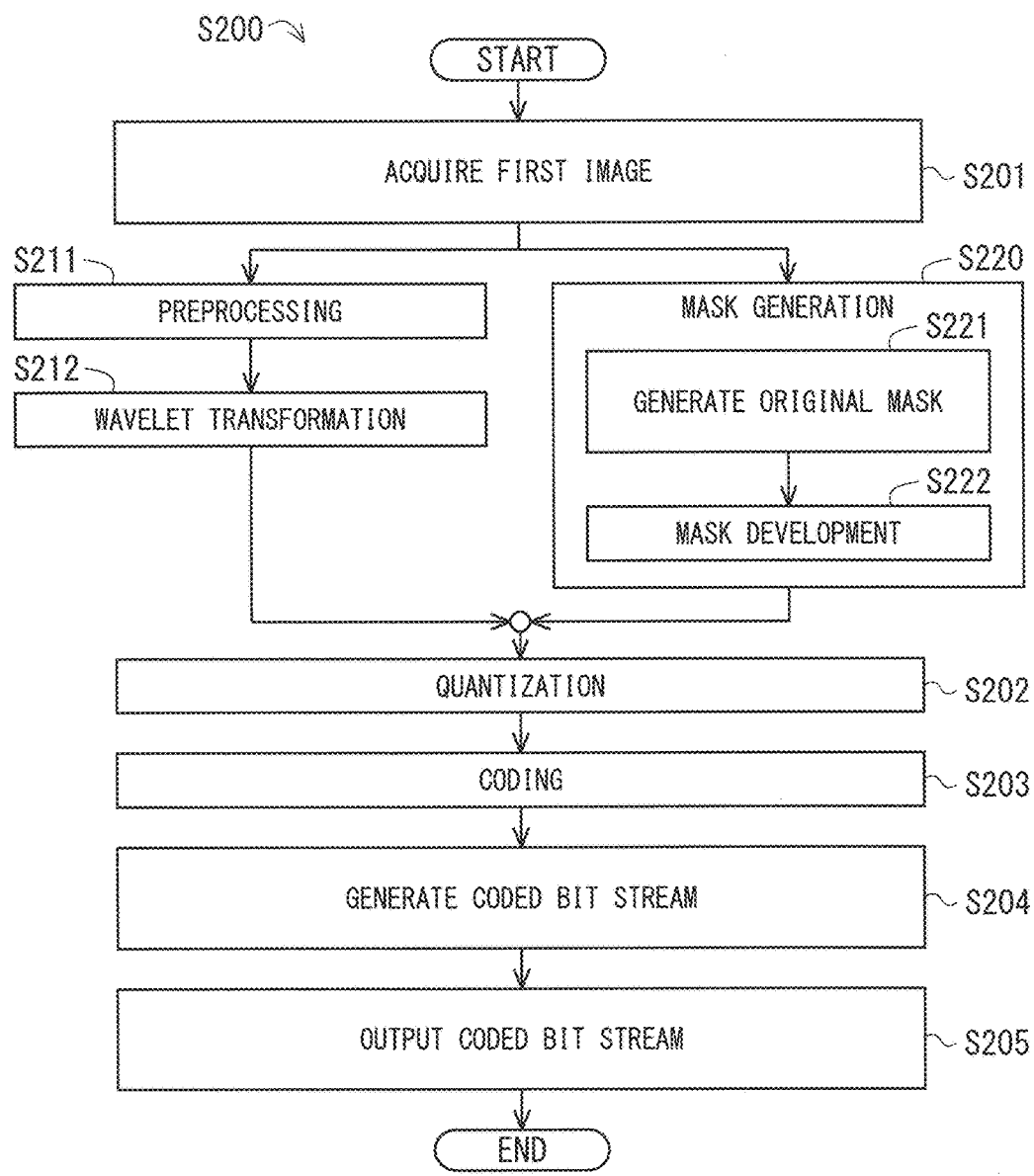
FIG. 16 is a flowchart showing an operation of the data supply system in accordance with the first preferred embodiment.

FIG. 16 is a flowchart showing an operation of the supply system 11. In an operation flow S200 of FIG. 16, when the first image data A20 is inputted to the supply system 11, the preprocessing unit 1020 and the mask generation unit 1050 acquire the first image data A20 (Step S201).

The preprocessing unit 1020 performs the predetermined preprocessing on the first image data A20 (Step S211). Next, the wavelet transformation unit 1030 performs the wavelet transformation on the first image data A20 after being subjected to the preprocessing, to a predetermined decomposition level, to thereby generate the first wavelet coefficient data A21 (Step S212).

On the other hand, the mask generation unit 1050 generates the data B21 of the mask for the first wavelet coefficient data A21, i.e., the developed mask corresponding to the decomposition level of the first wavelet coefficient data A21, on the basis of the first image data A20 (Step S220). Specifically, the original mask generation unit 1051 performs the above-described original mask generation process (Step S221), and the mask development unit 1052 performs the above-described mask development process (Step S222).

Further, though Step S220 is performed concurrently with Steps S211 and S212 in the exemplary operation flow of FIG. 16, Step S220 may be performed before or after Steps S211 and S212.

The first wavelet coefficient data A21 generated in Step S212 and the mask data B21 generated in Step S220 are inputted to the quantization unit 1040. The quantization unit 1040 performs the quantization on the first wavelet coefficient data A21 so that the value of the non-ROI coefficient in the first wavelet coefficient data A21 after the quantization may become 0 as described above, on the basis of the mask data B21 (Step S202). The quantized wavelet coefficient data A22 is thereby generated.

The quantized wavelet coefficient data A22 is coded by the coding unit 1060, thereby the coded data A50 is generated (Step S203). The coded data A50 is converted into the coded bit stream Abs for the first image by the bit stream generation unit 1070 (Step S204). After that, the coded bit stream Abs is outputted from the bit stream generation unit 1070 (Step S205).

<Example of Synthesizing System 21>

Figure 17:
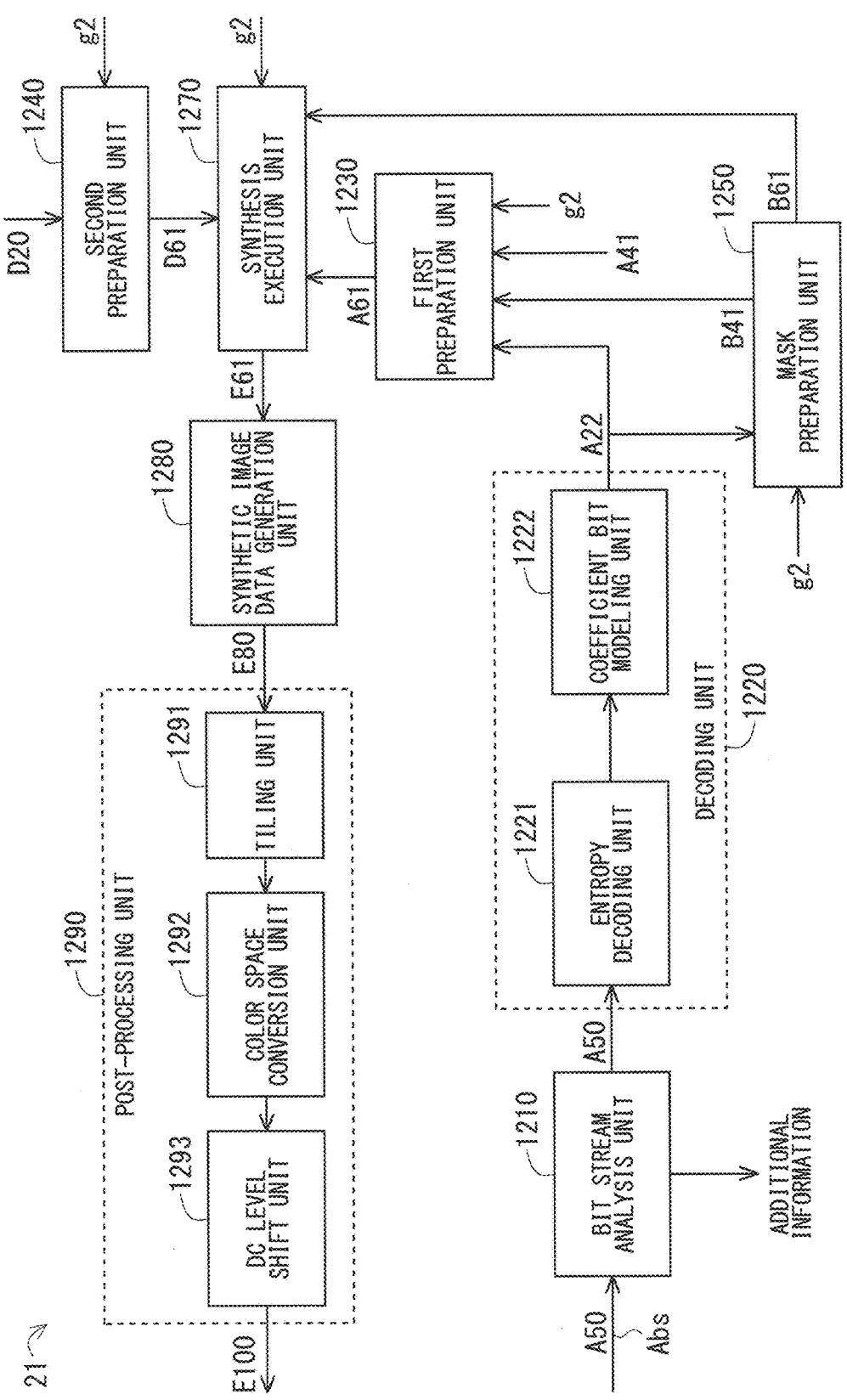
FIG. 17 is a block diagram showing an image synthesizing system in accordance with the first preferred embodiment.

FIG. 17 is an exemplary constitution of the synthesizing system 21. In the exemplary constitution of FIG. 17, the synthesizing system 21 includes a bit stream analysis unit 1210, a decoding unit 1220, a first preparation unit 1230, a second preparation unit 1240, a mask preparation unit 1250, a synthesis execution unit 1270, a synthetic image data generation unit 1280, and a post-processing unit 1290.

<Bit Stream Analysis Unit 1210>

The bit stream analysis unit 1210 performs a bit stream analysis process.

Specifically, the bit stream analysis unit 1210 analyzes the coded bit stream Abs in conformity with JPEG 2000 and extracts the coded data A50 and the additional information from the coded bit stream Abs. The coded data A50 are supplied to the decoding unit 1220. The various additional information are supplied to predetermined processing units, respectively.

<Decoding Unit 1220>

The decoding unit 1220 performs a decoding process. Specifically, the decoding unit 1220 performs predetermined decoding on the coded data A50. The predetermined decoding is basically an inverse processing of the coding performed by the coding unit 1060 shown in FIG. 3, except the code amount control. By performing the predetermined decoding, the quantized wavelet coefficient data A22 are generated from the coded data A50. In the exemplary constitution of FIG. 17, the decoding unit 1220 includes an entropy decoding unit 1221 and a coefficient bit modeling unit 1222.

The entropy decoding unit 1221 performs entropy decoding on the coded data A50, to thereby generate bit data. The entropy decoding is an inverse processing of the entropy coding performed by the entropy coding unit 1062 shown in FIG. 3.

The coefficient bit modeling unit 1222 performs a bit modeling process on the bit data generated by the entropy decoding unit 1221, to thereby restore the quantized wavelet coefficient data A22. The bit modeling process performed by the coefficient bit modeling unit 1222 is an inverse processing of that performed by the coefficient bit modeling unit 1061 shown in FIG. 3. The quantized wavelet coefficient data A22 generated by the coefficient bit modeling unit 1222 are supplied to the first preparation unit 1230 and the mask preparation unit 1250.

<First Preparation Unit 1230>

The first preparation unit 1230 acquires the quantized wavelet coefficient data A22 from the decoding unit 1220, and generates first wavelet coefficient data A61 from the quantized wavelet coefficient data A22. The first wavelet coefficient data A61 are supplied to the synthesis execution unit 1270. The first preparation unit 1230 will be further described later.

<Second Preparation Unit 1240>

The second preparation unit 1240 acquires second image data D20 which are data of the second image. The second image is an image to be synthesized with the ROI of the first image and provides a background image for the image synthesis.

The second image data D20 are supplied, for example, from the image input unit 44 provided on the side of the synthesizing system 21 or another system in the image processing system 20. Further, the second image may be an image captured by a digital camera or the like or computer graphics. Herein, as the second image, a synthetic image which has been generated in the past (for example, a synthetic image antecedent by a predetermined number of frames in a moving image) can be used.

The second preparation unit 1240 generates second wavelet coefficient data D61 from the second image data D20. Specifically, the second preparation unit 1240 performs the wavelet transformation on the second image data D20 to a predetermined decomposition level (more specifically, to a decomposition level of g2 described later). The second wavelet coefficient data D61 is thereby generated. The wavelet transformation in this case is performed in accordance with the same specification as that performed by the wavelet transformation unit 1030 (see FIG. 3) in the supply system 11. The second wavelet coefficient data D61 are supplied to the synthesis execution unit 1270.

The second preparation unit 1240 generates the second wavelet coefficient data D61 every time when the second image data D20 are updated, and every time when the decomposition level of the wavelet transformation is updated. In other words, until the second image data D20 are updated, or until the decomposition level of the wavelet transformation is updated, the latest second wavelet coefficient data D61 which are held at that point in time are supplied to the synthesis execution unit 1270.

<Mask Preparation Unit 1250>

The mask preparation unit 1250 prepares a mask to be used for determining whether each wavelet coefficient included in the first wavelet coefficient data A61 generated by the first preparation unit 1230 is an ROI coefficient related to the ROI or a non-ROI coefficient related to a non-ROI. Herein, the mask preparation unit 1250 acquires the quantized wavelet coefficient data A22 from the decoding unit 1220 and generates mask data B61 from the quantized wavelet coefficient data A22. The mask data B61 are supplied to the synthesis execution unit 1270. The mask preparation unit 1250 will be further described later.

<Synthesis Execution Unit 1270>

The synthesis execution unit 1270 acquires the first wavelet coefficient data A61 from the first preparation unit 1230, acquires the second wavelet coefficient data D61 from the second preparation unit 1240, and acquires the mask data B61 from the mask preparation unit 1250. On the basis of these data A61, D61, and B61, the synthesis execution unit 1270 performs image synthesis between the ROI in the first image and the second image (the image synthesis process).

Specifically, the synthesis execution unit 1270 determines the ROI coefficient and the non-ROI coefficient in the first wavelet coefficient data A61 on the basis of the mask data B61 (the coefficient determination process). On the basis of the determination result, the synthesis execution unit 1270 synthesizes the ROI coefficient in the first wavelet coefficient data A61 and the wavelet coefficient (in detail, the coefficient corresponding to the non-ROI coefficient in the first wavelet coefficient data A61) in the second wavelet coefficient data D61 (a coefficient synthesis process). By performing the coefficient synthesis process, synthesized coefficient data E61 are generated. The synthesized coefficient data E61 are supplied to the synthetic image data generation unit 1280.

Figure 18:
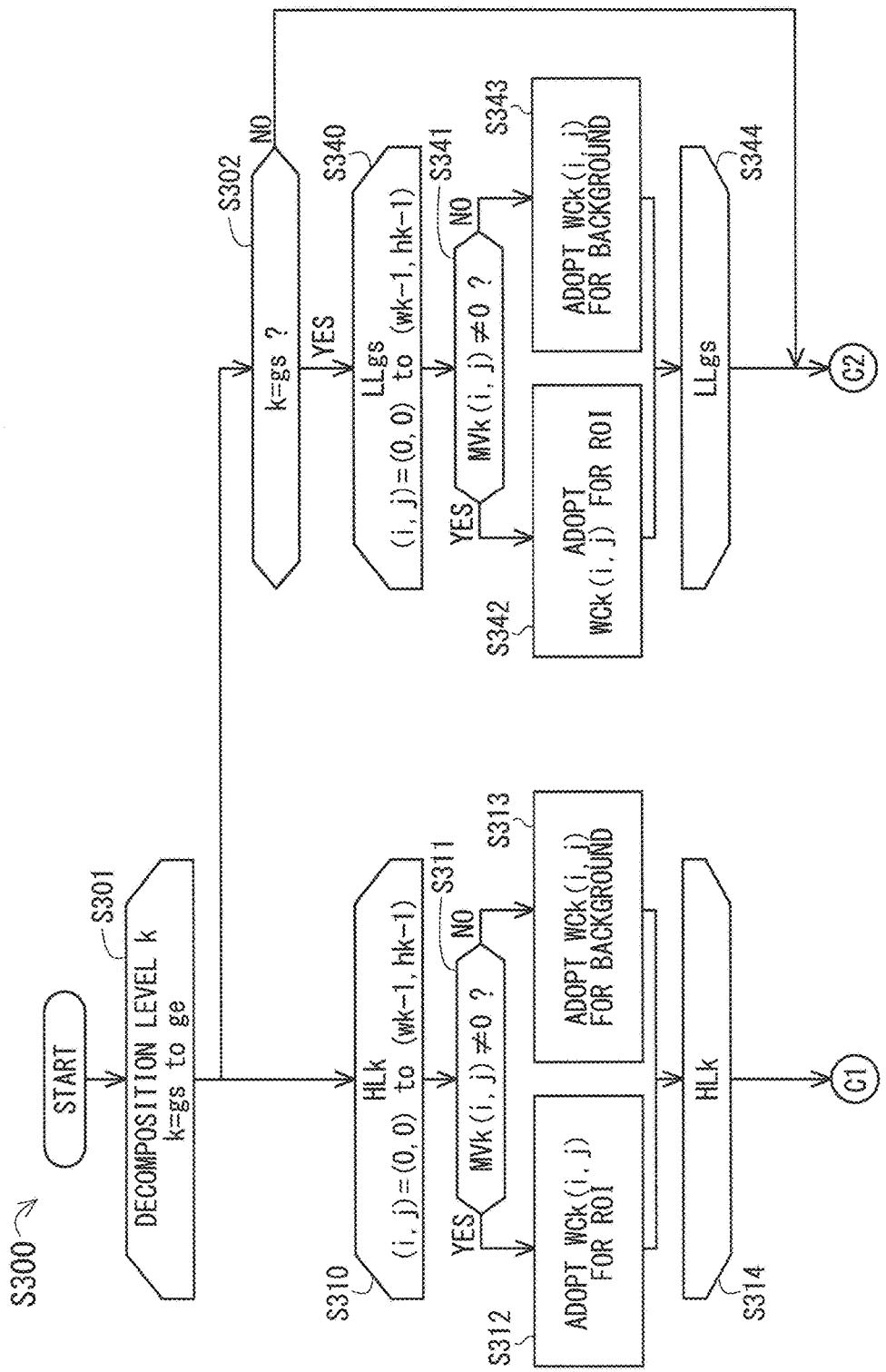

FIGS. 18 and 19 are flowcharts showing a synthesis execution process. The flow of FIG. 18 is connected to that of FIG. 19 with connectors C1 and C2. A synthesis execution process S300 shown in FIGS. 18 and 19 includes a synthesis execution process for the HL sub-band (Steps S310 to S314), a synthesis execution process for the LH sub-band (Steps S320 to S324), a synthesis execution process for the HH sub-band (Steps S330 to S334), and a synthesis execution process for the LL sub-band (Steps S340 to S344).

Specifically, in a loop of Steps S301 to S303, the respective decomposition levels k of the sub-bands to be processed are sequentially set. k is an integer in a range not smaller than ge and not larger than gs. gs is a decomposition level for starting the loop, and ge is a decomposition level for ending the loop. Herein, it is assumed that gs≥ge. Specifically, the sub-band to be processed is selected in the descending order of the decomposition level.

In the synthesis execution process for the HL sub-band (Steps S310 to S314), the synthesis execution process is performed on the HL sub-band of decomposition level k, i.e., HLk sub-band. Specifically, in a loop of Steps S310 to S314, coordinates (i,j) are sequentially set in the sub-band coordinate system defined for the HLk sub-band. i is an integer in a range not smaller than 0 and not larger than wk−1. wk represents a width (i.e., the number of data in the horizontal direction) of the sub-band to be processed (i.e., the sub-band of decomposition level k, and herein the HLk sub-band). j is an integer in a range not smaller than 0 and not larger than hk−1. hk represents a height (i.e., the number of data in the vertical direction) of the sub-band to be processed.

Herein, the coordinate system will be described. As shown in FIG. 20, a whole coordinate system and a sub-band coordinate system can be defined for the wavelet plane (i.e., the wavelet image). The whole coordinate system is defined for the whole wavelet plane. On the other hand, the sub-band coordinate system is defined for each sub-band. Though only the sub-band coordinate system for the HH2 sub-band is shown in FIG. 20, for avoiding complexity of illustration, the sub-band coordinate system can be defined for each of the other sub-bands.

The position of an origin point in each coordinate system is not limited to the exemplary position shown in FIG. 20 (the upper left end of a region to be processed). Further, the decomposition level of the wavelet plane is not limited to the exemplary level shown in FIG. 20 (decomposition level 3).

The wavelet plane shown in FIG. 20 is corresponding to the wavelet image provided by the wavelet coefficient data and also corresponding to the developed mask. Specifically, FIG. 20 shows the images provided by the various data (the wavelet coefficient data, the quantized wavelet coefficient data, the developed mask data, and the like) which can be dealt like the image data, in accordance with the sub-band structure. For this reason, the sub-band coordinate system can be defined for each of the various images, which has the sub-band structure.

With reference back to FIG. 18, in Step S311, it is determined whether a mask value MVk(i,j), which is a value of the coordinates (i,j) of the HLk sub-band mask of a mask, is 0 or not.

When the mask value MVk(i,j) is not 0, in Step S312, a coefficient value WCk(i,j) of the first wavelet coefficient data A61, i.e., a coefficient value WCk(i,j) for the ROI is adopted as a coefficient value WCk(i,j) of the synthesized coefficient data E61. In other words, the coefficient value WCk(i,j) of the coordinates (i,j) of the HLk sub-band in the first wavelet image is adopted as the coefficient value WCk(i,j) of the coordinates (i,j) of the HLk sub-band in the synthesized wavelet image. Herein, the first wavelet image is a wavelet plane provided by the first wavelet coefficient data A61. Similarly, the synthesized wavelet image is a wavelet plane provided by the synthesized coefficient data E61.

On the other hand, when the mask value MVk(i,j) is 0, in Step S313, a coefficient value WCk(i,j) of the second wavelet coefficient data D61, i.e., a coefficient value WCk (i,j) for the background is adopted as the coefficient value WCk(i,j) of the synthesized coefficient data E61. In other words, the coefficient value WCk(i,j) of the coordinates (i,j) of the HLk sub-band in the second wavelet image is adopted as the coefficient value WCk(i,j) of the coordinates (i,j) of the HLk sub-band in the synthesized wavelet image. Herein, the second wavelet image is a wavelet plane provided by the second wavelet coefficient data D61.

Similarly, with respect to the decomposition level k set in Step S301, performed are the respective synthesis execution processes for the LHk sub-band, the HHk sub-band, and the LLk sub-band. Specifically, Steps S320 to S324 are corresponding to Steps S310 to S314, respectively, and the same applies to Steps S330 to S334 and Steps S340 to S344.

Herein, since only one LL sub-band is present, the generation process for the LL sub-band (Steps S340 to S344) is performed only when the decomposition level is the maximum value (herein, gs), in other words, only when the sub-band LLgs is selected to be processed (see Step S302).

<Synthetic Image Data Generation Unit 1280>

The synthetic image data generation unit 1280 acquires the synthesized coefficient data E61 from the synthesis execution unit 1270. Then, the synthetic image data generation unit 1280 performs inverse wavelet transformation (IDWT) on the synthesized coefficient data E61 until the decomposition level becomes a predetermined end level. From the synthesized coefficient data E61, synthetic image data E80 are thereby generated.

The inverse wavelet transformation is an inverse processing of the wavelet transformation performed by the wavelet transformation unit 1030 in the supply system 11. In the inverse wavelet transformation, the sub-band is recursively synthesized. The number of executions of synthesis in the inverse wavelet transformation is termed a synthesis level. Further, it is assumed that the synthesis level in a state before the inverse wavelet transformation is represented as 0.

Herein, it is assumed that the above-described predetermined end level in the inverse wavelet transformation is a decomposition level 0. The predetermined end level, however, may not be the decomposition level 0. For example, the synthetic image data generation unit 1280 may perform the inverse wavelet transformation until the decomposition level becomes 1 and output only the data of the LL1 sub-band as the synthetic image data E80. By this operation, a synthetic image having a size which is ¼ the size in the case where the inverse wavelet transformation is performed until the decomposition level becomes 0. In other words, when the predetermined end level is assumed to be gf, a synthetic image having a size of $\frac{1}{2^{gf}}$ can be obtained.

<Post-Processing Unit 1290>

The post-processing unit 1290 acquires the synthetic image data E80 from the synthetic image data generation unit 1280, and performs a predetermined post-processing on the synthetic image data E80. Herein, the predetermined post-processing is an inverse processing of the predetermined preprocessing performed by the preprocessing unit 1020 in the supply system 11. In the exemplary constitution of FIG. 17, the post-processing unit 1290 includes a tiling unit 1291, a color space conversion unit 1292, and a DC level shift unit 1293.

The tiling unit 1291 performs an inverse processing of the processing performed by the tiling unit 1023 in the supply system 11. Specifically, the tiling unit 1291 synthesizes the synthetic image data E80 in a unit of tile outputted from the synthetic image data generation unit 1280, to thereby generate a frame of image data. When the synthetic image data E80 are not supplied in a unit of tile, in other words, when the wavelet transformation is not performed in a unit of tile in the supply system 11, the processing by the tiling unit 1291 is omitted. Alternatively, the tiling unit 1291 itself may be omitted.

The color space conversion unit 1292 performs an inverse processing of the processing performed by the color space conversion unit 1022 in the supply system 11. For example, the image data outputted from the tiling unit 1291 is converted into the RGB component. The DC level shift unit 1293 converts the DC level of image data outputted from the color space conversion unit 1292 as necessary. In the exemplary constitution of FIG. 17, synthetic image data E100 outputted from the DC level shift unit 1293 becomes output image data of the synthesizing system 21.

By causing the display unit 41 to perform a display operation on the basis of the synthetic image data E100, displayed are the synthetic image between the ROI in the first image and the second image.

<As to Decomposition Levels g1 and g2>

Herein, for easy understanding of the following description, it is assumed that the decomposition level of the quantized wavelet coefficient data A22 is g1. g1 is an integer not smaller than 1. Since the quantized wavelet coefficient data A22 are generated from the first wavelet coefficient data A21 in the supply system 11, g1 is also the decomposition level of the first wavelet coefficient data A21. The information on g1 accompanies the first wavelet coefficient data A21 and the quantized wavelet coefficient data A22. For this reason, the information on g1 can be acquired from the supply system 11.

Further, it is assumed that the decomposition level of the first wavelet coefficient data A61, the second wavelet coefficient data D61, and the mask (mask data B61) which are used in the synthesis execution unit 1270 (in other words, supplied to the synthesis execution unit 1270) is g2. g2 is basically an integer not smaller than 1. If g2=0 is allowed, however, g2 may be not smaller than 0, as described below.

It is assumed that the information on g2 is specified by a user of the synthesizing system 21. For example, the user inputs a value of g2 through the operation unit 42. Alternatively, a user of the supply system 11 may specify g2. In this case, g2 is supplied to the synthesizing system 21, being embedded in the coded bit stream Abs or separated from the coded bit stream Abs. Still alternatively, g2 may be fixedly incorporated in the synthesizing system 21.

g2 may be different from g1, or equal to g1. Further, when the value of g2 is not specified by the user and when the fixed value of g2 is not given to the synthesizing system 21, it is assumed that the synthesizing system 21 sets g2=g1.

<Specific Example of Mask Preparation Unit 1250>

FIG. 21 shows an exemplary constitution of the mask preparation unit 1250. As can be seen from FIG. 21, the mask preparation unit 1250 includes a basic mask generation unit 1251, a mask shaping unit 1252, a provisional mask generation unit 1253, a mask merging unit 1254, and a mask level conversion unit 1255.

Figure 22:
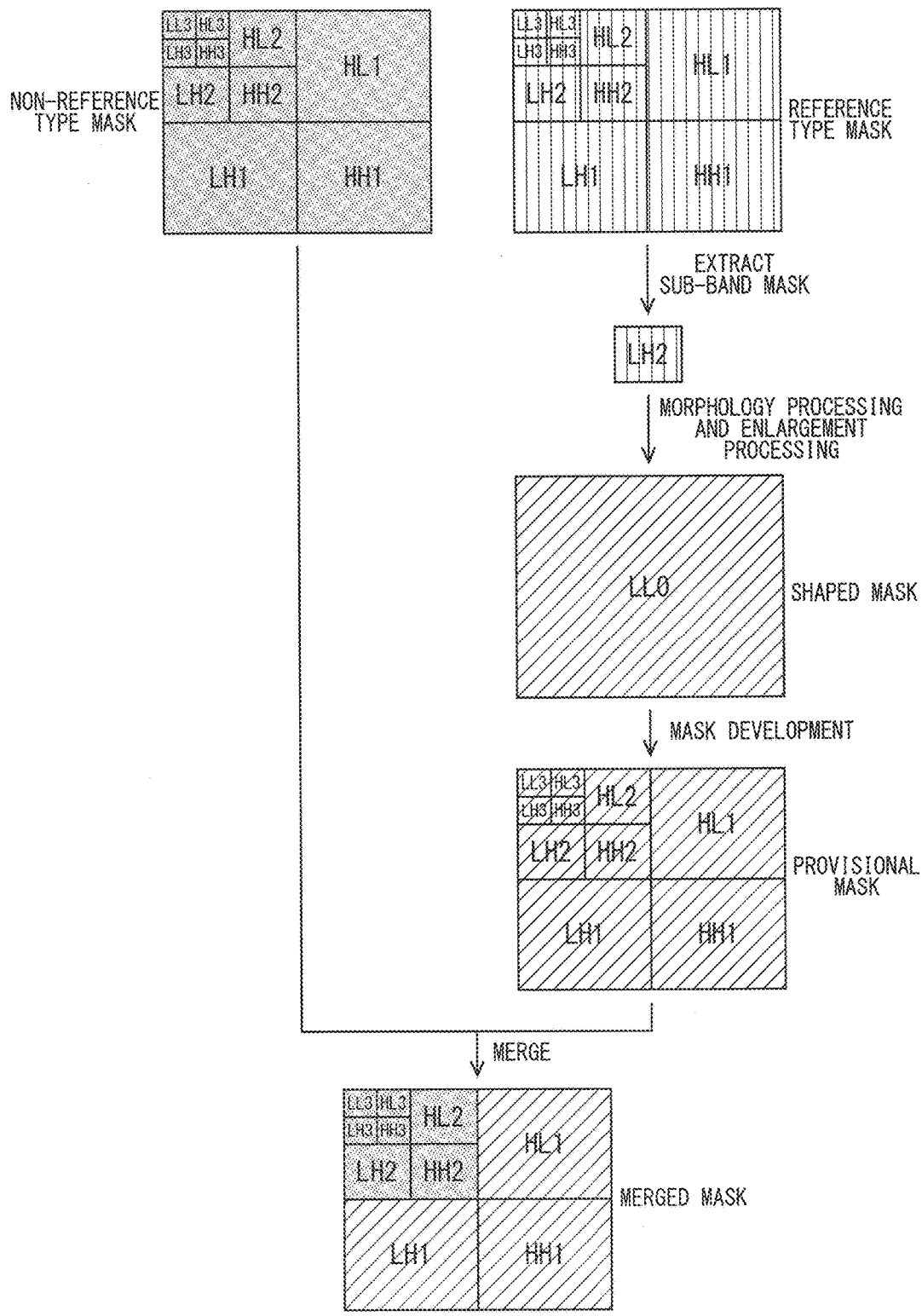
FIG. 22 is a conceptual diagram showing a process operation in the mask preparation unit in accordance with the first preferred embodiment.

FIG. 22 is a conceptual diagram showing a process operation in the mask preparation unit 1250. The hatching in FIG. 22 is given for easy understanding of the illustration, and does not show a specific mask image.

<Basic Mask Generation Unit 1251>

The basic mask generation unit 1251 acquires the quantized wavelet coefficient data A22 having a decomposition level of g1 from the decoding unit 1220. Herein, in the quantized wavelet coefficient data A22, as described above, the non-ROI coefficient is set to 0. The basic mask generation unit 1251 determines whether each wavelet coefficient included in the quantized wavelet coefficient data A22 is 0 or not, to thereby generate a basic mask having a decomposition level of g1. The basic mask is a mask for the quantized wavelet coefficient data A22 and for the first wavelet coefficient data A61. In other words, the basic mask is a developed mask having a decomposition level of g1.

In the exemplary constitution of FIG. 21, the basic mask generation unit 1251 includes a non-reference type mask generation unit 1251a and a reference type mask generation unit 1251b.

<Non-Reference Type Mask Generation Unit 1251a>

The non-reference type mask generation unit 1251a generates a non-reference type mask which is a first example of the basic mask. Specifically, the non-reference type mask generation unit 1251a generates the non-reference type mask from the quantized wavelet coefficient data A22 in accordance with a non-reference type mask estimation rule (hereinafter, referred to also as a non-reference type estimation rule).

In accordance with the non-reference type estimation rule, when a sub-band mask which is a constituent of the mask (i.e., the non-reference type mask) is generated, only the corresponding sub-band in the quantized wavelet coefficient data A22 is referred to and the other sub-bands are not.

In the non-reference type estimation rule, the sub-band coordinate system is defined for each sub-band of the quantized wavelet image provided by the quantized wavelet coefficient data A22. Then, a quantized wavelet coefficient value at the coordinates (i,j) in a sub-band of decomposition level k is assumed to be QCk(i,j). Similarly, the sub-band coordinate system is defined for each of the other sub-bands of the non-reference type mask. Then, a mask value at the coordinates (i,j) in a sub-band of decomposition level k is assumed to be MVk(i,j).

In this case, in the non-reference type estimation rule, when QCk(i,j) is 0, the value of MVk(i,j) of the non-reference type mask is set as a non-ROI indication value. On the other hand, when QCk(i,j) is not 0, the value of MVk(i,j) of the non-reference type mask is set as a ROI indication value. The ROI indication value is a predetermined value indicating that the value is corresponding to the ROI corresponding portion (see the ROI corresponding portions 70a to 73a in FIGS. 9 to 12) in the mask, to which, for example, "1" is assigned. On the other hand, the non-ROI indication value is a predetermined value indicating that the value is corresponding to the non-ROI corresponding portion (see the non-ROI corresponding portions 70b to 73b in FIGS. 9 to 12) in the mask, to which, for example, "0" is assigned.

Figure 23:
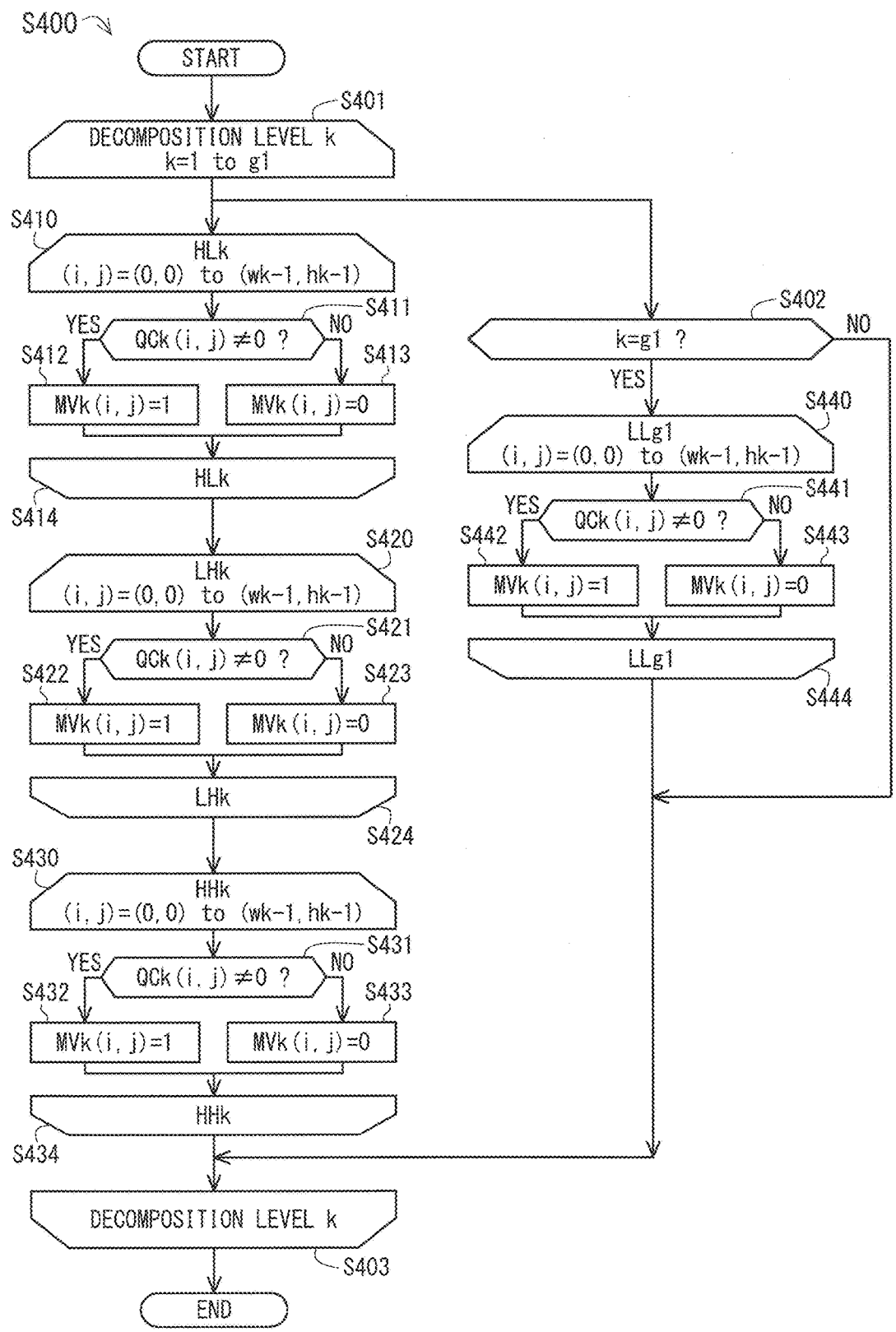
FIG. 23 is a flowchart showing a process of generating a non-reference type mask in accordance with the first preferred embodiment.

FIG. 23 is a flowchart showing a non-reference type mask generation process. A mask generation process S400 shown in FIG. 23 includes an HL sub-band mask generation process (Steps S410 to S414), an LH sub-band mask generation process (Steps S420 to S424), an HH sub-band mask generation process (Steps S430 to S434), and an LL sub-band mask generation process (Steps S440 to S444).

Specifically, in a loop of Steps S401 to S403, the respective decomposition levels k of the sub-bands to be processed are sequentially set. k is an integer in a range not smaller than 1 and not larger than g1.

In the HL sub-band mask generation process (Steps S410 to S414), the non-reference type mask for the HL sub-band of decomposition level k, i.e., an HLk sub-band mask is generated. Specifically, in a loop of Steps S410 to S414, coordinates (i,j) are sequentially set in the sub-band coordinate system defined for the HLk sub-band. i is an integer in a range not smaller than 0 and not larger than wk−1. wk represents a width (i.e., the number of data in the horizontal direction) of the sub-band to be processed (i.e., the sub-band of decomposition level k, and herein the HLk sub-band). j is an integer in a range not smaller than 0 and not larger than hk−1. hk represents a height (i.e., the number of data in the vertical direction) of the sub-band to be processed.

In Step S411, it is determined whether a quantized wavelet coefficient QCk(i,j) of the HLk sub-band in the quantized wavelet image is 0 or not. When QCk(i,j) is not 0, in Step S412, the mask value MVk(i,j) of the coordinates (i,j) of the HLk sub-band is set as the ROI indication value (herein, "1"). On the other hand, when QCk(i,j) is 0, in Step S413, the mask value MVk(i,j) of the coordinates (i,j) of the HLk sub-band is set as the non-ROI indication value (herein, "0").

Similarly, with respect to the decomposition level k set in Step S401, the LHk sub-band mask, the HHk sub-band mask, and the LLk sub-band mask are generated. Specifically, Steps S420 to S424 are corresponding to Steps S410 to S414, respectively, and the same applies to Steps S430 to S434 and Steps S440 to S444.

Herein, only one LL sub-band is present in the sub-band structure having a decomposition level of g1. For this reason, the LL sub-band mask generation process (Steps S440 to S444) is performed only when k=g1, i.e., LLg1 is selected to be processed (see Step S402).

Further, the non-reference type estimation rule can be defined by using the whole coordinate system. Specifically, under the whole coordinate system, a quantized wavelet coefficient value at the coordinates (i,j) is assumed to be QC(i,j), and a mask value at the coordinates (i,j) is assumed to be MV(i,j). In this case, QC(i,j) is 0, the value of MV(i,j) is set as the non-ROI indication value. On the other hand, when QC(i,j) is not 0, the value of MV(i,j) is set as the ROI indication value.

<Reference Type Mask Generation Unit 1251b>

With reference back to FIG. 21, the reference type mask generation unit 1251b generates a reference type mask which is a second example of the basic mask. Specifically, the reference type mask generation unit 1251b generates the reference type mask from the quantized wavelet coefficient data A22 in accordance with a reference type mask estimation rule (hereinafter, referred to also as a reference type estimation rule).

In accordance with the reference type estimation rule, when a sub-band mask which is a constituent of the mask (i.e., the reference type mask) is generated, not only the corresponding sub-band in the quantized wavelet coefficient data A22 but also the other sub-bands having the same decomposition level in the quantized wavelet coefficient data A22 are referred to.

Specifically, the sub-band coordinate system is defined for each sub-band of the quantized wavelet image provided by the quantized wavelet coefficient data A22. Then, a quantized wavelet coefficient value at the coordinates (i,j) in a sub-band of decomposition level k is assumed to be QCk(i,j). Similarly, the sub-band coordinate system is defined for each of the other sub-bands of the reference type mask. Then, a mask value at the coordinates (i,j) in a sub-band of decomposition level k is assumed to be MVk(i,j). In this case, the reference type estimation rule includes first to fourth mask value setting rules described below.

The first mask value setting rule: When a plurality of sub-bands of decomposition level k are present and at least one QCk(i,j) is not 0, all the values of MVk(i,j) of the reference type mask are set as the ROI indication value.

The second mask value setting rule: When a plurality of sub-bands of decomposition level k are present and all the values of QCk(i,j) are 0, all the values of MVk(i,j) of the reference type mask are set as the non-ROI indication value.

The third mask value setting rule: When only one sub-band of decomposition level k is present and QCk(i,j) is not 0, the value of MVk(i,j) of the reference type mask is set as the ROI indication value.

The fourth mask value setting rule: When only one sub-band of decomposition level k is present and QCk(i,j) is 0, the value of MVk(i,j) of the reference type mask is set as the non-ROI indication value.

Figure 24:
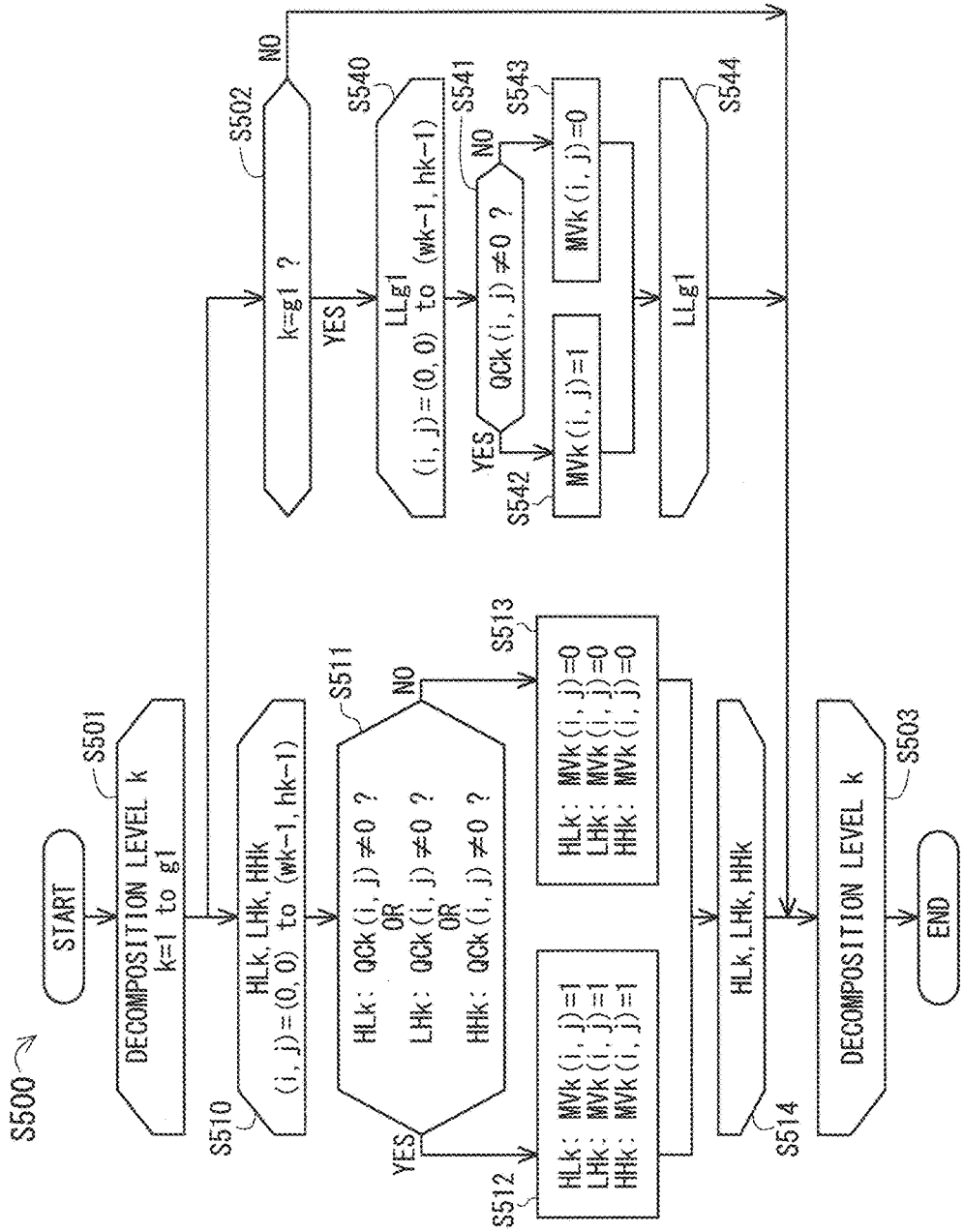
FIG. 24 is a flowchart showing a process of generating a reference type mask in accordance with the first preferred embodiment.

FIG. 24 is a flowchart showing a reference type mask generation process. A mask generation process S500 shown in FIG. 24 includes a sub-band mask generation process for HL, LH, and HH (Steps S510 to S514) and a sub-band mask generation process for LL (Steps S540 to S544).

Specifically, in a loop of Steps S501 to S503, the respective decomposition levels k of the sub-bands to be processed are sequentially set. k is an integer in a range not smaller than 1 and not larger than g1.

In the sub-band mask generation process for HL, LH, and HH (Steps S510 to S514), the HLk sub-band mask, the LHk sub-band mask, and the HHk sub-band mask are generated. Specifically, in a loop of Steps S510 to S514, coordinates (i,j) are sequentially set in the sub-band coordinate system defined for each of the HLk sub-band, the LHk sub-band, and the HHk sub-band. i is an integer in a range not smaller than 0 and not larger than wk−1. wk represents a width of the sub-band to be processed (i.e., the sub-band of decomposition level k, and herein each of the three sub-bands HLk, LHk, and HHk). j is an integer in a range not smaller than 0 and not larger than hk−1. hk represents a height of the sub-band to be processed.

In Step S511, it is determined whether a quantized wavelet coefficient QCk(i,j) of each of the three sub-bands HLk, LHk, and HHk in the quantized wavelet image is 0 or not.

When QCk(i,j) is not 0 in at least one of the HLk, LHk, and HHk sub-bands, in Step S512, the mask values MVk(i,j) of the coordinates (i,j) of all the HLk, LHk, and HHk sub-band masks are set as the ROI indication value (herein, "1"). In other words, in Step S512, the above-described first mask value setting rule is applied.

On the other hand, when QCk(i,j) is 0 in all the HLk, LHk, and HHk sub-bands, in Step S513, the mask values MVk(i,j) of the coordinates (i,j) of all the HLk, LHk, and HHk sub-band masks are set as the non-ROI indication value (herein, "0"). In other words, in Step S513, the above-described second mask value setting rule is applied.

Herein, only one LL sub-band is present in the sub-band structure having a decomposition level of g1. For this reason, the LL sub-band mask generation process (Steps S540 to S544) is performed only when k=g1, i.e., LLg1 is selected to be processed (see Step S502). Steps S540 to S544 are the same as Steps S440 to S444 (see FIG. 23) of the non-reference type estimation rule. Herein, the above-described third mask value setting rule is applied in Step S542, and the above-described fourth mask value setting rule is applied in Step S543.

<Mask Shaping Unit 1252>

With reference back to FIG. 21, the mask shaping unit 1252 acquires a predetermined sub-band part of the basic mask (herein, either one of the non-reference type mask and the reference type mask) as the sub-band mask. Then, the mask shaping unit 1252 performs a predetermined shaping process on the acquired sub-band mask. The mask obtained by performing the shaping process is referred to as a shaped mask. In particular, the shaped mask has the same mask size (in other words, shape and size) as that of the non-reference type mask and the reference type mask and a decomposition level of 0 (see FIG. 22).

In the exemplary case of FIG. 22, the sub-band of decomposition level 2 in the reference type mask is extracted as the sub-band mask. In above-described Steps S511 to S513, the sub-bands of the same decomposition level (HLk, LHk, and HHk) have the same mask image. For this reason, even when any one of the HL2, LH2, and HH2 sub-band masks is selected, the same sub-band mask data can be obtained.

The extraction of the sub-band mask is not limited to the example of FIG. 22.

Specifically, it is assumed that the information on which of the non-reference type mask and the reference type mask is selected is specified by the user of the synthesizing system 21. For example, the user inputs the type of mask to be selected through the operation unit 42. Alternatively, the user of the supply system 11 may specify the mask to be selected. In this case, the information is supplied to the synthesizing system 21, being embedded in the coded bit stream Abs or separated from the coded bit stream Abs. Still alternatively, the type of mask to be selected may be fixedly incorporated in the mask shaping unit 1252.

Similarly, it is assumed that the information on which sub-band mask is selected is specified by the user of the synthesizing system 21. For example, the user inputs the decomposition level of the sub-band mask to be selected through the operation unit 42. Which of the HL, LH, and HH sub-bands is selected may be specified, as well as the decomposition level. Alternatively, the information on which sub-band mask is selected may be specified by the user of the supply system 11, or may be fixedly incorporated in the mask shaping unit 1252.

In the exemplary constitution of FIG. 21, the mask shaping unit 1252 includes a morphology processing unit 1252a and an enlargement unit 1252b.

<Morphology Processing Unit 1252a>

The morphology processing unit 1252a performs a morphology processing on the sub-band mask to be shaped. In general, the morphology processing is used to smooth a binary image. Since the mask image is a binary image, the morphology processing can be applied to the sub-band mask.

The morphology processing is, for example, a processing in which combination of dilation and erosion is executed several times. Dilation is a processing in which if at least one pixel is white within a surrounding region around a pixel of interest, the pixel of interest is replaced with a white pixel. Conversely, erosion is a processing in which if at least one pixel is black within the surrounding region, the pixel of interest is replaced with a black pixel. As the surrounding region, a range of 3×3, 5×5, 7×7, or the like is set. By performing the morphology processing, the mask image can be smoothed (the jaggy can be reduced and smoothed). Further, the morphology processing is effective in removal of isolated points (in other words, filling in a blank) and the like.

<Enlargement Unit 1252b>

The enlargement unit 1252b enlarges the sub-band mask after being subjected to the morphology processing to the same mask size as that of the non-reference type mask, to thereby generate an enlarged mask. Herein, the sub-band mask before being subjected to the morphology processing is a mask for one sub-band. For this reason, when attention is paid only to this sub-band mask, the decomposition level is 0. Therefore, the enlarged mask generated by the enlargement unit 1252b is a shaped mask which has the same mask size as the non-reference type mask and a decomposition level of 0 (see FIG. 22).

Herein, an exemplary case where the enlargement unit 1252b performs an enlargement processing R times with an enlargement ratio of 2, to thereby generate the enlarged mask will be described. For example, assumed is a case where the sub-band mask of decomposition level 2 is extracted from the non-reference type mask or the reference type mask and the extracted sub-band mask is enlarged to the size of the non-reference type mask. In this case, R=2 (see FIG. 22).

FIG. 25 is a flowchart showing such a mask enlargement process. In an operation flow S600 of FIG. 25, the enlargement processing with an enlargement ratio of 2 is performed in Step S602. The processing of Step S602 is executed until it is determined in Step S601 that the enlargement processing with an enlargement ratio of 2 has been performed predetermined times (herein R times).

FIG. 26 is a diagram showing the enlargement processing with an enlargement ratio of 2. In FIG. 26, when the i-th (i is an integer) data in the mask before being enlarged is corresponding to the ROI, it is estimated that the {2i−1}th data to the {2i+1}th data in the mask after being enlarged with an enlargement ratio of 2 are corresponding to the ROI.

Figure 27:
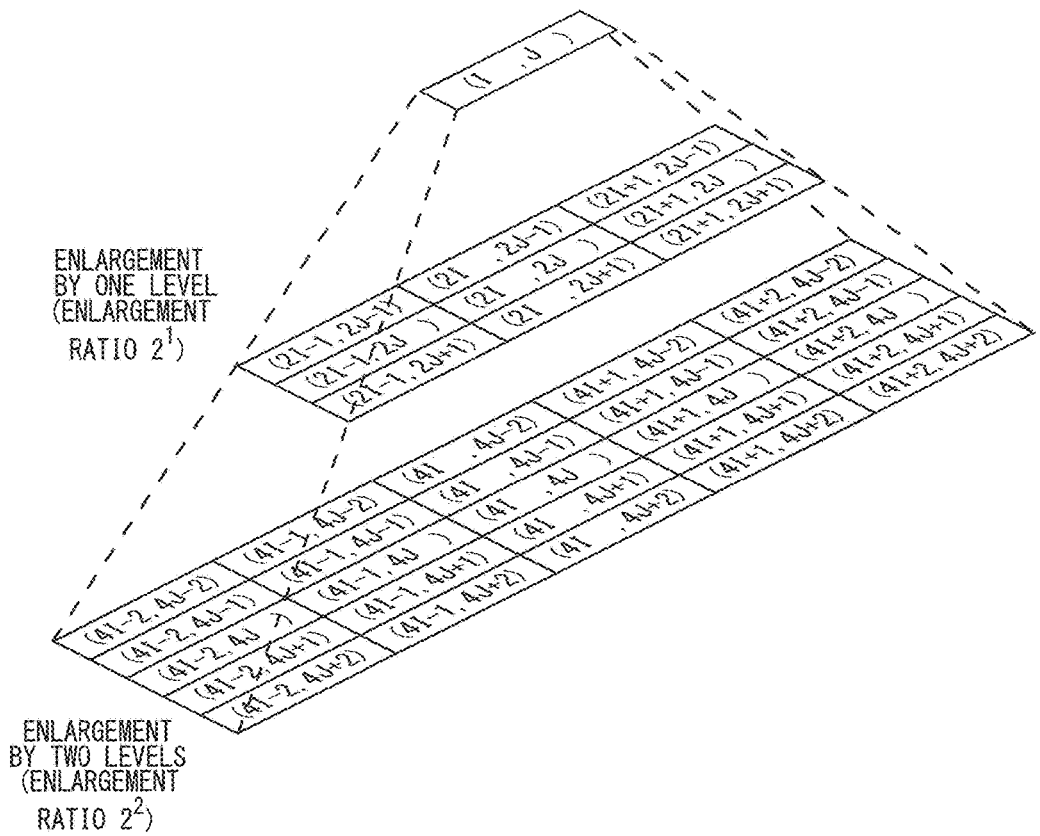
FIG. 27 is a diagram showing the mask enlargement process in accordance with the first preferred embodiment (two-dimensionally shown)

When the estimation rule of FIG. 26 is two-dimensionally developed, as shown in FIG. 27, the estimation rule of FIG. 26 is applied to each of a longitudinal direction and a transverse direction of the mask image. Specifically, when the data at a point at the coordinates (i,j) in the mask before being enlarged are corresponding to the ROI, it is estimated that the data in a range of 3×3 points around the coordinates (2I,2J) in the mask after being enlarged by one level (in other words, with an enlargement ratio of $2^1$) are corresponding to the ROI. In other words, the data in a rectangular range with diagonal points of the coordinates (2I−1,2J−1) and (2I+1, 2J+1) are associated with the ROI. Similarly, in the mask after being enlarged by two levels (in other words, with an enlargement ratio of $2^2$), the data in a range of 5×5 points around the coordinates (4I,4J), in other words, in a rectangular range with diagonal points of the coordinates (4I−2, 4J−2) and (4I+2,4J+2) are associated with the ROI.

Further, unlike in the operation flow S600 of FIG. 25, enlargement can be performed by $\frac{1}{2}^R$ at once.

Furthermore, the enlargement processing may be performed after the morphology processing. Alternatively, at the point in time when the enlargement processing is ended at least one time among R times, the morphology processing may be performed on the enlarged mask.

The data of the shaped mask generated by the mask shaping unit 1252 are supplied to the provisional mask generation unit 1253.

<Provisional Mask Generation Unit 1253>

With reference back to FIG. 21, the provisional mask generation unit 1253 performs a mask development process on the shaped mask. Specifically, the provisional mask generation unit 1253 develops the shaped mask of decomposition level 0 to the sub-band structure having a decomposition level of g1, to thereby generate a provisional mask having a decomposition level of g1 (see FIG. 22).

The provisional mask generation unit 1253 performs the same operation as that of the mask development unit 1052 in the supply system 11 (see FIG. 7 and FIGS. 13 to 15). For this reason, redundant description will be omitted herein.

The data of the provisional mask generated by the provisional mask generation unit 1253 are supplied to the mask merging unit 1254.

<Mask Merging Unit 1254>

As shown in FIG. 21, the mask merging unit 1254 acquires the data of the non-reference type mask and the provisional mask and partially merges the non-reference type mask and the provisional mask in a unit of sub-band, to thereby generate a mask (hereinafter, sometimes referred to as a merged mask). The decomposition level of the merged mask is g1 which is the same as that of the non-reference type mask and the provisional mask.

In the exemplary case of FIG. 22, the sub-bands LL3, HL3, LH3, HH3, HL2, LH2, and HH2 of the non-reference type mask and the sub-bands HL1, LH1, and HH1 of the provisional mask are merged. Specifically, in the merged mask, the sub-bands of decomposition level 2 or higher are formed of the non-reference type mask and the sub-bands of decomposition level 1 are formed of the provisional mask.

Figure 28:
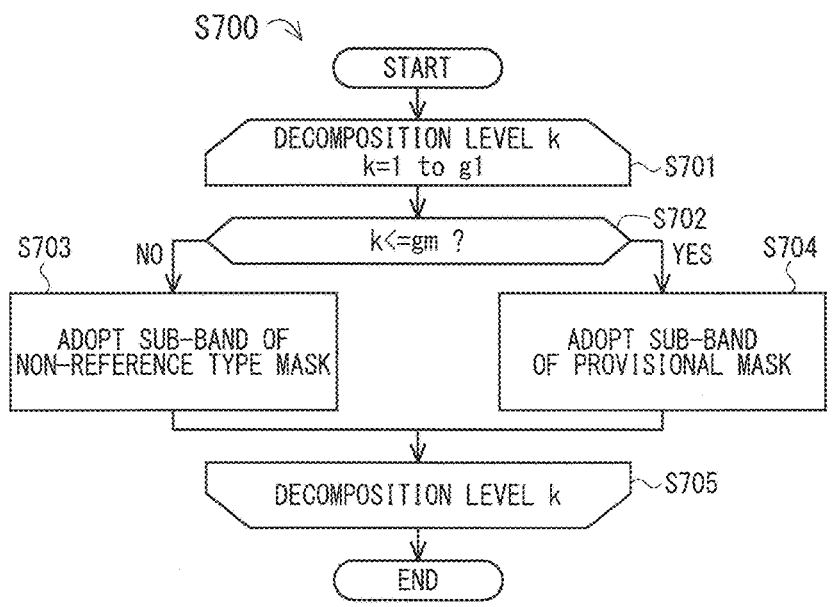
FIG. 28 is a flowchart showing a mask merging process in accordance with the first preferred embodiment.

The merged mask shown in FIG. 22 can be generated in the flowchart of FIG. 28. In accordance with a mask merging process S700 of FIG. 28, in a loop of Steps S701 to S705, the respective decomposition levels k of the sub-bands to be processed are sequentially set. k is an integer in a range not smaller than 1 and not larger than g1.

The decomposition level k set in Step S701 is compared with the decomposition level of gm in Step S702. The decomposition level of gm represents a border between the non-reference type mask and the provisional mask in the merged mask. More specifically, for the sub-band having a decomposition level of gm or lower in the merged mask, the provisional mask is adopted (see Steps S702 and S704). On the other hand, for the sub-band having a decomposition level higher than gm in the merged mask, the non-reference type mask is adopted (see Steps S702 and S703). In the exemplary case of FIG. 22, gm=1, where 1≤gm≤g1.

Figure 29:
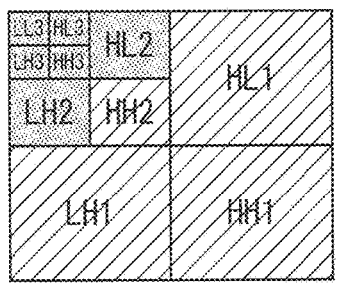
FIG. 29 is a view showing a second example of the merged mask in accordance with the first preferred embodiment.
Figure 30:
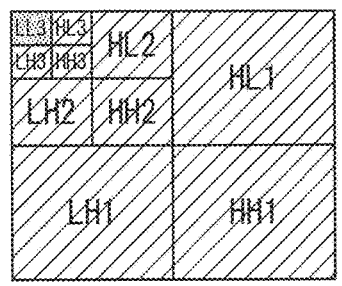
FIG. 30 is a view showing a third example of the merged mask in accordance with the first preferred embodiment.

FIGS. 29 and 30 show other exemplary structures of the merged mask. In the merged mask of FIG. 29, the sub-bands LL3, HL3, LH3, HH3, HL2, and LH2 are formed of the non-reference type mask, and the sub-bands HH2, HL1, LH1, and HH1 are formed of the provisional mask. In the merged mask of FIG. 30, the sub-band LL3 is formed of the non-reference type mask, and the sub-bands HL3, LH3, HH3, HL2, LH2, HH2, HL1, LH1, and HH1 are formed of the provisional mask.

Further, in any one of the exemplary structures of FIGS. 22, 29, and 30, for the low decomposition side sub-bands of the merged mask, the provisional mask is adopted, and for the high decomposition side sub-bands of the merged mask, the non-reference type mask is adopted. The structure, however, is not limited to these examples.

Herein, in the exemplary structure of FIG. 29, unlike the exemplary structures of FIGS. 22 and 30, it is difficult to define the combination of the non-reference type mask and the provisional mask by the value of decomposition level gm. For this reason, as to the exemplary structure of FIG. 29, in Step S702 of FIG. 28, merge assignment information defining in advance which of the non-reference type mask and the provisional mask should be adopted may be used. Specifically, as the merge assignment information, it is defined that for each of the sub-bands LL3, HL3, LH3, HH3, HL2, and LH2 of the merged mask, the corresponding sub-band mask in the non-reference type mask is adopted, and for each of the sub-bands HH2, HL1, LH1, and HH1, the corresponding sub-band mask in the provisional mask is adopted. Further, the merge assignment information can be defined by the decomposition level of gm, as one example.

It is assumed that the merge assignment information is specified by the user of the synthesizing system 21. For example, the user inputs the merge assignment information through the operation unit 42. Alternatively, the merge assignment information may be specified by the user of the supply system 11. In this case, the merge assignment information is supplied to the synthesizing system 21, being embedded in the coded bit stream Abs or separated from the coded bit stream Abs. Still alternatively, the merge assignment information may be fixedly incorporated in the mask merging unit 1254.

When g2=g1, the data B31 (see FIG. 21) of the merged mask generated by the mask merging unit 1254 are outputted from the mask preparation unit 1250 as the mask data B61 (see FIG. 17) and supplied to the synthesis execution unit 1270.

On the other hand, when g2<g1, the merged mask data B31 are supplied to the mask level conversion unit 1255.

Further, when g2>g1, the merged mask data B31 are supplied to the mask level conversion unit 1255, and are also outputted from the mask preparation unit 1250 as mask data B41 (see FIG. 17) and supplied to the first preparation unit 1230.

<Mask Level Conversion Unit 1255>

With reference back to FIG. 21, the mask level conversion unit 1255 generates a mask having a decomposition level of g2 from the mask having a decomposition level of g1 which is supplied from the mask merging unit 1254. In the exemplary constitution of FIG. 21, the mask level conversion unit 1255 includes a mask restoration unit 1255a and a mask development unit 1255b.

<Mask Restoration Unit 1255a>

When g2<g1, the mask restoration unit 1255a performs a mask restoration process on the mask having a decomposition level of g1 which is supplied from the mask merging unit 1254. Specifically, the mask restoration unit 1255a restores the mask having a decomposition level of g1 to the sub-band structure having a decomposition level of g2 (<g1). The mask restoration process is a process of restoring a mask having a lower decomposition level from the supplied mask, and is an inverse processing of the above-described mask development process (see FIGS. 13 to 15). As to the restoration of the mask, for example, see Japanese Patent Application Laid Open Gazette No. 2006-203409 and Japanese Unexamined Patent Application Publication (Translation of PCT Application) No. 2001-520466, and INTERNATIONAL STANDARD ISO/IEC 15444-1 ITU-T RECOMMENDATION T.800 Information technology—JPEG 2000 image coding system: Core coding system Annex H—Coding of images with regions of interest. The data of the generated mask having a decomposition level of g2 become output data (i.e., mask data) B32 from the mask level conversion unit 1255.

Figure 31:
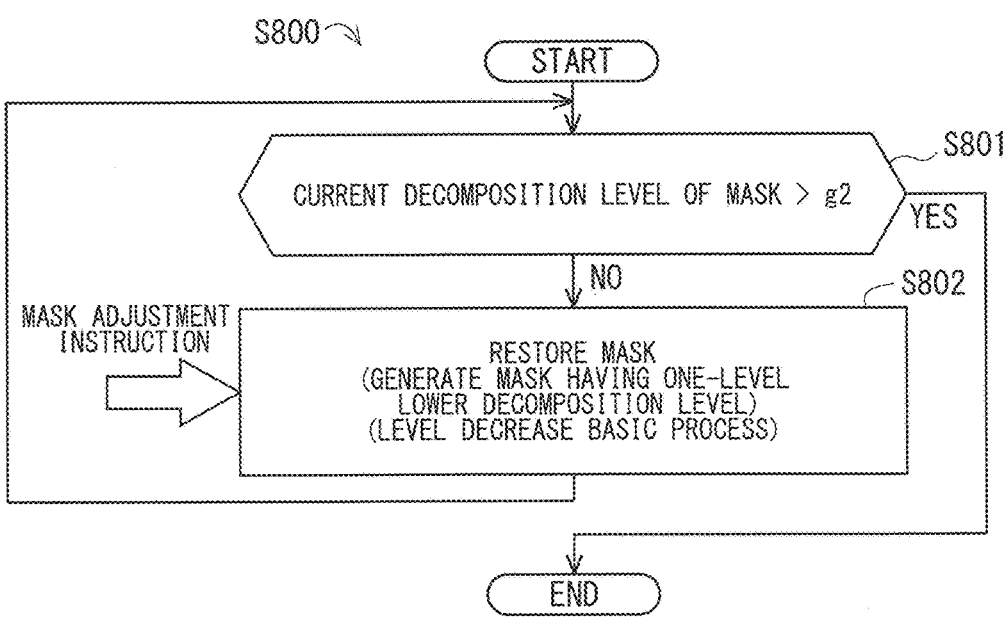
FIG. 31 is a flowchart showing a mask restoration process in accordance with the first preferred embodiment.

FIG. 31 is a flowchart showing the mask restoration process. In a mask restoration process S800 of FIG. 31, performed is a process S802 of decreasing the decomposition level of the mask by one level (hereinafter, referred to also as a level decrease basic process). When the difference between the decomposition level g1 and the decomposition level g2 is not smaller than 2, the level decrease basic process S802 is repeated until the mask having a decomposition level of g2 is obtained (see Step S801).

In the level decrease basic process S802, the current mask to be processed is converted into a new mask for a new wavelet plane which has a decomposition level lower than that of the current wavelet plane to which the current mask is applied, by one level.

The level decrease basic process S802 is recursively repeated. Specifically, by setting the new mask to a next current mask, the level decrease basic process S802 is performed again. Further, the level decrease basic process S802 is repeated in accordance with the method of the inverse wavelet transformation performed in the synthetic image data generation unit 1280. When the above-described Mallat-type method is adopted (see FIGS. 4 to 6), for example, in the wavelet plane, only the highest-order sub-bands (LLk, HLk, LHk, and HHk at the decomposition level k) are recursively synthesized. For this reason, the mask restoration is recursively performed only on the parts corresponding to the highest-order sub-bands.

<Mask Restoration Condition>

The level decrease basic process S802 is performed on the basis of a predetermined mask restoration condition. The mask restoration condition defines that when the data at a specified position on the current wavelet plane are associated with the ROI by the current mask, the new mask is formed so that the data at a position on the new wavelet plane, which is corresponding to the above-described specified position, may be associated with the ROI.

The mask restoration condition depends on the number of taps of a filter used for the inverse wavelet transformation. When a 5×3 filter is used in an arithmetic operation of the inverse wavelet transformation, for example, the mask restoration condition is based on FIG. 32. Further, when a Daubechies 9×7 filter is used in an arithmetic operation of the inverse wavelet transformation, for example, the mask restoration condition is based on FIG. 33.

In any one of the cases of FIGS. 32 and 33, the mask restoration condition is broadly divided into two conditions (referred to as a first restoration condition and a second restoration condition). Specifically, the first restoration condition is used to form the new mask so that the 2n-th (n is an integer) data on the new wavelet plane may be associated with the ROI. The second restoration condition is used to form the new mask so that the {2n+1}th data on the new wavelet plane may be associated with the ROI.

Herein, both the first and second restoration conditions impose a condition (referred to as a restoration execution condition) that the data at the specified position on the current wavelet plane are associated with the ROI by the current mask.

In the first restoration condition, the above-described specified position is a position corresponding to the above-described 2n-th of the new wavelet plane. Hereinafter, the position is sometimes referred to as a first specified position. With reference to FIG. 32, in a case of using the 5×3 filter, candidates of the first specified position are the n-th of the low-frequency component (corresponding to input data on the low-pass filter side) and the {n−1}th and n-th of the high-frequency component (corresponding to input data on the high-pass filter side) on the current wavelet plane. With reference to FIG. 33, in a case of using the Daubechies 9×7 filter, the candidates of the first specified position are the {n−1}th to the {n+1}th of the low-frequency component and the {n−2}th to {n+1}th of the high-frequency component on the current wavelet plane.

Similarly, in the second restoration condition, the above-described specified position is a position corresponding to the above-described {2n+1}th of the new wavelet plane. Hereinafter, the position is sometimes referred to as a second specified position. With reference to FIG. 32, in a case of using the 5×3 filter, candidates of the second specified position are the n-th and the {n+1}th of the low-frequency component and the {n−1}th to {n+1}th of the high-frequency component on the current wavelet plane. With reference to FIG. 33, in a case of using the Daubechies 9×7 filter, the candidates of the second specified position are the {n−1}th to the {n+2}th of the low-frequency component and the {n−2}th to {n+2}th of the high-frequency component on the current wavelet plane.

In accordance with a use pattern of these candidates of the specified position, the first restoration condition and the second restoration condition can be defined in various manners. As a result, the new mask can be adjusted in various manners. Herein, it is assumed that the use pattern of the candidates of the specified position is set by an instruction of the user. Hereinafter, this user's instruction will be referred to as a mask adjustment instruction. Further, it is assumed that the mask adjustment instruction accompanies the information on the decomposition level of g2, and the mask adjustment instruction is thereby supplied to the level decrease basic process S802 performed in the synthesizing system 21 (see FIG. 31). The mask adjustment instruction, however, may be supplied separately from the information on the decomposition level of g2.

A large number of use patterns of the candidates of the specified position, in other words, a large number of contents of the mask adjustment instruction can be thought. Hereinafter, an exemplary case where the mask adjustment instruction consists of three instructions, i.e., a mode instruction, a low-frequency selection instruction, and a high-frequency selection instruction will be described.

The mode instruction (MODE) relates to which of the sub-bands in the low-frequency component and the high-frequency component of the current wavelet plane is used. It is assumed that the instruction indicating that only the low-frequency component should be used is represented as MODE=L, and further the instruction indicating that both the low-frequency component and the high-frequency component should be used is represented as MODE=LH.

The low-frequency selection instruction (LSEL) relates to whether or not the restoration execution condition should be imposed on all the candidates included in the low-frequency component of the current wavelet plane. When it is required that all the candidates included in the low-frequency component should satisfy the restoration execution condition, it is assumed that this is represented as LSEL=AND. Conversely, when it is required that at least one of the candidates included in the low-frequency component should satisfy the restoration execution condition, it is assumed that this is represented as LSEL=OR.

The high-frequency selection instruction (HSEL) relates to whether or not the restoration execution condition should be imposed on all the candidates included in the high-frequency component of the current wavelet plane. When it is required that all the candidates included in the high-frequency component should satisfy the restoration execution condition, it is assumed that this is represented as HSEL=AND. Conversely, when it is required that at least one of the candidates included in the high-frequency component should satisfy the restoration execution condition, it is assumed that this is represented as HSEL=OR.

Further, the mode instruction MODE, the low-frequency selection instruction LSEL, and the high-frequency selection instruction HSEL can be supplied to the mask restoration unit 1255a by three signals assigned to these instructions, respectively, in the circuit.

Some specific examples of the mask adjustment instruction are shown in Table 1. The contents of the mask adjustment instruction, however, are not limited to the examples shown in Table 1.

TABLE 1

|  | MODE | LSEL | HSEL | Remark | |
|---|---|---|---|---|---|
| #1 | LH | AND | AND | Lossless | |
| #2 | LH | AND | AND | Lossy | Near Lossless |
| #3 | L | | AND | | Select any one |
| #4 | L | | OR | — | |
| #5 | LH | AND | AND | | |
| #6 | LH | AND | OR | | |
| #7 | LH | OR | OR | | |

In Table 1, the mask adjustment instruction #1 is used for lossless compression. Specifically, the mask adjustment instruction #1 is suitable for a case where the image compression (more specifically, the quantization of the ROI coefficient) in the supply system 11 is lossless. Further, in the lossless compression, the ROI coefficient after being quantized does not become 0.

The mask adjustment instruction #2 is used for near lossless compression. In the near lossless compression, data loss is larger than that in the lossless compression but the image quality which is almost equal to that in the lossless compression can be achieved. In consideration of this point, the near lossless compression can be understood as irreversible compression in terms of data and reversible compression in terms of image quality. In the major classification into two groups of lossless and lossy, however, near lossless is classified into the lossy group in most cases.

The mask adjustment instructions #3 to #7 are used for lossy compression. In the lossy compression, the ROI coefficient after being quantized tends to become 0 in the high-frequency component. As this tendency increases (in other words, in a case where more ROI coefficients after being quantized become 0 in the high-frequency component with the large quantization value (i.e., the high compression ratio)), it is preferable that the instruction should be applied in the order of #4, #7, #3, #6, and #5.

Further, in the example of Table 1, the same mask adjustment instructions #1, #2, and #5 are redundantly described, for convenience of explanation.

<Case of Using 5×3 Filter>

Hereinafter, with reference to Table 1, as to the case where the 5×3 filter is used for the inverse wavelet transformation, for each mask adjustment instruction, the first and second restoration conditions will be described.

<Mask Adjustment Instructions #1, #2, and #5 in Case of Using 5×3 Filter>

In accordance with the mask adjustment instructions #1, #2, and #5 (MODE=LH, LSEL=AND, and HSEL=AND), the first and second restoration conditions are defined as follows.

The first restoration condition: When the n-th data of the low-frequency component on the current wavelet plane are associated with the ROI by the current mask and all the {n−1}th data and the n-th data of the high-frequency component on the current wavelet plane are associated with the ROI by the current mask, the new mask is formed so that the 2n-th data on the new wavelet plane may be associated with the ROI.

The second restoration condition: When all the n-th data and the {n+1}th data of the low-frequency component on the current wavelet plane are associated with the ROI by the current mask and all the {n−1}th data to the {n+1}th data of the high-frequency component on the current wavelet plane are associated with the ROI by the current mask, the new mask is formed so that the {2n+1}th data on the new wavelet plane may be associated with the ROI.

<Mask Adjustment Instruction #3 in Case of Using 5×3 Filter>

In accordance with the mask adjustment instruction #3 (MODE=L and LSEL=AND), the first and second restoration conditions are defined as follows.

The first restoration condition: When the n-th data of the low-frequency component on the current wavelet plane are associated with the ROI by the current mask, the new mask is formed so that the 2n-th data on the new wavelet plane may be associated with the ROI.

The second restoration condition: When all the n-th data and the {n+1}th data of the low-frequency component on the current wavelet plane are associated with the ROI by the current mask, the new mask is formed so that the {2n+1}th data on the new wavelet plane may be associated with the ROI.

<Mask Adjustment Instruction #4 in Case of Using 5×3 Filter>

In accordance with the mask adjustment instruction #4 (MODE=L and LSEL=OR), the first and second restoration conditions are defined as follows.

The first restoration condition: When the n-th data of the low-frequency component on the current wavelet plane are associated with the ROI by the current mask, the new mask is formed so that the 2n-th data on the new wavelet plane may be associated with the ROI.

Herein, since only the n-th of low-frequency component is a candidate, the first restoration condition in this case is the same as that of the mask adjustment instruction #3.

The second restoration condition: When at least one of the n-th data and the {n+1}th data of the low-frequency component on the current wavelet plane are associated with the ROI by the current mask, the new mask is formed so that the {2n+1}th data on the new wavelet plane may be associated with the ROI.

<Mask Adjustment Instruction #6 in Case of Using 5×3 Filter>

In accordance with the mask adjustment instruction #6 (MODE=LH, LSEL=AND, and HSEL=OR), the first and second restoration conditions are defined as follows.

The first restoration condition: When the n-th data of the low-frequency component on the current wavelet plane are associated with the ROI by the current mask and at least one of the {n−1}th data and the n-th data of the high-frequency component on the current wavelet plane are associated with the ROI by the current mask, the new mask is formed so that the 2n-th data on the new wavelet plane may be associated with the ROI.

The second restoration condition: When all the n-th data and the {n+1}th data of the low-frequency component on the current wavelet plane are associated with the ROI by the current mask and at least one of the {n−1}th data to the {n+1}th data of the high-frequency component on the current wavelet plane are associated with the ROI by the current mask, the new mask is formed so that the {2n+1}th data on the new wavelet plane may be associated with the ROI.

<Mask Adjustment Instruction #7 in Case of Using 5×3 Filter>

In accordance with the mask adjustment instruction #7 (MODE=LH, LSEL=OR, and HSEL=OR), the first and second restoration conditions are defined as follows.

The first restoration condition: When the n-th data of the low-frequency component on the current wavelet plane are associated with the ROI by the current mask and at least one of the {n−1}th data and the n-th data of the high-frequency component on the current wavelet plane are associated with the ROI by the current mask, the new mask is formed so that the 2n-th data on the new wavelet plane may be associated with the ROI.

Herein, since only the n-th of low-frequency component is a candidate, the first restoration condition in this case is the same as that of the mask adjustment instruction #6.

The second restoration condition: When at least one of the n-th data and the {n+1}th data of the low-frequency component on the current wavelet plane are associated with the ROI by the current mask and at least one of the {n−1}th data to the {n+1}th data of the high-frequency component on the current wavelet plane are associated with the ROI by the current mask, the new mask is formed so that the {2n+1}th data on the new wavelet plane may be associated with the ROI.

<Case of Using Daubechies 9×7 Filter>

Hereinafter, with reference to Table 1, as to the case where the Daubechies 9×7 filter is used for the inverse wavelet transformation, for each mask adjustment instruction, the first and second restoration conditions will be described.

<Mask Adjustment Instructions #1, #2, and #5 in Case of Using Daubechies 9×7 Filter>

In accordance with the mask adjustment instructions #1, #2, and #5 (MODE=LH, LSEL=AND, and HSEL=AND), the first and second restoration conditions are defined as follows.

The first restoration condition: When all the {n−1}th data to the {n+1}th data of the low-frequency component on the current wavelet plane are associated with the ROI by the current mask and all the {n−2}th data to the {n+1}th data of the high-frequency component on the current wavelet plane are associated with the ROI by the current mask, the new mask is formed so that the 2n-th data on the new wavelet plane may be associated with the ROI.

The second restoration condition: When all the {n−1}th data to the {n+2}th data of the low-frequency component on the current wavelet plane are associated with the ROI by the current mask and all the {n−2}th data to the {n+2}th data of the high-frequency component on the current wavelet plane are associated with the ROI by the current mask, the new mask is formed so that the {2n+1}th data on the new wavelet plane may be associated with the ROI.

<Mask Adjustment Instruction #3 in Case of Using Daubechies 9×7 Filter>

In accordance with the mask adjustment instruction #3 (MODE=L and LSEL=AND), the first and second restoration conditions are defined as follows.

The first restoration condition: When all the {n−1}th data to the {n+1}th data of the low-frequency component on the current wavelet plane are associated with the ROI by the current mask, the new mask is formed so that the 2n-th data on the new wavelet plane may be associated with the ROI.

The second restoration condition: When all the {n−1}th data to the {n+2}th data of the low-frequency component on the current wavelet plane are associated with the ROI by the current mask, the new mask is formed so that the {2n+1}th data on the new wavelet plane may be associated with the ROI.

<Mask Adjustment Instruction #4 in Case of Using Daubechies 9×7 Filter>

In accordance with the mask adjustment instruction #4 (MODE=L and LSEL=OR), the first and second restoration conditions are defined as follows.

The first restoration condition: When at least one of the {n−1}th data to the {n+1}th data of the low-frequency component on the current wavelet plane are associated with the ROI by the current mask, the new mask is formed so that the 2n-th data on the new wavelet plane may be associated with the ROI.

The second restoration condition: When at least one of the {n−1}th data to the {n+2}th data of the low-frequency component on the current wavelet plane are associated with the ROI by the current mask, the new mask is formed so that the {2n+1}th data on the new wavelet plane may be associated with the ROI.

<Mask Adjustment Instruction #6 in Case of Using Daubechies 9×7 Filter>

In accordance with the mask adjustment instruction #6 (MODE=LH, LSEL=AND, and HSEL=OR), the first and second restoration conditions are defined as follows.

The first restoration condition: When all the {n−1}th data to the {n+1}th data of the low-frequency component on the current wavelet plane are associated with the ROI by the current mask and at least one of the {n−2}th data to the {n+1}th data of the high-frequency component on the current wavelet plane are associated with the ROI by the current mask, the new mask is formed so that the 2n-th data on the new wavelet plane may be associated with the ROI.

The second restoration condition: When all the {n−1}th data to the {n+2}th data of the low-frequency component on the current wavelet plane are associated with the ROI by the current mask and at least one of the {n−2}th data to the {n+2}th data of the high-frequency component on the current wavelet plane are associated with the ROI by the current mask, the new mask is formed so that the {2n+1}th data on the new wavelet plane may be associated with the ROI.

<Mask Adjustment Instruction #7 in Case of Using Daubechies 9×7 Filter>

In accordance with the mask adjustment instruction #7 (MODE=LH, LSEL=OR, and HSEL=OR), the first and second restoration conditions are defined as follows.

The first restoration condition: When at least one of the {n−1}th data to the {n+1}th data of the low-frequency component on the current wavelet plane are associated with the ROI by the current mask and at least one of the {n−2}th data to the {n+1}th data of the high-frequency component on the current wavelet plane are associated with the ROI by the current mask, the new mask is formed so that the 2n-th data on the new wavelet plane may be associated with the ROI.

The second restoration condition: When at least one of the {n−1}th data to the {n+2}th data of the low-frequency component on the current wavelet plane are associated with the ROI by the current mask and at least one of the {n−2}th data to the {n+2}th data of the high-frequency component on the current wavelet plane are associated with the ROI by the current mask, the new mask is formed so that the {2n+1}th data on the new wavelet plane may be associated with the ROI.

<Mask Adjustment Instruction>

Thus, the above-described specified positions in the first restoration condition and the second restoration condition can be indicated by the mask adjustment instruction. The user can input the mask adjustment instruction by inputting the mode instruction (MODE), the low-frequency selection instruction (LSEL), and the high-frequency selection instruction (HSEL). Alternatively, a plurality of mask adjustment instructions may be defined in advance by combining the mode instruction (MODE), the low-frequency selection instruction (LSEL), and the high-frequency selection instruction (HSEL), like in Table 1, and then the user may select one of the mask adjustment instructions.

Further, the mode instruction (MODE) may be incorporated in each of the low-frequency selection instruction (LSEL) and the high-frequency selection instruction (HSEL). For example, by adding LSEL=NO as the instruction indicating that the low-frequency component is not used and adding HSEL=NO as the instruction indicating that the high-frequency component is not used, it becomes not necessary to separately provide the mode instruction (MODE).

<Mask Development Unit 1255b>

With reference back to FIG. 21, when g2>g1, the mask development unit 1255b performs a mask development process on the mask having a decomposition level of g1 which is supplied from the mask merging unit 1254. Specifically, the mask development unit 1255b develops the mask having a decomposition level of g1 to the sub-band structure having a decomposition level of g2 (>g1). The data of the generated mask having a decomposition level of g2 become the output data (i.e., the mask data) B32 from the mask level conversion unit 1255.

The mask development unit 1255b performs the same operation as that of the mask development unit 1052 in the supply system 11 (see FIG. 7 and FIGS. 13 to 15). For this reason, redundant description will be omitted herein.

Further, the mask development unit 1255b performs the same operation as that of the provisional mask generation unit 1253. For this reason, the mask development unit 1255b can be implemented by the same circuit as the provisional mask generation unit 1253. Conversely, the mask development unit 1255b and the provisional mask generation unit 1253 may be implemented by different circuits.

<Output Data B61 and B41 from Mask Preparation Unit 1250>

In the above-described constitution of the mask preparation unit 1250, the mask having a decomposition level of g1 (the mask data B31) is generated by the mask merging unit 1254, and the mask having a decomposition level of g2 (the mask data B32) is generated by the mask level conversion unit 1255.

When g2=g1, the mask data B31 having a decomposition level of g1 generated by the mask merging unit 1254 are outputted from the mask preparation unit 1250 as the mask data B61 and supplied to the synthesis execution unit 1270.

When g2<g1, the mask data B32 having a decomposition level of g2 generated by the mask level conversion unit 1255 (in detail, the mask restoration unit 1255a) are outputted from the mask preparation unit 1250 as the mask data B61 and supplied to the synthesis execution unit 1270.

When g2>g1, the mask data B32 having a decomposition level of g2 generated by the mask level conversion unit 1255 (in detail, the mask development unit 1255b) are outputted from the mask preparation unit 1250 as the mask data B61 and supplied to the synthesis execution unit 1270. Further, the mask data B31 having a decomposition level of g1 generated by the mask merging unit 1254 are outputted from the mask preparation unit 1250 as the mask data B41 and supplied to the first preparation unit 1230.

<Operation of Mask Preparation Unit 1250>

Figure 34:
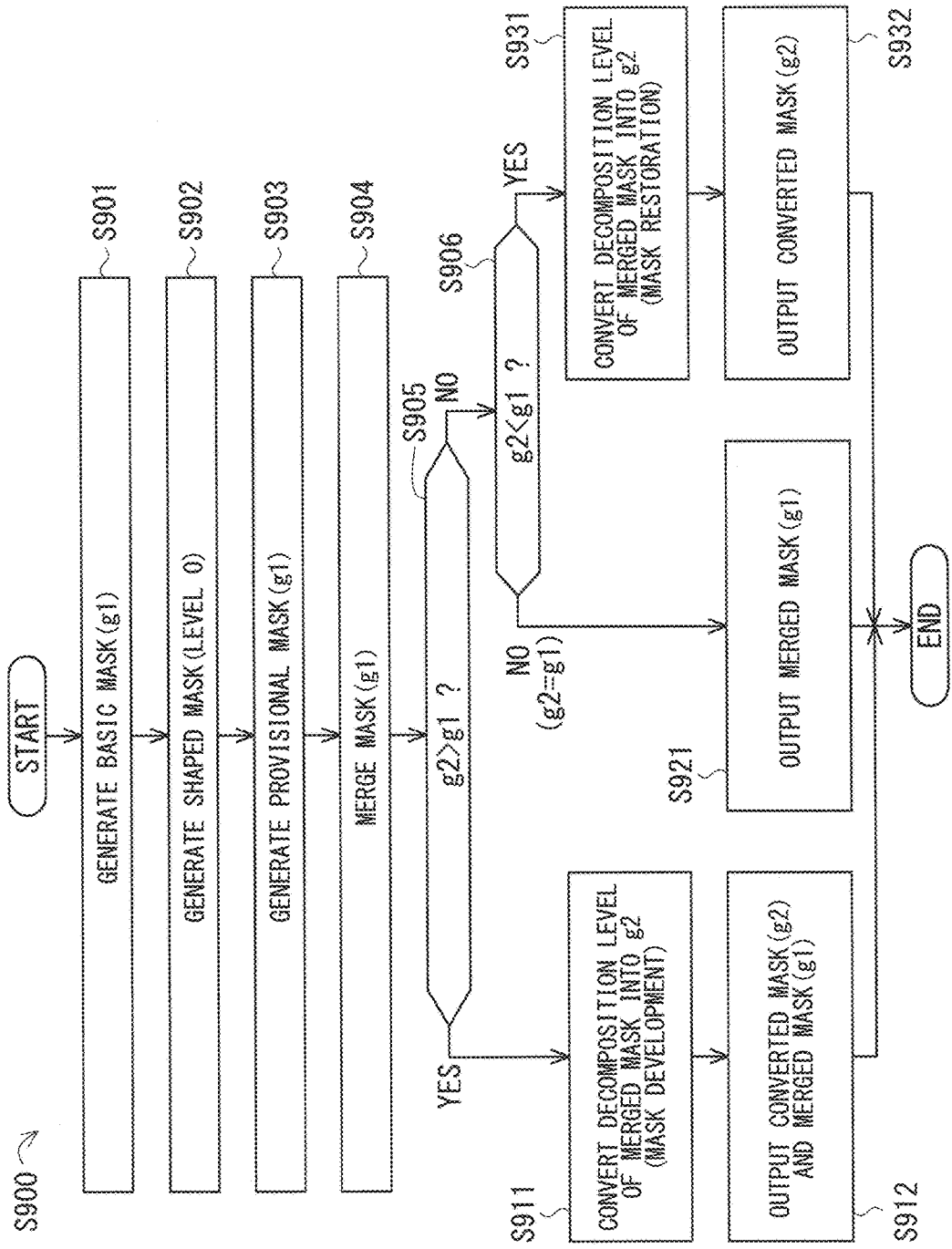
FIG. 34 is a flowchart showing an operation of the mask preparation unit in accordance with the first preferred embodiment.

FIG. 34 is a flowchart showing an operation of the mask preparation unit 1250. In accordance with a mask preparation flow S900 of FIG. 34, in Step S901, the basic mask generation unit 1251 generates the basic mask. In the flow of FIG. 22, for example, the non-reference type mask having a decomposition level of g1 and the reference type mask having a decomposition level of g1 are generated. After that, in Step S902, the mask shaping unit 1252 generates the shaped mask of decomposition level 0 from the non-reference type mask or the reference type mask. Further, when the shaped mask is generated from the non-reference type mask, the generation of the reference type mask may be omitted in above-described Step S901.

Next, in Step S903, the provisional mask generation unit 1253 generates the provisional mask having a decomposition level of g1 from the shaped mask of decomposition level 0. Then, in Step S904, the mask merging unit 1254 merges the provisional mask having a decomposition level of g1 and the non-reference type mask having a decomposition level of g1.

After that, in accordance with the result of comparison between g1 and g2, a process to be performed is determined. Specifically, when g2>g1 (see Step S905), the mask level conversion unit 1255 performs the mask development process to convert the decomposition level of the merged mask from g1 into g2 (Step S911). Then, the mask level conversion unit 1255 outputs a converted mask having a decomposition level of g2 to the synthesis execution unit 1270 and outputs the merged mask having a decomposition level of g1 to the first preparation unit 1230 (Step S912).

On the other hand, when g2<g1 (see Steps S905 and S906), the mask level conversion unit 1255 performs the mask restoration process to convert the decomposition level of the merged mask from g1 to g2 (Step S931). Then, the mask level conversion unit 1255 outputs the converted mask having a decomposition level of g2 to the synthesis execution unit 1270 (Step S932).

Alternatively, when g2=g1 (see Steps S905 and S906), the mask merging unit 1254 outputs the merged mask having a decomposition level of g1 to the synthesis execution unit 1270 (Step S921).

<Specific Example of First Preparation Unit 1230>

FIG. 35 shows an exemplary constitution of the first preparation unit 1230. As can be seen from FIG. 35, the first preparation unit 1230 includes an inverse quantization unit 1231, a level decrease unit 1232, a coefficient adjustment unit 1233, and a level increase unit 1234.

<Inverse Quantization Unit 1231>

The inverse quantization unit 1231 performs inverse quantization on the quantized wavelet coefficient data A22 acquired from the decoding unit 1220. Herein, the inverse quantization is an inverse processing of the quantization performed by the quantization unit 1040 shown in FIG. 3. By performing the inverse quantization, the quantized wavelet coefficient data A22 are converted into the first wavelet coefficient data A31. The decomposition level of the first wavelet coefficient data A31 is g1 which is the same as that of the quantized wavelet coefficient data A22.

When g2=g1, the first wavelet coefficient data A31 having a decomposition level of g1 generated by the inverse quantization unit 1231 are outputted as output data A61 of the first preparation unit 1230 and supplied to the synthesis execution unit 1270.

On the other hand, when g2<g1, the first wavelet coefficient data A31 are supplied to the level decrease unit 1232.

Further, when g2>g1, the first wavelet coefficient data A31 are supplied to the coefficient adjustment unit 1233.

<Level Decrease Unit 1232>.

When g2<g1, the level decrease unit 1232 performs inverse wavelet transformation on the first wavelet coefficient data A31 having a decomposition level of g1 which are generated by the inverse quantization unit 1231, until the decomposition level becomes g2. By this inverse wavelet transformation, first wavelet coefficient data A32 having a decomposition level of g2 are generated.

The inverse wavelet transformation is the same operation as that performed by the synthetic image data generation unit 1280. The level decrease unit 1232 and the synthetic image data generation unit 1280 may be implemented by the same circuit, or may be implemented by different circuits.

The first wavelet coefficient data A32 having a decomposition level of g2 which are generated by the level decrease unit 1232 are outputted as the output data A61 of the first preparation unit 1230 in the case of g2<g1 and supplied to the synthesis execution unit 1270.

<Coefficient Adjustment Unit 1233>

The coefficient adjustment unit 1233 adjusts the first wavelet coefficient data A31 generated by the inverse quantization unit 1231 by performing a predetermined coefficient adjustment process. In order to perform the coefficient adjustment process, the coefficient adjustment unit 1233 acquires auxiliary wavelet coefficient data A41.

The auxiliary wavelet coefficient data A41 are wavelet coefficient data for an auxiliary image. The decomposition level of the auxiliary wavelet coefficient data A41 is g1 which is the same as that of the first wavelet coefficient data A31.

The auxiliary image is an image which can be equated with the first image and is obtained, for example, by capturing an image of a space in which the first image is captured. More specifically, an image captured in a state where there is no moving object which is to be set as an ROI can be used as the auxiliary image, and such an auxiliary image can be acquired from the supply system 11. Alternatively, as the auxiliary image, a synthetic image which has been generated in the past (for example, a synthetic image antecedent by a predetermined number of frames in a moving image) can be used. In the past synthetic image, there may be a person or persons. Further, the second image may be used as the auxiliary image.

In order to perform the coefficient adjustment process, the coefficient adjustment unit 1233 further acquires the data B41 of the mask (herein, the merged mask) having a decomposition level of g1 from the mask preparation unit 1250.

In the coefficient adjustment process, the first wavelet coefficient data A31 having a decomposition level of g1 and the auxiliary wavelet coefficient data A41 having a decomposition level of g1 are synthesized on the basis of the mask data B41 having a decomposition level of g1. By this synthesis, adjusted first wavelet coefficient data A31 are generated. The decomposition level of the adjusted first wavelet coefficient data A31 is g1. The coefficient adjustment process is performed like the synthesis execution process performed by the synthesis execution unit 1270.

Specifically, the coefficient adjustment unit 1233 determines the ROI coefficient and the non-ROI coefficient in the first wavelet coefficient data A31 on the basis of the mask data B41 (the coefficient determination process). On the basis of the determination result, the coefficient adjustment unit 1233 synthesizes the ROI coefficient in the first wavelet coefficient data A31 and a coefficient in the auxiliary wavelet coefficient data A41 (in detail, a coefficient corresponding to the non-ROI coefficient in the first wavelet coefficient data A31) (the coefficient synthesis process). The adjusted first wavelet coefficient data A31 are thereby generated. More specifically, the coefficient adjustment process is performed like the synthesis execution process S300 (see FIGS. 18 and 19).

In consideration of the similarity between the coefficient adjustment process and the synthesis execution process, the coefficient adjustment unit 1233 can be implemented by the same circuit as the synthesis execution unit 1270. Conversely, the coefficient adjustment unit 1233 and the synthesis execution unit 1270 may be implemented by different circuits.

In the above description, it is assumed that the auxiliary wavelet coefficient data A41 itself are supplied to the coefficient adjustment unit 1233. On the other hand, there may be another case where the coefficient adjustment unit 1233 acquires auxiliary image data and performs wavelet transformation on the auxiliary image data until the decomposition level becomes g1, to thereby generate the auxiliary wavelet coefficient data A41.

The first wavelet coefficient data A31 adjusted by the coefficient adjustment unit 1233 are supplied to the level increase unit 1234.

<Level Increase Unit 1234>

The level increase unit 1234 performs wavelet transformation on the adjusted first wavelet coefficient data A31 until the decomposition level becomes g2. By this wavelet transformation, first wavelet coefficient data A33 having a decomposition level of g2 are generated.

The wavelet transformation can be performed like the operation performed by the second preparation unit 1240. The level increase unit 1234 and the second preparation unit 1240 may be implemented by the same circuit, or may be implemented by different circuits.

The first wavelet coefficient data A33 having a decomposition level of g2 which are generated by the level increase unit 1234 are outputted as the output data A61 of the first preparation unit 1230 in the case of g2>g1 and supplied to the synthesis execution unit 1270.

<Variation of Coefficient Adjustment Unit 1233>

As described above, the level increase unit 1234 performs the wavelet transformation on the first wavelet coefficient data A31 adjusted by the coefficient adjustment unit 1233. Herein, in the Mallat-type wavelet transformation, only the LL sub-band is recursively decomposed. In this case, in the adjusted first wavelet coefficient data A31, only the LL sub-band is decomposed.

For this reason, the coefficient adjustment process may be performed only on the LL sub-band in the first wavelet coefficient data A31 before being adjusted. This can reduce the throughput. Further, in that case, the auxiliary wavelet coefficient data A41 only has to include at least the data for the LL sub-band.

<Operation of Synthesizing System 21>

Figure 36:
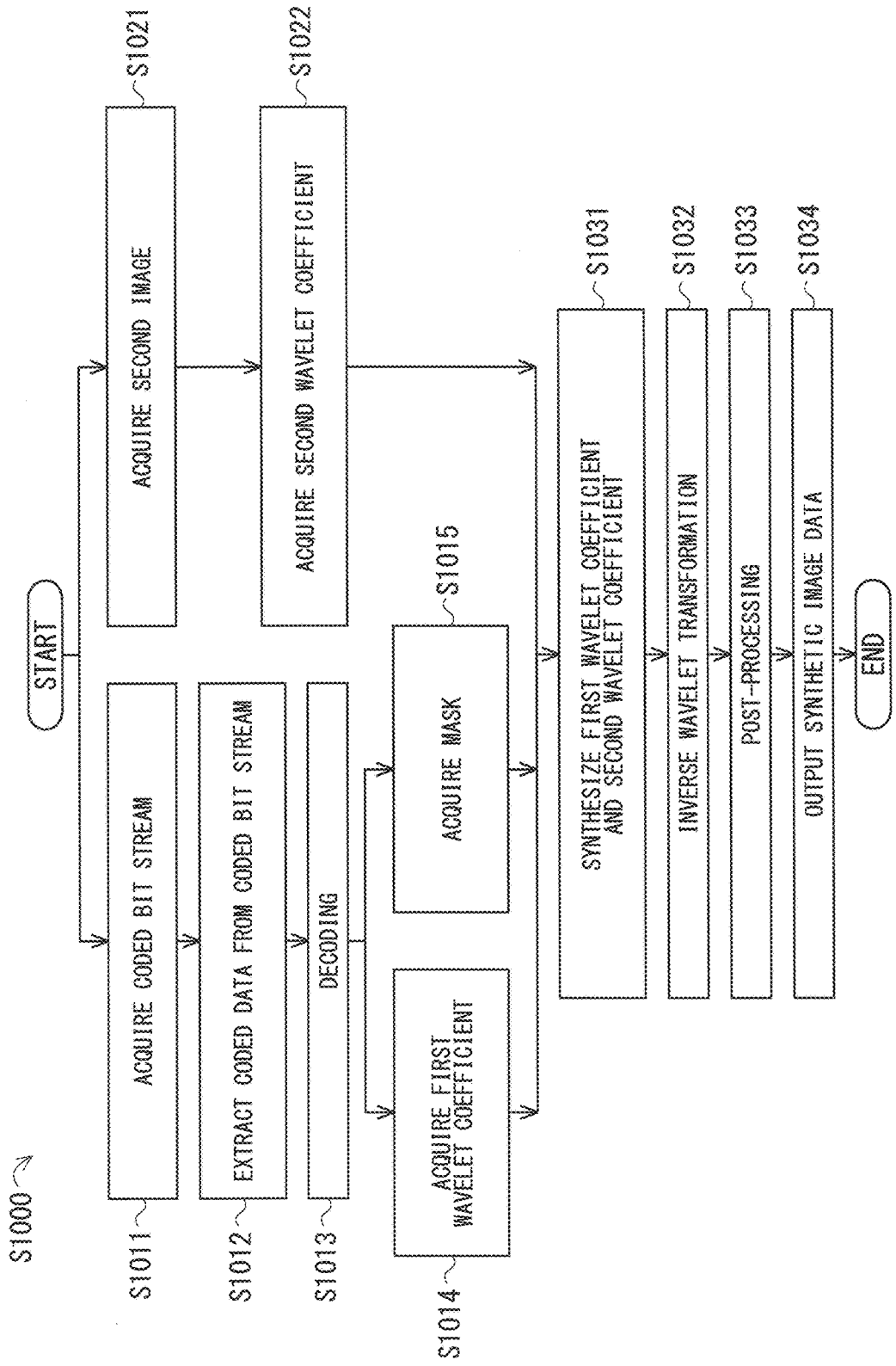
FIGS. 36 and 37 are flowcharts each showing an operation of the image synthesizing system in accordance with the first preferred embodiment.

FIG. 36 is a flowchart showing an operation of the synthesizing system 21. In an operation flow S1000 of FIG. 36, when the coded bit stream Abs is inputted to the synthesizing system 21, the bit stream analysis unit 1210 acquires the coded bit stream Abs (Step S1011) and extracts the coded data A50 from the coded bit stream Abs (Step S1012).

Then, the decoding unit 1220 decodes the coded data A50, to thereby generate the quantized wavelet coefficient data A22 (Step S1013). The first preparation unit 1230 generates the first wavelet coefficient data A61 from the quantized wavelet coefficient data A22 (Step S1014). Further, the mask preparation unit 1250 generates the mask data B61 from the quantized wavelet coefficient data A22 (Step S1015). Though Steps S1014 and S1015 are concurrently performed in the exemplary operation flow of FIG. 36, Step S1014 may be performed before or after Step S1015.

Herein, when the second image data D20 are inputted to the synthesizing system 21, the second preparation unit 1240 acquires the second image data D20 (Step S1021) and generates the second wavelet coefficient data D61 from the second image data D20 (Step S1022).

After Steps S1014, S1015, and S1022, the synthesis execution unit 1270 synthesizes the first wavelet coefficient data A61 and the second wavelet coefficient data D61, to thereby generate the synthesized coefficient data E61 (Step S1031). Then, the synthetic image data generation unit 1280 performs the inverse wavelet transformation on the synthesized coefficient data E61 (Step S1032). The synthetic image data E80 are thereby generated.

After that, the post-processing unit 1290 performs the predetermined post-processing on the synthetic image data E80 (Step S1033), and the synthetic image data E100 after being subjected to the processing of Step S1033 are outputted from the synthesizing system 21 (Step S1034).

Figure 37:
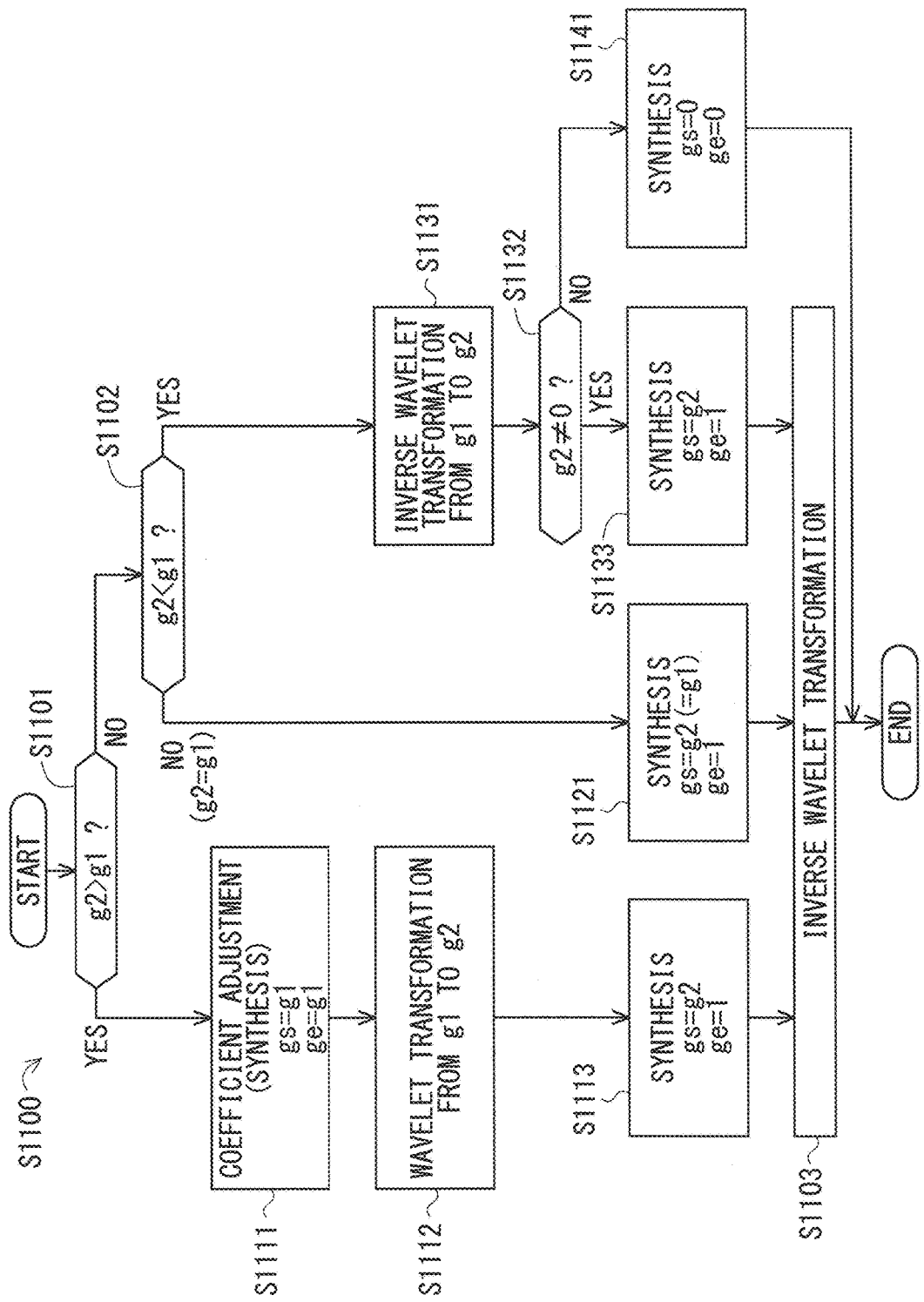

Herein, more specific flowchart of Steps S1014, S1031, and S1032 is shown in FIG. 37. In accordance with an operation flow S1100 of FIG. 37, in Step S1101, the first preparation unit 1230 determines whether g2>g1 is satisfied or not.

When g2>g1 is satisfied, in Step S1111, the coefficient adjustment unit 1233 in the first preparation unit 1230 adjusts the first wavelet coefficient data A31 on the basis of the auxiliary wavelet coefficient data A41. Since the coefficient adjustment process is performed like the synthesis execution process, as described above, the coefficient adjustment unit 1233 performs the synthesis execution process S300 with gs=g1 and ge=g1 (see FIGS. 18 and 19). The adjusted first wavelet coefficient data A31 are thereby generated. Further, in accordance with the setting of gs=g1 and ge=g1, the coefficient adjustment process is performed only on the LL sub-band.

Next, in Step S1112, the level increase unit 1234 in the first preparation unit 1230 generates the first wavelet coefficient data A61 having a decomposition level of g2 from the adjusted first wavelet coefficient data A31. Further, though omitted in FIG. 37, the mask development unit 1255b in the mask preparation unit 1250 generates the mask having a decomposition level of g2.

Then, in Step S1113, the synthesis execution unit 1270 performs the synthesis execution process S300 with gs=g2 and ge=1 (see FIGS. 18 and 19). After that, in Step S1103, the synthetic image data generation unit 1280 generates the synthetic image data E80 from the synthesized coefficient data E61.

On the other hand, when g2>g1 is not satisfied in Step S1101, the first preparation unit 1230 determines whether g2<g1 is satisfied or not in Step S1102. When g2<g1 is not satisfied in Step S1102, g2=g1. In this case, the first wavelet coefficient data A31 and the mask data B31 are supplied to the synthesis execution unit 1270, without any processing performed thereon, as the first wavelet coefficient data A61 and the mask data B61. The synthesis execution unit 1270 performs the synthesis execution process S300 with gs=g2 (=g1) and ge=1 in Step S1121 (see FIGS. 18 and 19). The synthesized coefficient data E61 are thereby generated.

After that, in Step S1103, the synthetic image data E80 are generated form the synthesized coefficient data E61.

On the other hand, when g2<g1 is satisfied in Step S1102, the level decrease unit 1232 in the first preparation unit 1230 generates the first wavelet coefficient data A61 having a decomposition level of g2 from the first wavelet coefficient data A31. Though omitted in FIG. 37, the mask restoration unit 1255a in the mask preparation unit 1250 generates the mask having a decomposition level of g2.

Next, in Step S1132, the synthesis execution unit 1270 determines whether g2≠0 is satisfied or not.

When g2≠0 is satisfied, the synthesis execution unit 1270 performs the synthesis execution process S300 with gs=g2 and ge=1 in Step S1133 (see FIGS. 18 and 19). After that, in Step S1103, the synthetic image data E80 are generated from the synthesized coefficient data E61.

On the other hand, when g2≠0 is not satisfied in Step S1132, g2=0. In this case, the first wavelet coefficient data A61 are converted into the data of decomposition level 0, i.e., the original image level in Step S1131. Further, the mask data B61 are also converted into the original mask level. In this case, it is not necessary to perform the wavelet transformation on the second image. Specifically, the second preparation unit 1240 supplies the second image data D20 to the synthesis execution unit 1270 as the second wavelet coefficient data D61 of decomposition level 0.

After that, in Step S1141, the synthesis execution unit 1270 performs the synthesis execution process S300 with gs=0 and ge=0 (see FIGS. 18 and 19). The synthesized coefficient data E61 are thereby generated. Herein, since the synthesis is performed on the original image level in Step S1141, the synthesized coefficient data E61 generated in Step S1141 become the synthetic image data E80 without any processing performed thereon. For this reason, after Step S1141, Step S1103 is not performed.

As can be seen from the flow of Steps S1132 and S1141, g2=0 is allowed in the operation flow S1100 of FIG. 37, and for this reason, g2 is an integer not smaller than 0. On the other hand, a condition for use that g2 is an integer larger than 0 may be imposed. In that case, Steps S1132 and S1141 are omitted.

<Exemplary Images>

Figure 38:
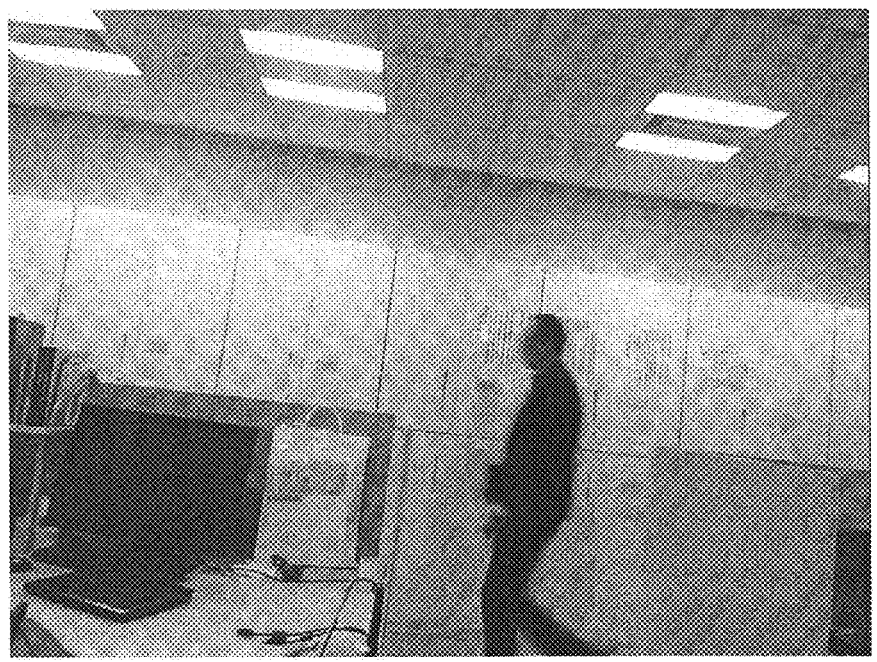
FIG. 38 is a view showing another exemplary first image in accordance with the first preferred embodiment.
Figure 39:
FIG. 39 is a view showing a mask for the image of FIG. 38.

First, for the purpose of reference, shown are FIGS. 38 to 40. FIG. 38 shows an example of the first image, and it is assumed in FIG. 38 that a moving person is set as an ROI. FIG. 39 shows an example of the original mask used in the supply system 11 to determine the ROI in FIG. 38. FIG. 40 shows a mask obtained by developing the mask of FIG. 39 to decomposition level 5.

Figure 42:
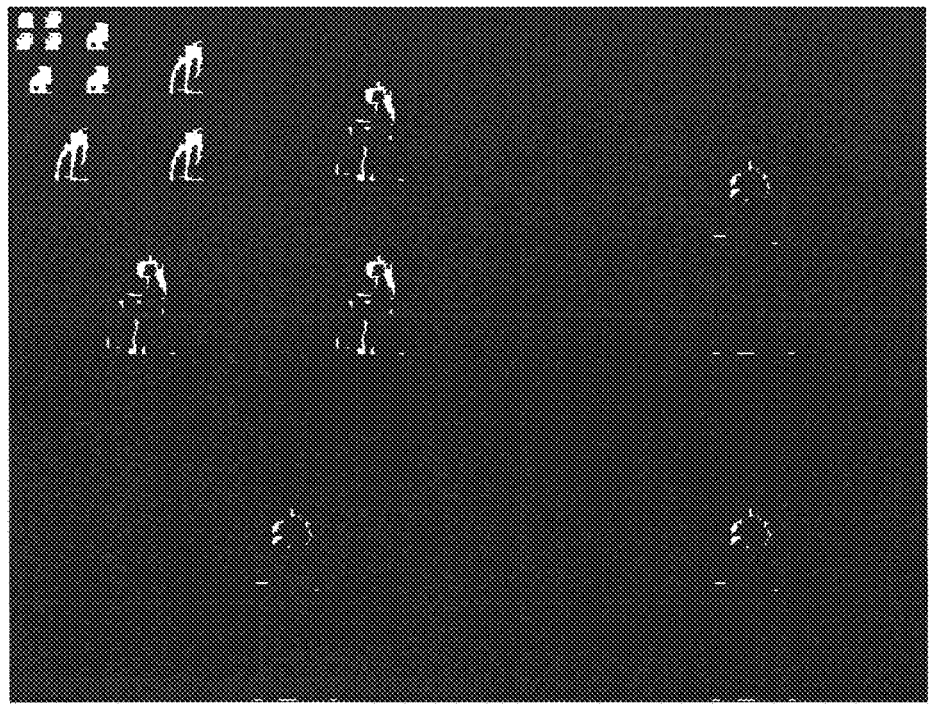
FIG. 42 is a view showing a reference type mask for the image of FIG. 38.
Figure 43:
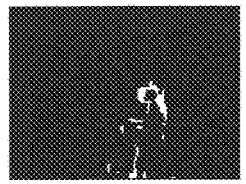
FIG. 43 is a view showing a mask obtained by performing a morphology processing on the sub-band mask of decomposition level 2 shown in FIG. 42.
Figure 44:
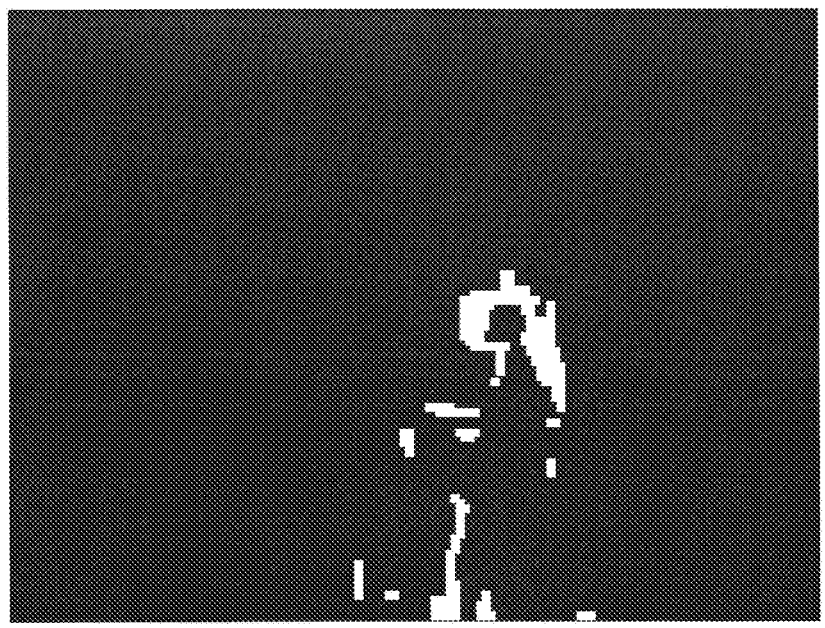
FIG. 44 is a view showing a mask (shaped mask) obtained by enlarging the mask of FIG. 43.
Figure 45:
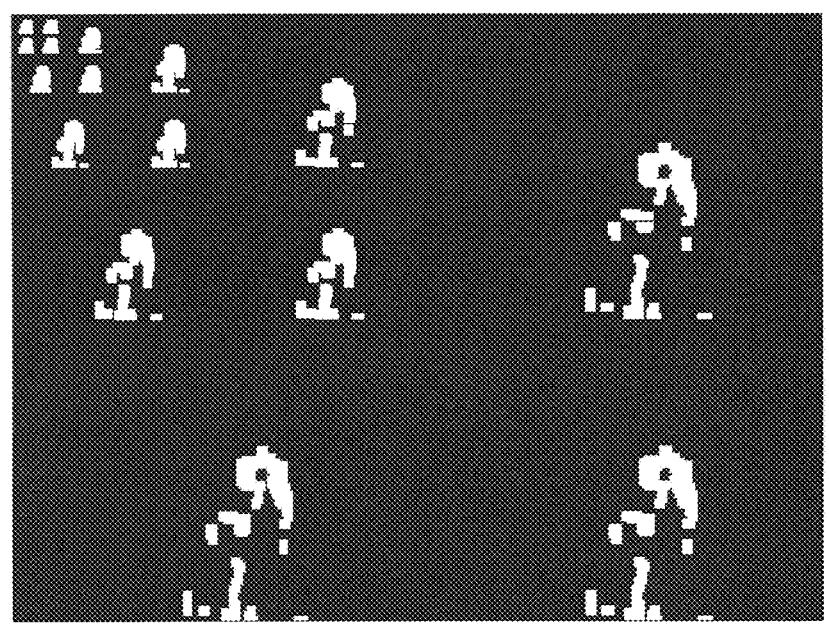
FIG. 45 is a view showing a provisional mask obtained by developing the mask of FIG. 44 to decomposition level 5.
Figure 46:
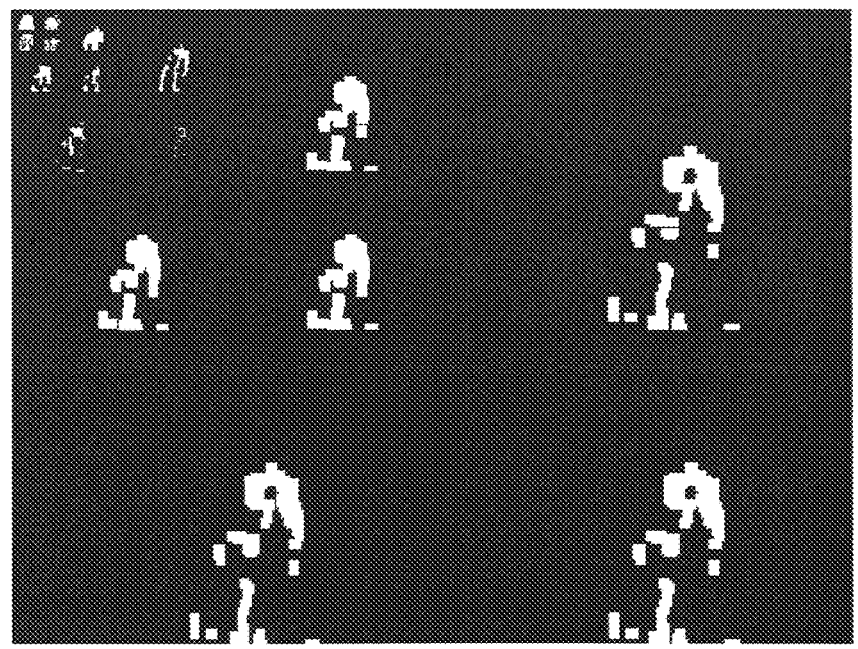
FIG. 46 is a view showing a merged mask obtained by merging the non-reference type mask of FIG. 41 and the provisional mask of FIG. 45.

FIGS. 41 and 42 show respective examples of the non-reference type mask and the reference type mask for the image of FIG. 38. FIG. 43 shows a mask obtained by performing the morphology processing on the sub-band mask of decomposition level 2 shown in FIG. 42. FIG. 44 shows a mask obtained by enlarging the mask of FIG. 43, i.e., the shaped mask. FIG. 45 shows the provisional mask obtained by developing the shaped mask of FIG. 44 until the decomposition level becomes 5. FIG. 46 is a view showing the merged mask obtained by merging the non-reference type mask of FIG. 41 and the provisional mask of FIG. 45. Further, gm=2 in FIG. 46 (see Step S702 of FIG. 28).

Figure 47:
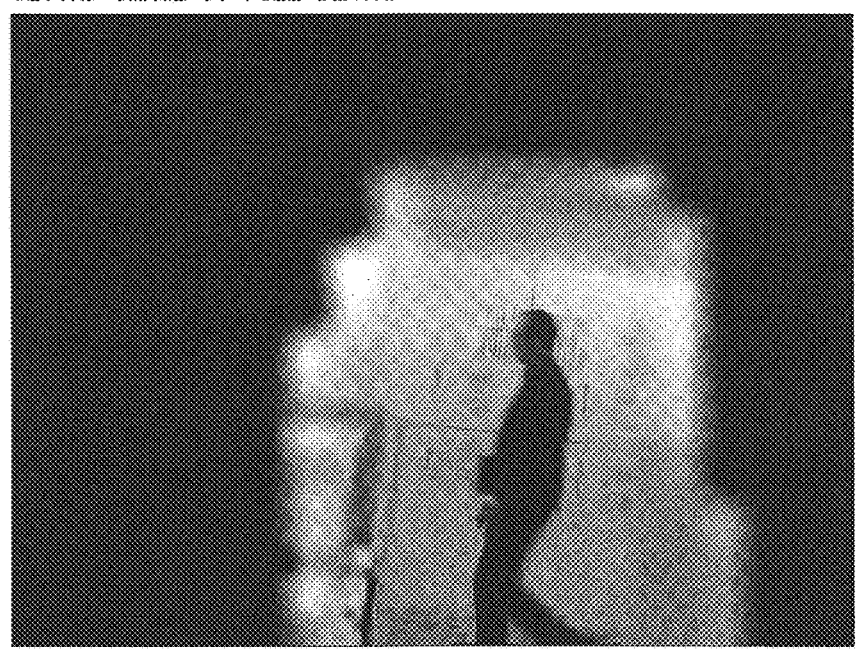

The synthetic images using the mask of FIG. 46 are shown in FIGS. 47 and 48. In FIGS. 47 and 48, g2=g1=5. Specifically, the decomposition level g1 of the quantized wavelet coefficient data A22 supplied from the supply system 11 is 5 and the decomposition level g2 in the synthesis execution process is also 5.

In FIG. 47, the second image is an image of full black. As can be seen from FIG. 47, not only the person set as the ROI but also the surrounding region of the person are shown on the black background. Specifically, it can be seen that the first wavelet coefficient data A61 for the first image include not only the data on the ROI but also the data on the ROI surrounding region.

This is caused by the image synthesis achieved by using the wavelet coefficient. Specifically, in the wavelet transformation, not only image information of specified coordinates to be processed but also image information of surrounding coordinates are used. For this reason, in the supply system 11, a mask shape is determined to include also image information of the ROI surrounding region to be used in the wavelet transformation. The image information of the ROI can be thereby held with high accuracy even after the wavelet transformation. Such a mask shape is reflected on the quantized wavelet coefficient value and taken over to the synthesizing system 21. Therefore, such an image as shown in FIG. 47 can be obtained.

In FIG. 48, the second image is an image which can be equated with the first image and is obtained, for example, by capturing an image of a space in which the first image is captured. More specifically, an image captured in a state where there is no moving object which is to be set as the ROI can be used as the second image, and such a second image can be acquired from the supply system 11. Alternatively, as the second image, a synthetic image which has been generated in the past (for example, a synthetic image antecedent by a predetermined number of frames in a moving image) can be used. In the past synthetic image, there may be a person. This is because a wide image on the first image side (see FIG. 47) is superposed over the person.

The example shown in FIG. 48 can be applied to a so-called fixed-point photographing, and it is thereby possible to reduce the amount of data to be transferred from the supply system 11 (serving as the image capture side) to the synthesizing system 21. This is because the first image is quantized so that the wavelet coefficient not related to the ROI may become 0.

Further, the second image is not limited to the examples shown in FIGS. 47 and 48.

Figure 50:
FIGS. 50 and 51 are views each showing a synthetic image using the mask of FIG. 49.
Figure 51:
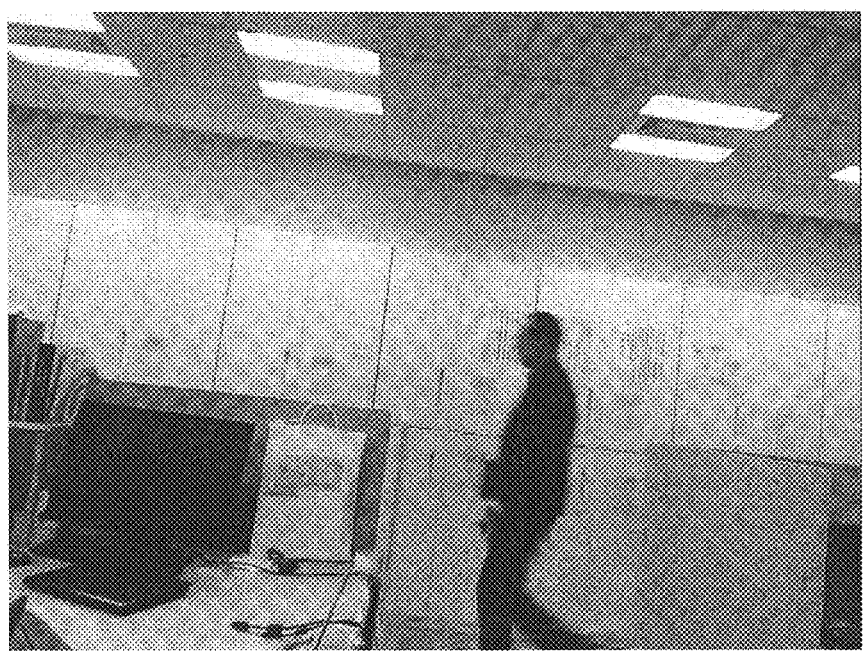

FIG. 49 shows a mask obtained by developing the mask of FIG. 46 until the decomposition level becomes 6. The synthetic images using the mask of FIG. 49 are shown in FIGS. 50 and 51. In FIGS. 49 to 51, g2=6 and g1=5 and therefore g2>g1. Like in FIG. 47, in FIG. 50, the second image is an image of full black. Like in FIG. 48, in FIG. 51, the second image is an image which can be equated with the first image.

Figure 54:
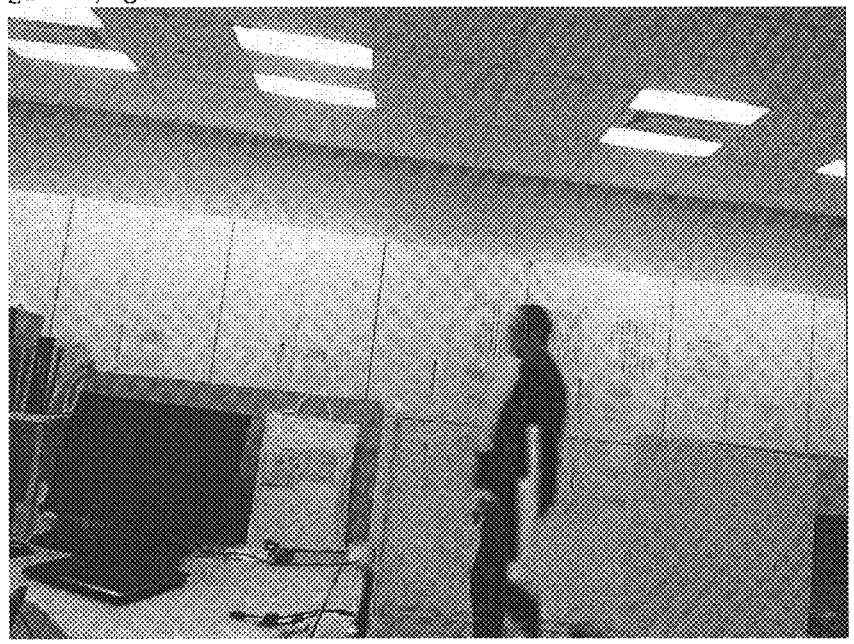

FIG. 52 shows a mask obtained by restoring the mask of FIG. 46 until the decomposition level becomes 3. Further, the synthetic images using the mask of FIG. 52 are shown in FIGS. 53 and 54. In FIGS. 52 to 54, g2=3 and g1=5 and therefore g2<g1. In FIG. 53, the second image is an image of full black. In FIG. 54, the second image is an image which can be equated with the first image.

Figure 55:
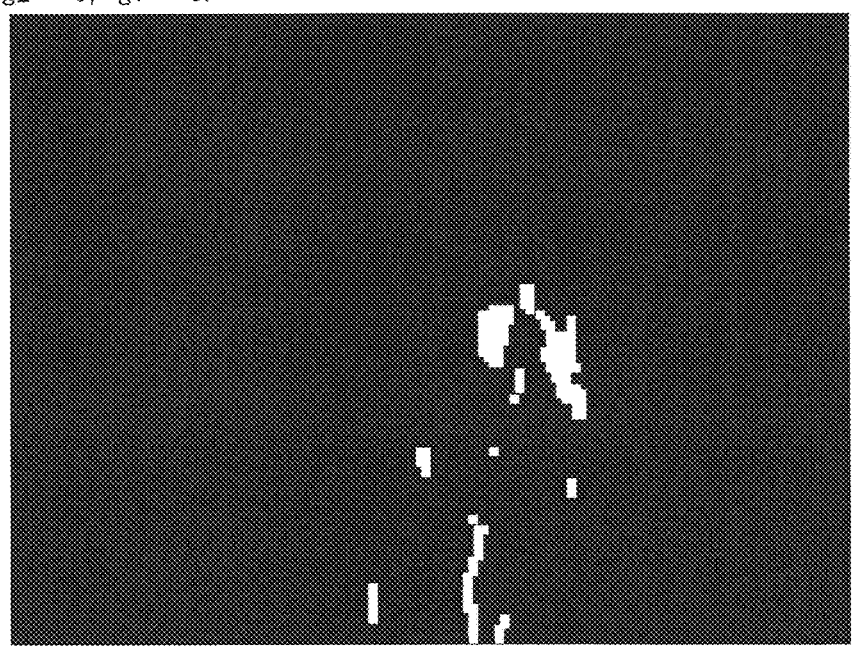
FIG. 55 is a view showing a mask obtained by restoring the mask of FIG. 46 to decomposition level 0.
Figure 56:
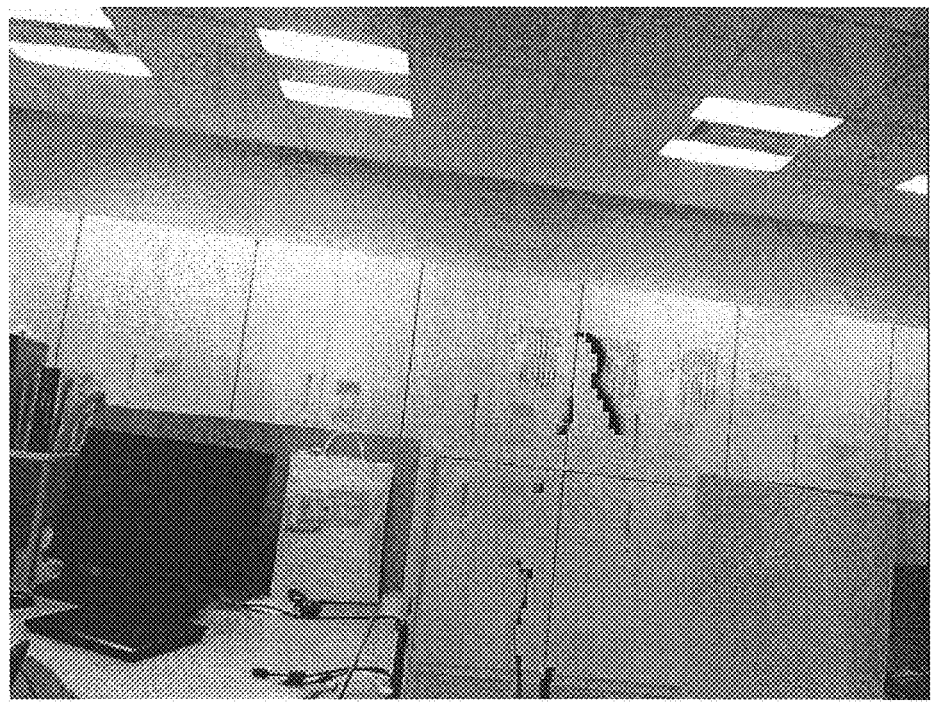
FIG. 56 is a view showing a synthetic image using the mask of FIG. 55.

FIG. 55 shows a mask obtained by restoring the mask of FIG. 46 until the decomposition level become 0. Further, the synthetic image using the mask of FIG. 55 is shown in FIG. 56. In FIGS. 55 to 56, g2=0 and g1=5 and therefore g2<g1. In FIG. 56, the second image is an image which can be equated with the first image.

<Effects>

In accordance with the first preferred embodiment, the synthesis between the ROI in the first image and the second image is performed by using the first wavelet coefficient data A61 and the second wavelet coefficient data D61. Further, the determination of the ROI in the first image is performed by determining the ROI coefficient in the first wavelet coefficient data A61. This coefficient determination is performed on the basis of the mask data B61 for the first wavelet coefficient data A61.

As described above, in the wavelet transformation, not only the image information of the specified coordinates to be processed but also the image information of the surrounding coordinates are used. The same applies to the generation of the mask for the wavelet coefficient. For this reason, in the first preferred embodiment, a more excellent synthetic image can be achieved as compared with the case where the first image data and the second image data themselves are synthesized. Specifically, even when an insufficient ROI having a defective portion on the contour thereof and/or in the inside thereof is used (in other words, even when an original mask for such an insufficient ROI is used), a repaired ROI can be provided on the synthetic image.

Further, in the synthesizing system 21, it is possible to control the decomposition level in the image synthesis with g2. The state of synthesis (repair of the ROI, extension of the ROI, and the like) can be thereby adjusted.

In consideration of these points, in the first preferred embodiment, it is not necessary to use any high-cost technique for setting of the ROI. In other words, it is possible to generate an excellent synthetic image with low cost.

Further, as described above, the quantization unit 1040 in the supply system 11 performs the quantization of the first wavelet coefficient data A21 so that the non-ROI coefficient after the quantization may become 0. Therefore, it is not necessary to output the mask data itself from the supply system 11. For this reason, when the supply system 11 and the synthesizing system 21 perform wired or wireless communication with each other, reduction in the amount of communication is achieved and this contributes to the immediacy of transfer. As a result, it is possible to speed up the image synthesis, in other words, increase the immediacy of the image synthesis.

Further, as the method of reflecting the mask data on the quantized wavelet coefficient, used is the Max-shift method which is an optional function of JPEG 2000. In accordance with the Max-shift method, scale-up and scale-down of the wavelet coefficient are performed in the quantization and the inverse quantization. On the other hand, in the first preferred embodiment, it is not necessary to perform such a scaling processing.

Herein, there may be a case where the coefficient adjustment unit 1233 is omitted from the first preparation unit 1230 and the first wavelet coefficient data A31 generated by the inverse quantization unit 1231 are directly supplied to the level increase unit 1234. Provision of the coefficient adjustment unit 1233, however, makes it possible to achieve an excellent synthetic image. The reason is as follows.

Specifically, the quantized wavelet coefficient data A22 which is a source of the first wavelet coefficient data A61 are generated so that the non-ROI coefficient after the quantization may become 0. Even if the quantized wavelet coefficient data A22 are inverse quantized, the first wavelet coefficient data A31 on the side of the synthesizing system 21 sometimes have low reproducibility as compared with the first wavelet coefficient data A21 on the side of the supply system 11. Then, by taking the auxiliary wavelet coefficient data A41 (i.e., the wavelet coefficient data of the auxiliary image which can be equated with the first image) into the first wavelet coefficient data A31, the first wavelet coefficient data A61 are improved. As a result, the image quality of the synthetic image is increased.

Further, as described above, the supply system 11 performs the quantization on the wavelet coefficient data A21 so that the non-ROI coefficient may become 0. At that time, the ROI coefficient having a small value is sometimes converted to 0. On the other hand, in the synthesizing system 21, the non-reference type mask and the reference type mask are generated on the basis of the determination on whether each coefficient value of the quantized wavelet coefficient data A22 is 0 or not. Therefore, the ROI coefficient having a coefficient value which has been converted to 0 by the quantization is determined as the non-ROI coefficient. For this reason, the non-reference type mask of FIG. 41 and the reference type mask of FIG. 42 sometimes do not coincide with the mask of FIG. 40 (used in the supply system 11).

The merged mask of FIG. 46, however, is close to the mask of FIG. 40 (used in the supply system 11), as compared with the non-reference type mask of FIG. 41 and the reference type mask of FIG. 42. Specifically, in the mask preparation unit 1250, the mask which is closer to the mask used in the supply system 11 can be generated from the quantized wavelet coefficient data A22 generated so that the non-ROI coefficient may become 0.

Herein, as to the sub-band having a low decomposition level, the ROI corresponding portion (white portion) of the provisional mask shown in FIG. 45 is wider than the ROI corresponding portion of the non-reference type mask shown in FIG. 41. This is because the provisional mask is subjected to the morphology processing and the enlargement processing. In the wavelet image, generally, the low decomposition side sub-band provides an essential structure of the original image. For this reason, it is preferable that a wide ROI corresponding portion is present in the low decomposition side sub-band of the merged mask. In consideration of this point, it is preferable that the provisional mask should be adopted for a predetermined low decomposition side sub-band of the merged mask and the non-reference type mask should be adopted for the remaining sub-band(s), i.e., a predetermined high decomposition side sub-band in the merged mask.

The Second Preferred Embodiment

Figure 57:
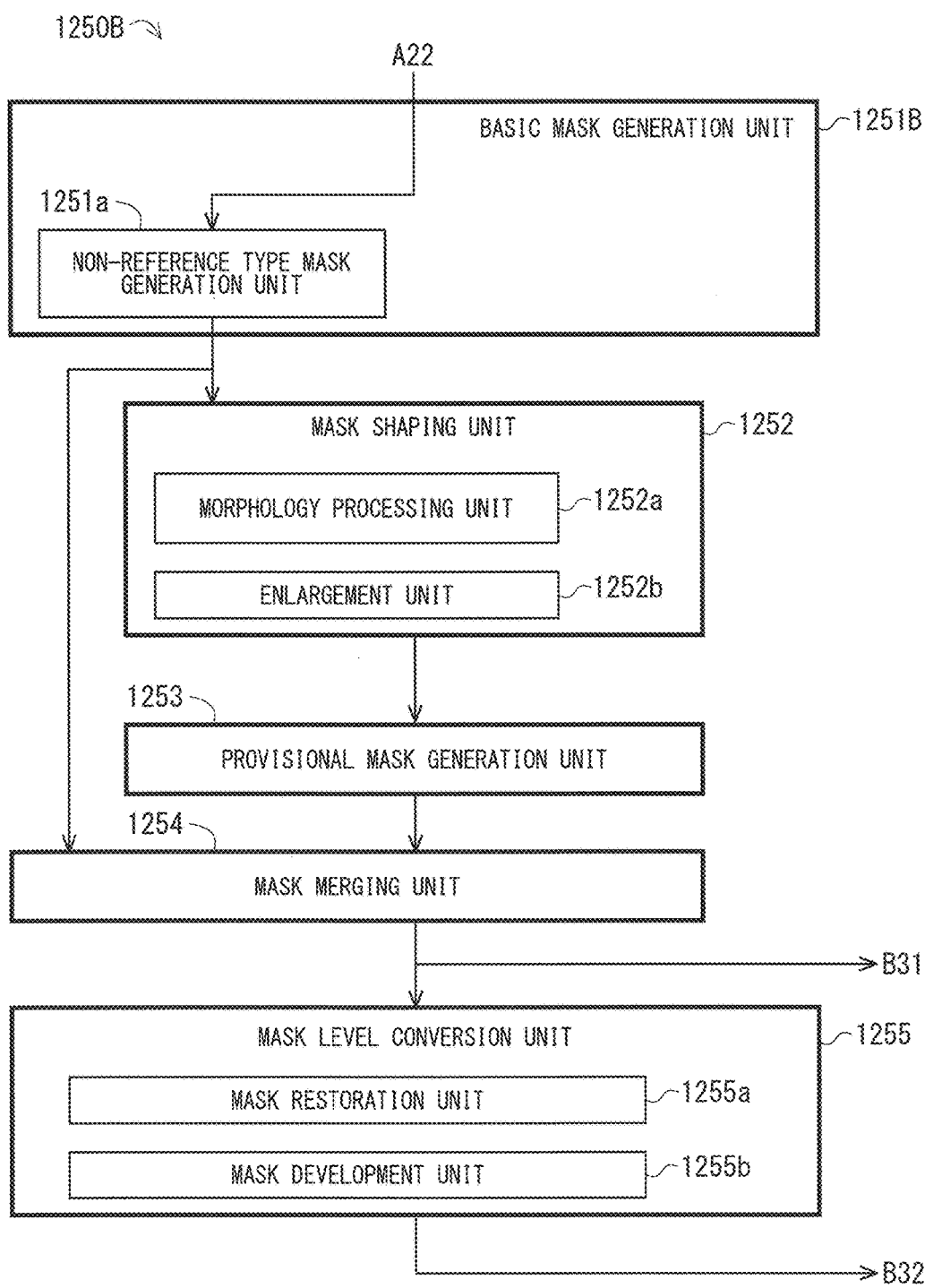
FIG. 57 is a block diagram showing a mask preparation unit in accordance with a second preferred embodiment.

FIG. 57 is a block diagram showing a mask preparation unit 1250B in accordance with the second preferred embodiment. Instead of the mask preparation unit 1250, the mask preparation unit 1250B is applied to the synthesizing system 21 shown in FIG. 17. As shown in FIG. 57, the mask preparation unit 1250B has a basic mask generation unit 1251B, instead of the basic mask generation unit 1251 shown in FIG. 21. The basic mask generation unit 1251B has a constitution in which the reference type mask generation unit 1251*b* is omitted from the basic mask generation unit 1251 of FIG. 21. The second preferred embodiment can produce the same effects as those of the first preferred embodiment.

The Third Preferred Embodiment

FIG. 58 is a block diagram showing a mask preparation unit 1250C in accordance with the third preferred embodiment. Instead of the mask preparation unit 1250, the mask preparation unit 1250C is applied to the synthesizing system 21 shown in FIG. 17. As shown in FIG. 58, the mask preparation unit 1250C has a constitution in which the provisional mask generation unit 1253 and the mask merging unit 1254 are omitted from the mask preparation unit 1250 of FIG. 21. Further, the mask preparation unit 1250C has a mask level conversion unit 1255C, instead of the mask level conversion unit 1255 shown in FIG. 21. The mask level conversion unit 1255C has a constitution in which the mask restoration unit 1255*a* is omitted from the mask level conversion unit 1255 of FIG. 21.

In the mask preparation unit 1250C, the data B33 of the shaped mask generated by the mask shaping unit 1252 are supplied to the mask level conversion unit 1255C. When g2=g1 and when g2<g1, the mask level conversion unit 1255C develops the shaped mask of decomposition level 0 to decomposition level g2. The data B34 of the mask having a decomposition level of g2 are outputted as the mask data B61 from the mask preparation unit 1250C and supplied to the synthesis execution unit 1270.

On the other hand, when g2>g1, the mask level conversion unit 1255C generates a mask having a decomposition level of g1 and a mask having a decomposition level of g2 from the shaped mask of decomposition level 0. For example, the mask level conversion unit 1255C first develops the shaped mask of decomposition level 0 to decomposition level g1 and further develops the mask having a decomposition level of g1 to decomposition level g2. The data B34 of the mask having a decomposition level of g2 are outputted as the mask data B61 from the mask preparation unit 1250C and supplied to the synthesis execution unit 1270. Further, the data B34 of the mask having a decomposition level of g1 are outputted as the mask data B41 from the mask preparation unit 1250C and supplied to the first preparation unit 1230.

Furthermore, when g2=0, the data B33 of the shaped mask of decomposition level 0 may be outputted from the mask preparation unit 1250C.

Figure 59:
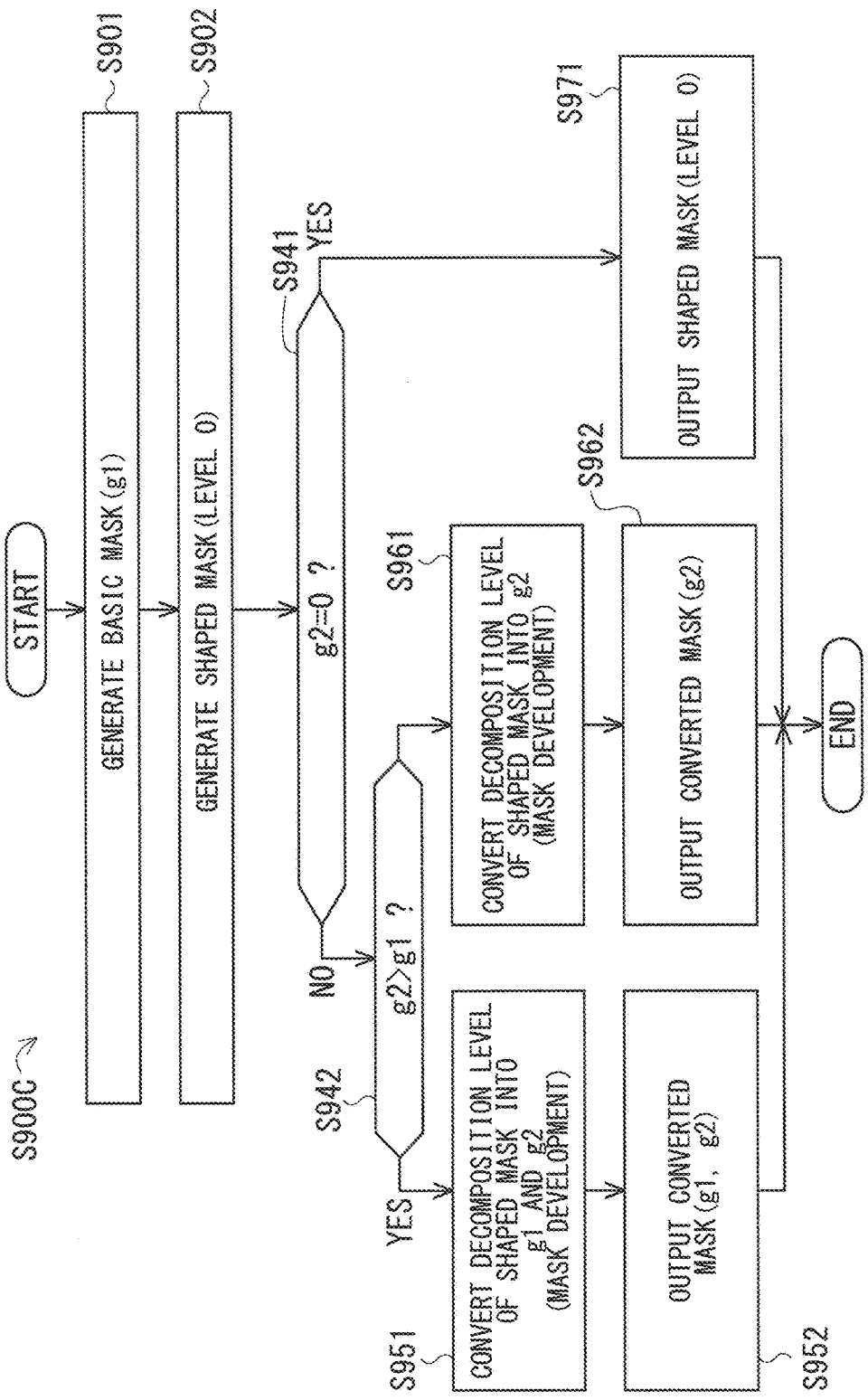
FIG. 59 is a flowchart showing an operation of the mask preparation unit in accordance with the third preferred embodiment.

FIG. 59 is a flowchart showing an operation of the mask preparation unit 1250C. In a mask preparation flow S900C of FIG. 59, like in the mask preparation flow S900 of FIG. 34, the basic mask is generated in Step S901 and the shaped mask of decomposition level 0 is generated in Step S902.

After that, when g2≠0 and g2>g1 (see Steps S941 and S942), the mask level conversion unit 1255C performs the mask development process to convert the shaped mask of decomposition level 0 into a mask having a decomposition level of g1 and a mask having a decomposition level of g2 (Step S951). Then, the converted mask having a decomposition level of g2 is outputted to the synthesis execution unit 1270 and the converted mask having a decomposition level of g1 is outputted to the first preparation unit 1230 (Step S952).

In contrast, when g2>g1 is not satisfied, i.e., g2<g1 (see Step S942), the mask level conversion unit 1255C performs the mask development process to convert a shaped merge mask of decomposition level 0 into a mask having a decomposition level of g2 (Step S961). Then, the converted mask having a decomposition level of g2 is outputted to the synthesis execution unit 1270 (Step S962).

On the other hand, when g2=0 (see Step S941), the shaped mask of decomposition level 0 is outputted to the synthesis execution unit 1270 (Step S971).

FIGS. 60 and 61 are views each showing an exemplary mask. FIG. 60 shows a mask obtained by developing the shaped mask (see FIG. 44) until the decomposition level becomes 3. In FIG. 60, g2=3 and g1=5. FIG. 61 shows a mask obtained by developing the shaped mask (see FIG. 44) until the decomposition level becomes 6. In FIG. 61, g2=6 and g1=5. Further, as described earlier, FIG. 45 shows the mask obtained by developing the shaped mask (see FIG. 44) until the decomposition level becomes 5.

Figure 62:
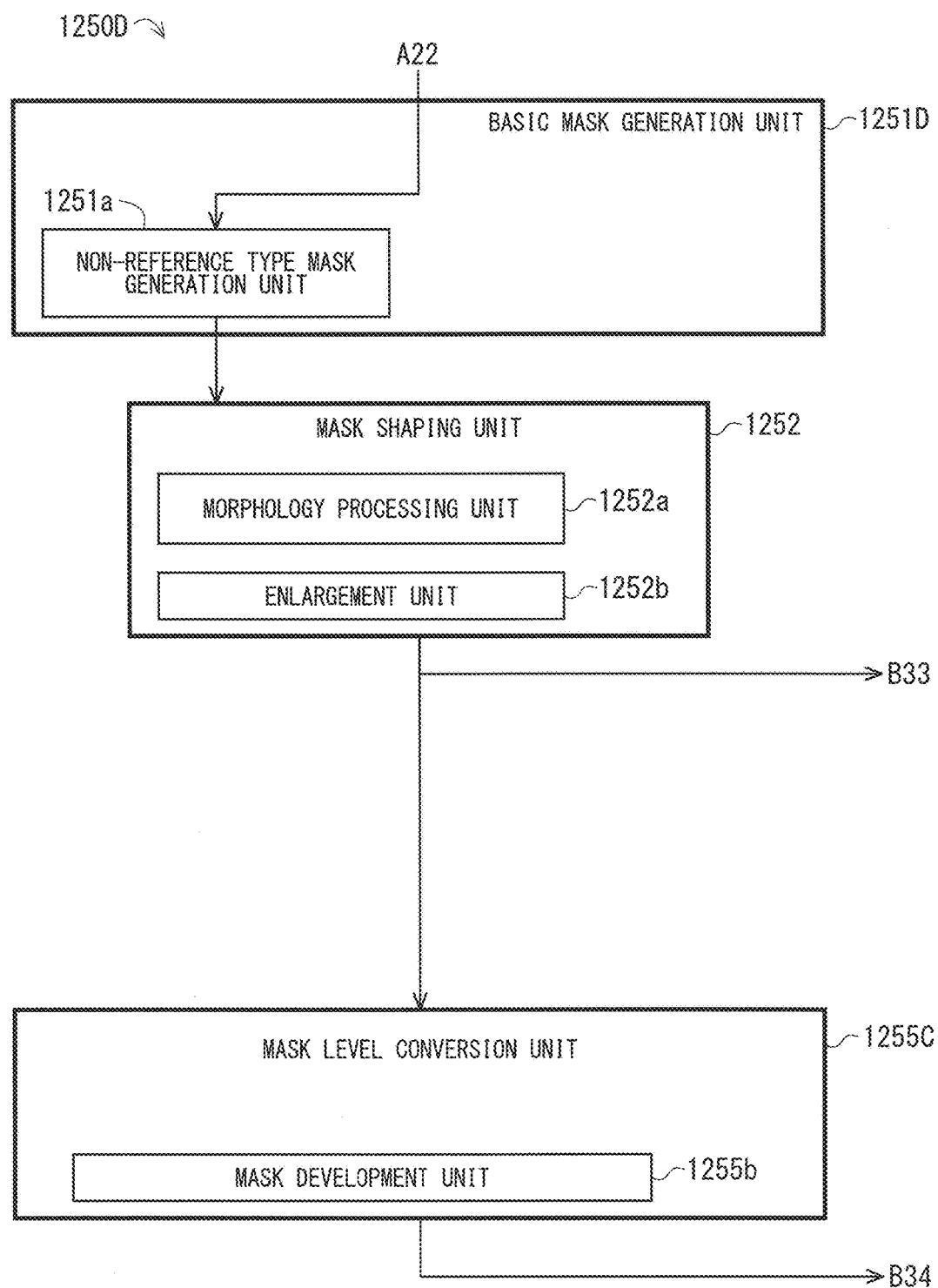
FIG. 62 is a block diagram showing a second example of the mask preparation unit in accordance with the third preferred embodiment.

Herein, with reference to the second preferred embodiment, like in the mask preparation unit 1250D shown in FIG. 62, the basic mask generation unit 1251D may be constituted only of the non-reference type mask generation unit 1251a. Further, like in the mask preparation unit 1250E shown in FIG. 63, the basic mask generation unit 1251E may be constituted only of the reference type mask generation unit 1251b.

The third preferred embodiment can produce the same effects as those of the first preferred embodiment.

The Fourth Preferred Embodiment

In the fourth preferred embodiment, combination of the first and third preferred embodiments will be described. FIG. 64 is a block diagram showing a mask preparation unit 1250F in accordance with the fourth preferred embodiment. Instead of the mask preparation unit 1250, the mask preparation unit 1250F is applied to the synthesizing system 21 shown in FIG. 17. The mask preparation unit 1250F has the same constitution as that of the mask preparation unit 1250 of FIG. 21. The mask preparation unit 1250F, however, has a constitution in which the data B33 of the shaped mask are supplied also to the mask level conversion unit 1255 and further the data B33 of the shaped mask can be outputted to the outside of the mask preparation unit 1250F.

The mask preparation unit 1250F performs an operation, for example, in accordance with a mask preparation flow S900F of FIG. 65. Specifically, in Step S981, the user selects whether to use a mask merge function. When the mask merge function is used, the mask preparation flow S900 of FIG. 34 is performed. On the other hand, when the mask merge function is not used, the mask preparation flow S900C of FIG. 59 is performed.

Figure 63:
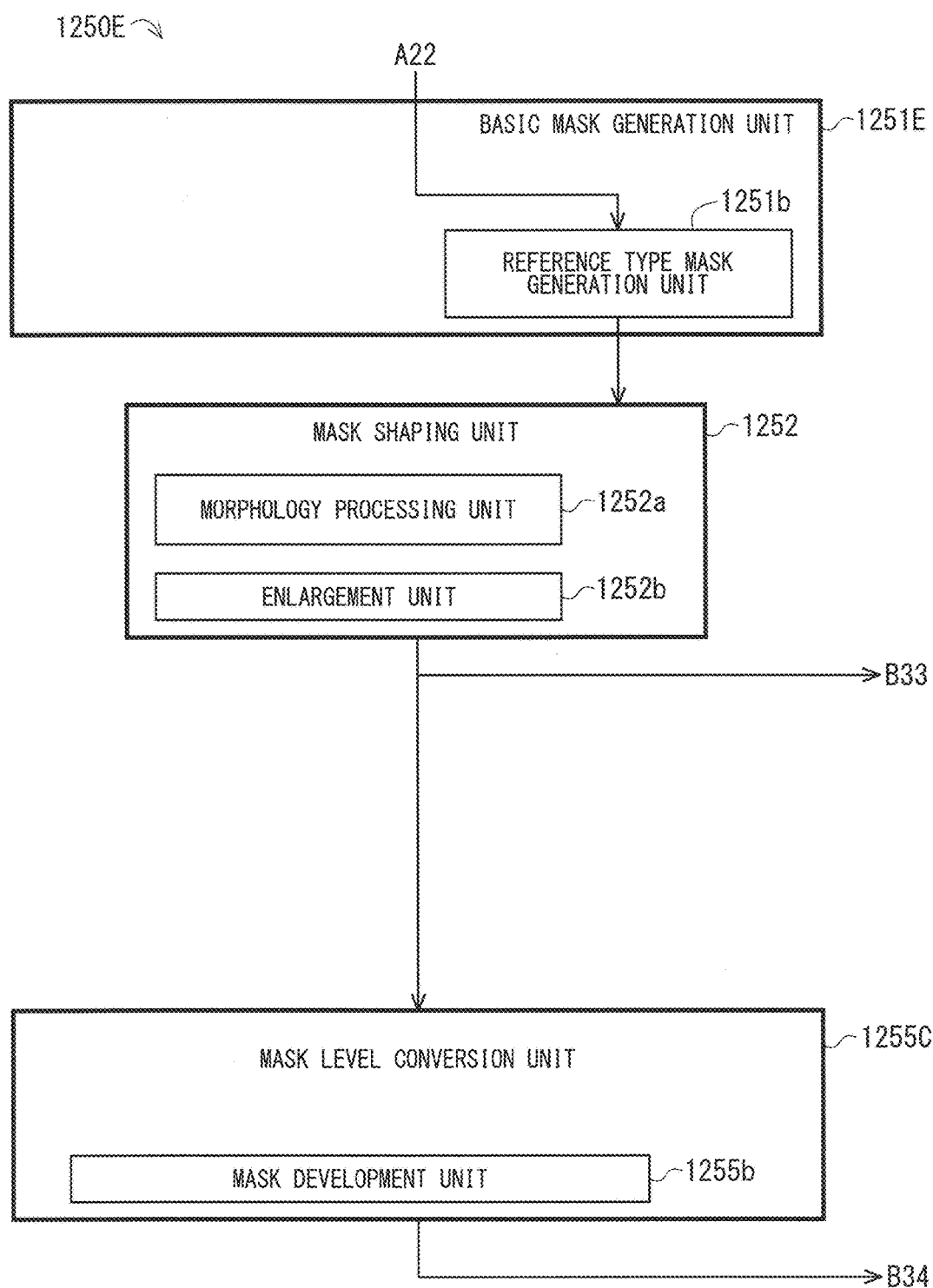
FIG. 63 is a block diagram showing a third example of the mask preparation unit in accordance with the third preferred embodiment.

Herein, the mask preparation unit 1250F also includes the constitution of the mask preparation units 1250B, 1250D, and 1250E (see FIGS. 57, 62, and 63). For this reason, the mask preparation unit 1250F can also perform the same operation as that of the mask preparation units 1250B, 1250D, and 1250E.

The fourth preferred embodiment can produce the same effects as those of the first to third preferred embodiments.

The Fifth Preferred Embodiment

In the first preferred embodiment, the color space conversion unit 1022 in the supply system 11 generates the image data having a YCbCr component (consisting of the luminance component Y and the color difference components Cb and Cr). For this reason, for each of the Y, Cb, and Cr components, the wavelet coefficient data and the quantized wavelet coefficient data are generated. Therefore, it is assumed that a merged mask is generated independently for each of the Y, Cb, and Cr components. It is assumed, for example, that for the generation of the merged mask for the Y component, the quantized wavelet coefficient data A22 for the Y component are used but the quantized wavelet coefficient data 22 for the Cb and Cr components are not used.

On the other hand, in the fifth preferred embodiment, the quantized wavelet coefficient data A22 for a set of Y, Cb, and Cr components are comprehensively used. Specifically, as shown in the conceptual diagram of FIG. 66, the reference type estimation rule is applied collectively to the quantized wavelet coefficient data A22 for a set of Y, Cb, and Cr components, and a single reference type mask is thereby generated.

Figure 67:
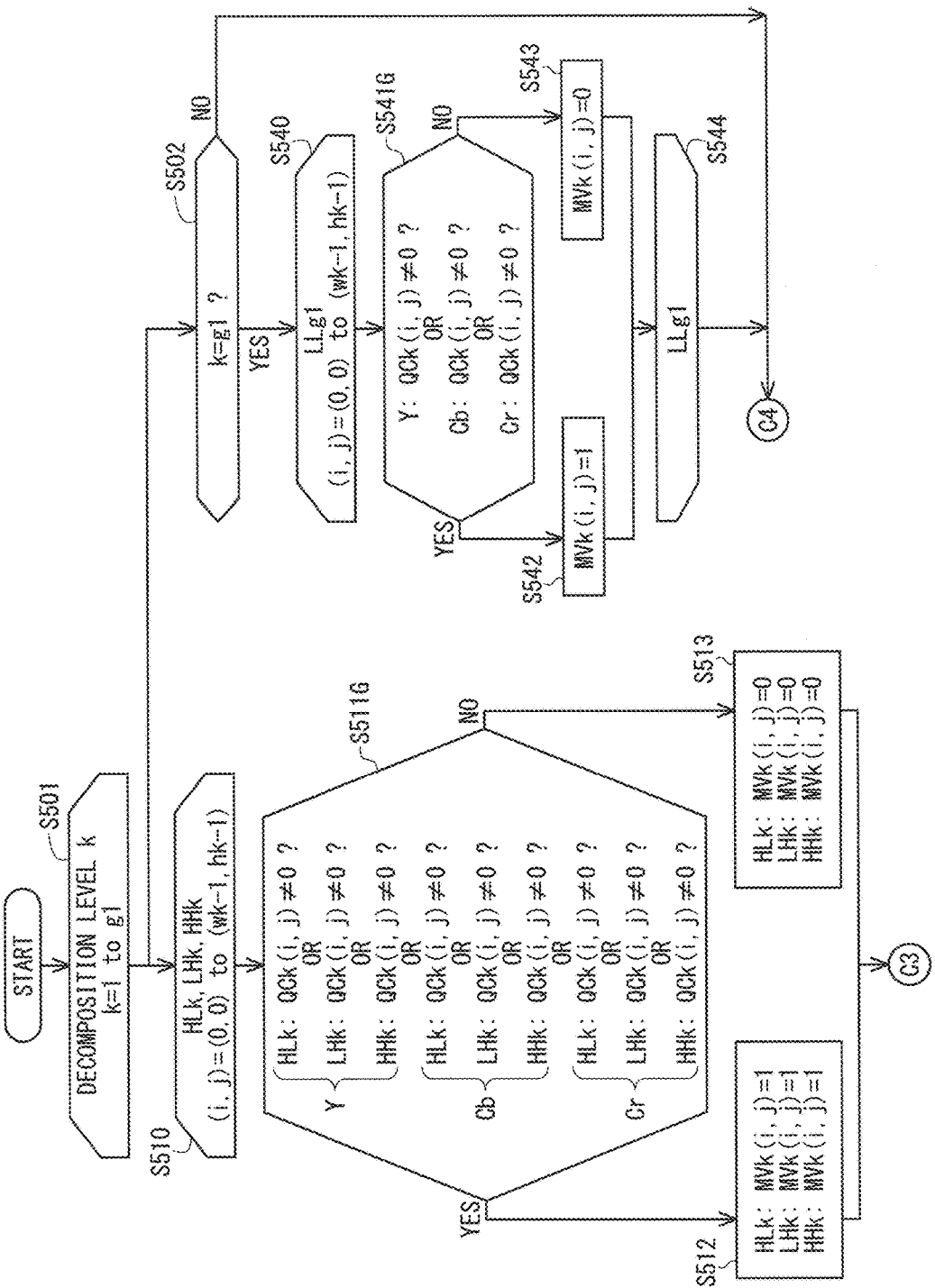
FIGS. 67 and 68 are flowcharts showing a reference type mask generation process in a case where a reference type estimation rule is applied collectively to a plurality of color space components in accordance with the fifth preferred embodiment.
Figure 68:
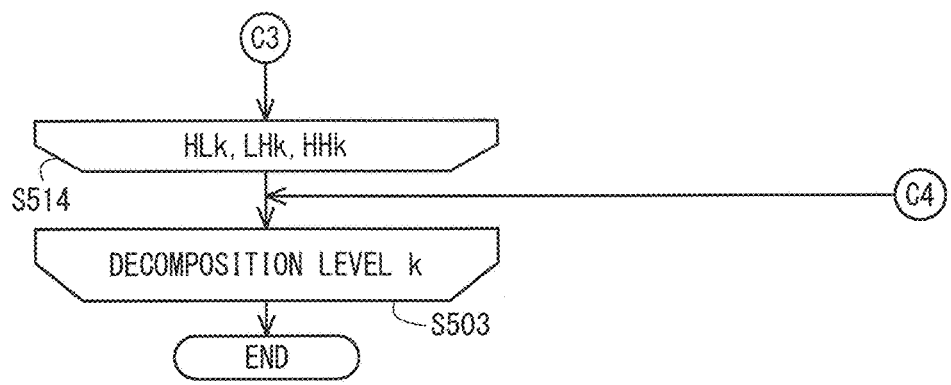

A specific example of operation flow is shown in the flowcharts of FIGS. 67 and 68. Further, the flow of FIG. 67 is connected to that of FIG. 68 with connectors C3 and C4. A reference type mask generation process S500G shown in FIGS. 67 and 68 has a flow in which Steps S511 and S541 in the reference type mask generation process S500 of FIG. 24 are replaced with Steps S511G and S541G.

In Step S511G, like in Step S511, it is determined whether a quantized wavelet coefficient $QC_k(i,j)$ of each of the sub-bands HLk, LHk, and HHk is 0 or not. In Step S511G, particularly, since all the sub-bands HLk, LHk, and HHk which are present in the three quantized wavelet images for the Y, Cb, and Cr components are objects to be processed, it is determined whether QCk(i,j) of each of the nine sub-bands of decomposition level k is 0 or not.

When QCk(i,j) is not 0 in at least one of the nine sub-bands of decomposition level k, in Step S512, the mask values MVk(i,j) at the coordinates (i,j) of all the HLk, LHk, and HHk sub-band masks are set as the ROI indication value (herein, "1"). In other words, in Step S512, the above-described first mask value setting rule is applied.

In contrast, when QCk(i,j) is 0 in all the nine sub-bands of decomposition level k, in Step S513, the mask values MVk(i,j) at the coordinates (i,j) of all the HLk, LHk, and HHk sub-band masks are set as the non-ROI indication value (herein, "0"). In other words, in Step S513, the above-described second mask value setting rule is applied.

On the other hand, in Step S541G, like in Step S541, it is determined whether a quantized wavelet coefficient QCk(i,j) of the sub-band LLg1 having a decomposition level of g1 is 0 or not. In Step S541G, particularly, since all the sub-bands LLg1 which are present in the three quantized wavelet images for the Y, Cb, and Cr components are objects to be processed, it is determined whether QCk(i,j) of each of the three sub-bands LLg1 is 0 or not.

When QCk(i,j) is not 0 in at least one of the three sub-bands LLg1, in Step S542, the mask values MVk(i,j) at the coordinates (i,j) of all the LLg1 sub-band masks are set as the ROI indication value (herein, "1"). In other words, in Step S542, the above-described first mask value setting rule is applied.

In contrast, when QCk(i,j) is 0 in all the three sub-bands LLg1, in Step S543, the mask values MVk(i,j) at the coordinates (i,j) of the LLg1 sub-band masks are set as the non-ROI indication value (herein, "0"). In other words, in Step S543, the above-described second mask value setting rule is applied.

Herein, when the reference type estimation rule is applied collectively to the quantized wavelet coefficient data A22 for a set of Y, Cb, and Cr components, unlike in the first to fourth preferred embodiments, the LL sub-bands for the Y, Cb, and Cr components, i.e., three LL sub-bands are present. For this reason, in the reference type mask generation process S500G of FIGS. 67 and 68, the above-described third and fourth mask value setting rules are not used.

In the fifth preferred embodiment, the reference type mask is generated on the basis of more quantized wavelet coefficient data A22. For this reason, a mask closer to the mask used in the supply system 11 can be generated.

The reference type mask generation process S500G can be applied to a color space component other than the Y, Cb, and Cr components. For example, considering that components other than Cb and Cr components are known as the color difference component, these are generalized as the YUV format. Specifically, the reference type mask generation process S500G can be applied to the color space components of Y, U, and V. Alternatively, the reference type mask generation process S500G can be applied to the RGB format.

In the first to fifth preferred embodiments, it is assumed that the first image and the second image are color images. The first image and the second image, however, may be monochrome images. In that case, the data such as the wavelet coefficient data and the like consist of only one component (specifically, the luminance component). For this reason, it is not necessary to generate a plurality of masks for the color space components.

The Sixth Preferred Embodiment

In the sixth preferred embodiment, an exemplary case where a mask itself is acquired from the outside of the synthesizing system 21 will be described. Such a mask is sometimes referred to as an externally-acquired mask. Further, the mask generated by the mask preparation unit 1250, like that in the first preferred embodiment and the like, may be referred to as an internally-generated mask.

Herein, the externally-acquired mask is assumed to be a mask used in the supply system 11. In this case, the externally-acquired mask is supplied to the synthesizing system 21, being embedded in the coded bit stream Abs or separated from the coded bit stream Abs.

Figure 69:
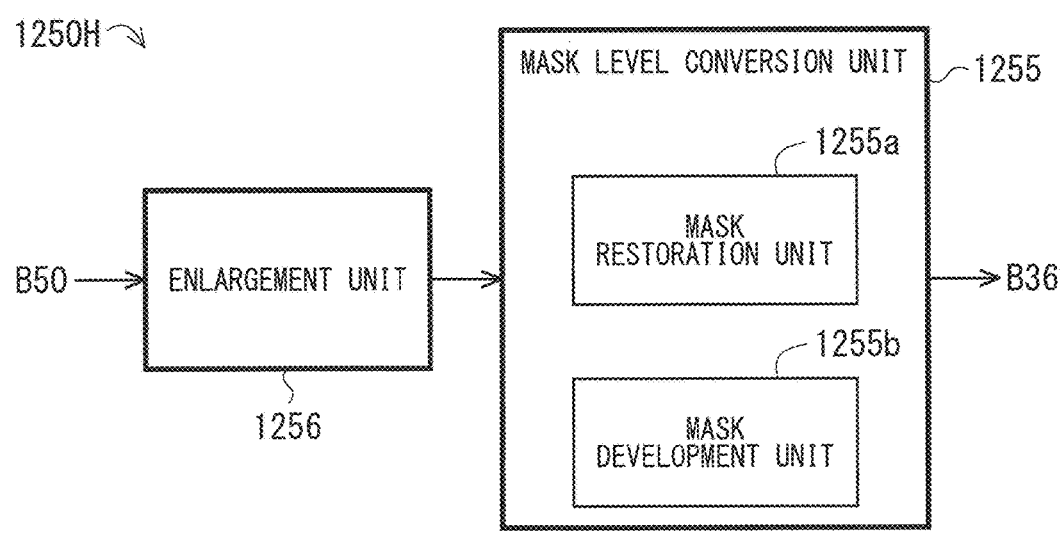
FIG. 69 is a block diagram showing a mask preparation unit in accordance with a sixth preferred embodiment.

FIG. 69 is a block diagram showing a mask preparation unit 1250H in accordance with the sixth preferred embodiment. Instead of the mask preparation unit 1250, the mask preparation unit 1250H is applied to the synthesizing system 21 shown in FIG. 17. Further, FIG. 70 is a flowchart showing an operation of the mask preparation unit 1250H.

As shown in FIG. 69, the mask preparation unit 1250H includes the mask level conversion unit 1255 and an enlargement unit 1256. The mask level conversion unit 1255 is the same one as described earlier. The enlargement unit 1256 has, for example, the same structure as that of the enlargement unit 1252b described earlier.

The enlargement unit 1256 acquires data B50 of the externally-acquired mask. For reduction in the amount of data, the size of the externally-acquired mask is sometimes reduced with respect to the original mask size (i.e., the image size of the first image). When the externally-acquired mask has such a reduced size, the enlargement unit 1256 enlarges the externally-acquired mask to the original mask size (see Steps S991 and S992 of FIG. 70). It is assumed that the externally-acquired mask data B50 are accompanied by information on the mask size (e.g., the reduction ratio), and the enlargement unit 1256 determines the necessity and the processing details (e.g., the enlargement ratio) of the enlargement processing on the basis of the information. The enlargement unit 1256 supplies the data of the externally-acquired mask having a size recovered to the original mask size to the mask level conversion unit 1255.

Figure 70:
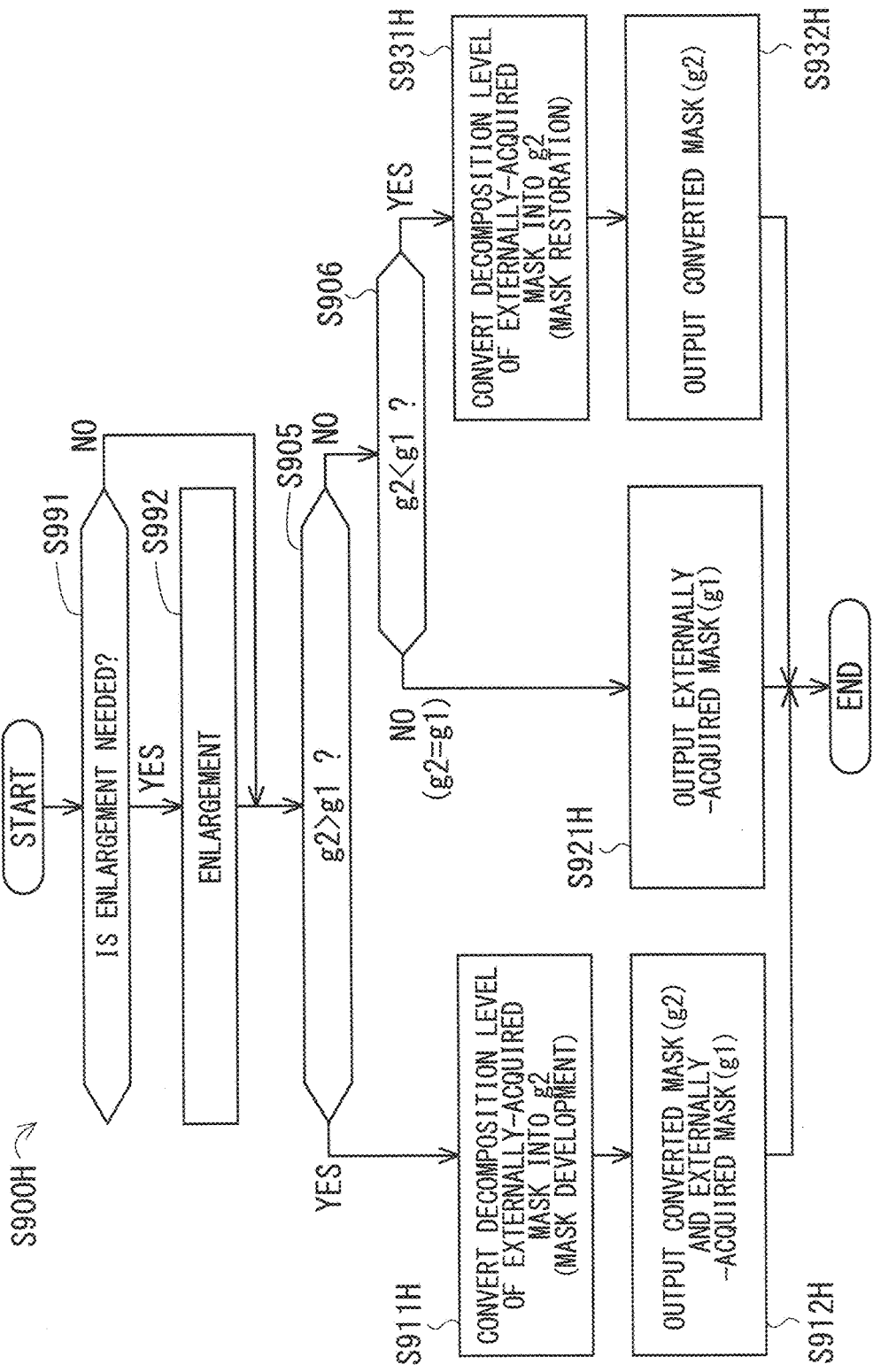
FIG. 70 is a flowchart showing an operation of the mask preparation unit in accordance with the sixth preferred embodiment.

On the other hand, when the externally-acquired mask has the original mask size, the enlargement unit 1256 does not perform the enlargement processing and supplies the acquired externally-acquired mask data B50 to the mask level conversion unit 1255 (see Steps S991 and S992 of FIG. 70).

Herein, it is assumed that the externally-acquired mask is a developed mask having a decomposition level of g1 (which is the same as the decomposition level of the quantized wavelet coefficient data A22 for the first image). For example, see FIG. 40. Further, the externally-acquired mask after being enlarged has a decomposition level of g1.

The decomposition level of the externally-acquired mask is g1 and therefore the same as that of the above-described merged mask (see FIG. 22). For this reason, the mask level conversion unit 1255 performs the same operation as that of the mask preparation flow S900 shown in FIG. 34. Specifically, as shown in FIG. 70, the mask level conversion unit 1255 performs Steps S905 and S906 described above and further performs Steps S911H, S912H, S921H, S931H, and S932H which are the same as Steps S911, S912, S921, S931, and S932 described above.

Figure 71:
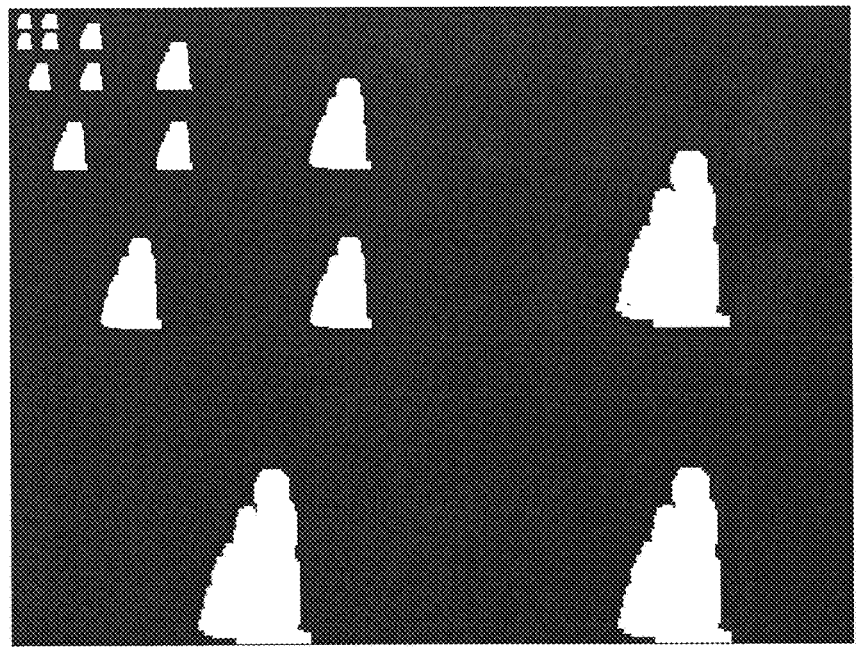
FIG. 71 is a view showing an exemplary externally-acquired mask in accordance with the sixth preferred embodiment.
Figure 72:
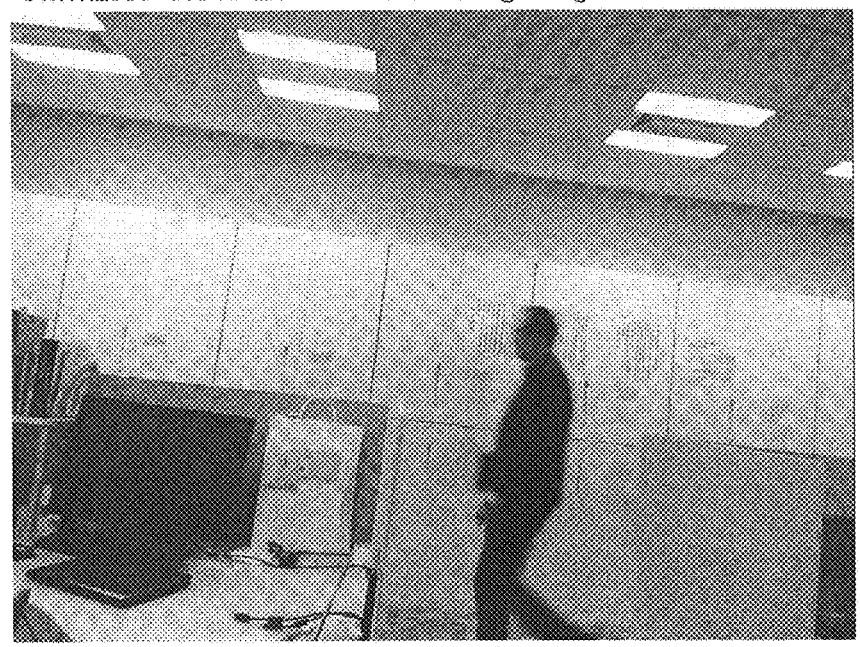
FIG. 72 is a view showing a synthetic image using the mask of FIG. 71.

FIGS. 71 to 78 show exemplary images. FIG. 71 shows an exemplary externally-acquired mask. An exemplary synthetic image using the mask of FIG. 71 is shown in FIG. 72. In FIGS. 71 and 72, g2=g1=5. Specifically, g1, which is the decomposition level of the quantized wavelet coefficient data A22 and the externally-acquired mask data B50 supplied from the supply system 11, is 5, and g2 which is the decomposition level in the synthesis execution process is also 5.

Figure 73:
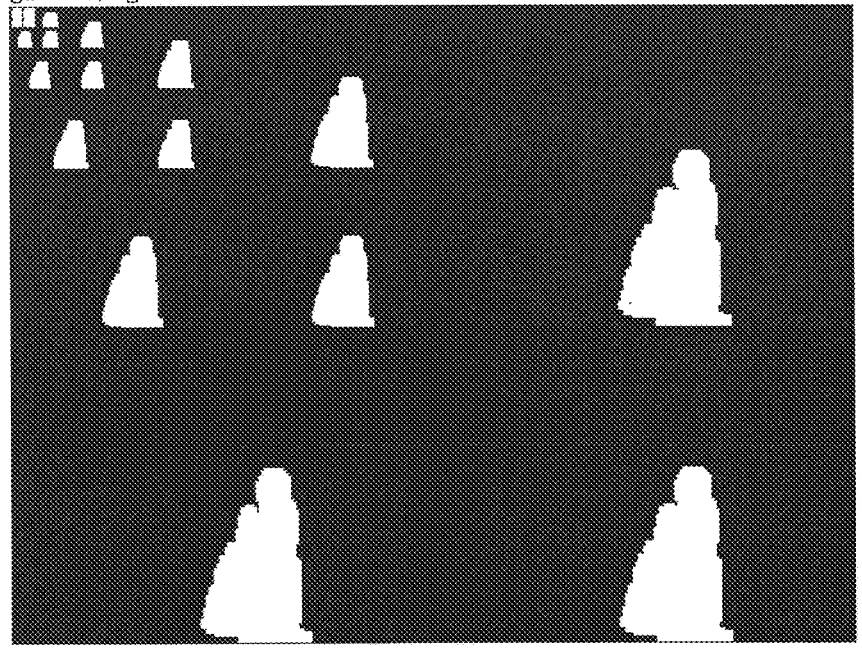
FIG. 73 is a view showing a mask obtained by developing the externally-acquired mask of FIG. 71 to decomposition level 6.
Figure 74:
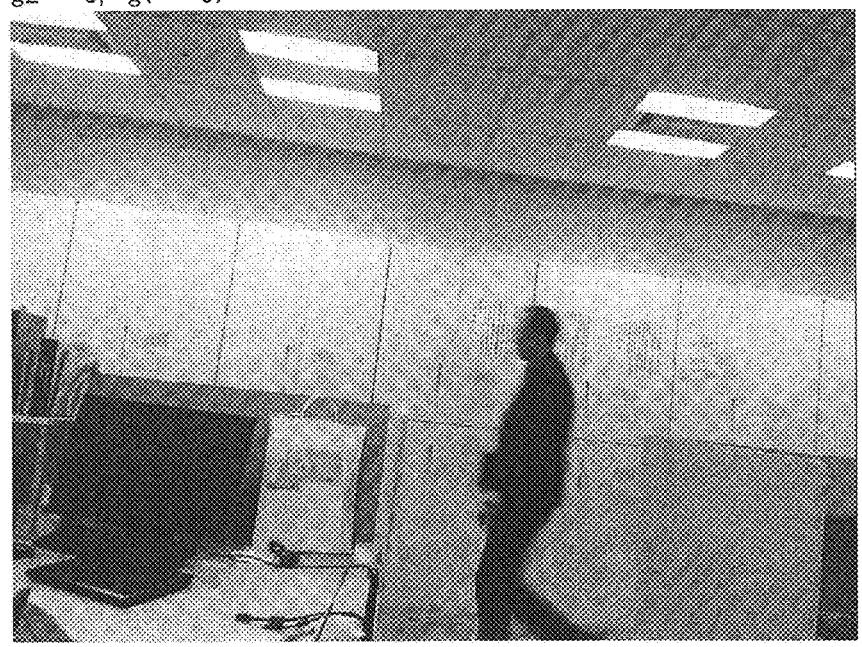
FIG. 74 is a view showing a synthetic image using the mask of FIG. 73.

FIG. 73 shows a mask obtained by developing the externally-acquired mask of FIG. 71 until the decomposition level becomes 6. The synthetic image using the mask of FIG. 73 is shown in FIG. 74. In FIGS. 73 and 74, g2=6 and g1=5, and therefore g2>g1.

Figure 75:
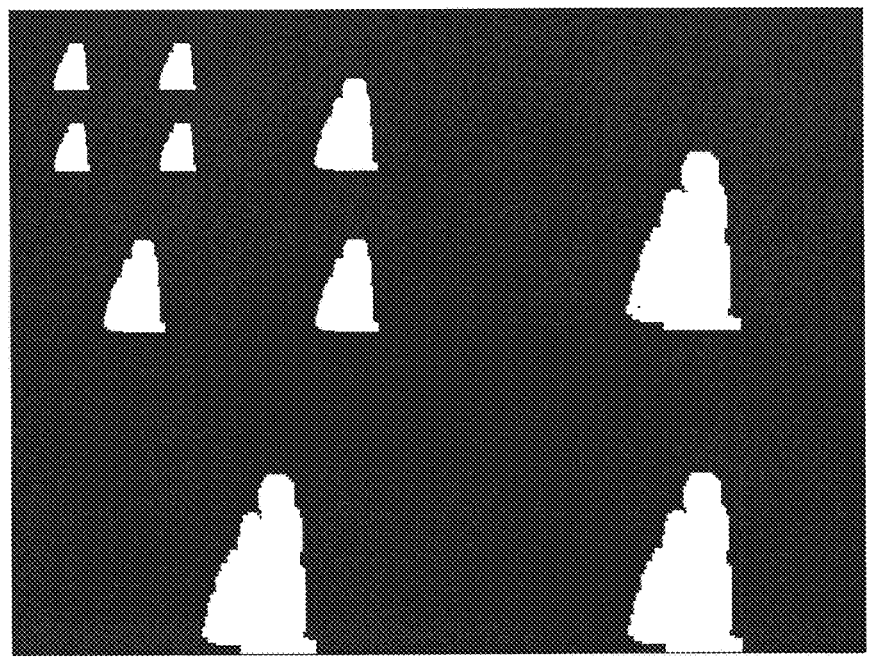
FIG. 75 is a view showing a mask obtained by restoring the externally-acquired mask of FIG. 71 to decomposition level 3.
Figure 76:
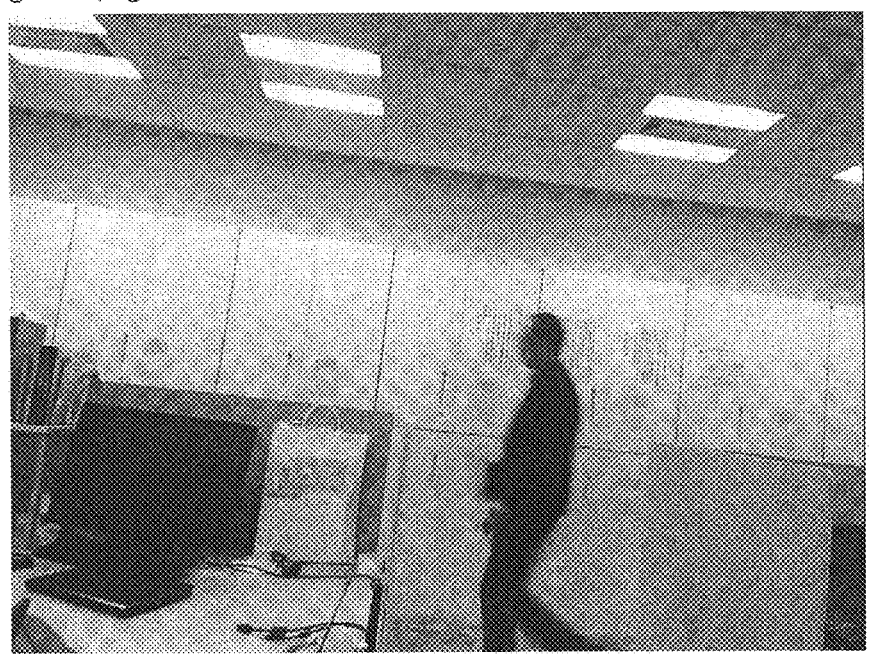
FIG. 76 is a view showing a synthetic image using the mask of FIG. 75.

FIG. 75 shows a mask obtained by restoring the externally-acquired mask of FIG. 71 until the decomposition level becomes 3. The synthetic image using the mask of FIG. 75 is shown in FIG. 76. In FIGS. 75 and 76, g2=3 and g1=5, and therefore g2<g1.

Figure 77:
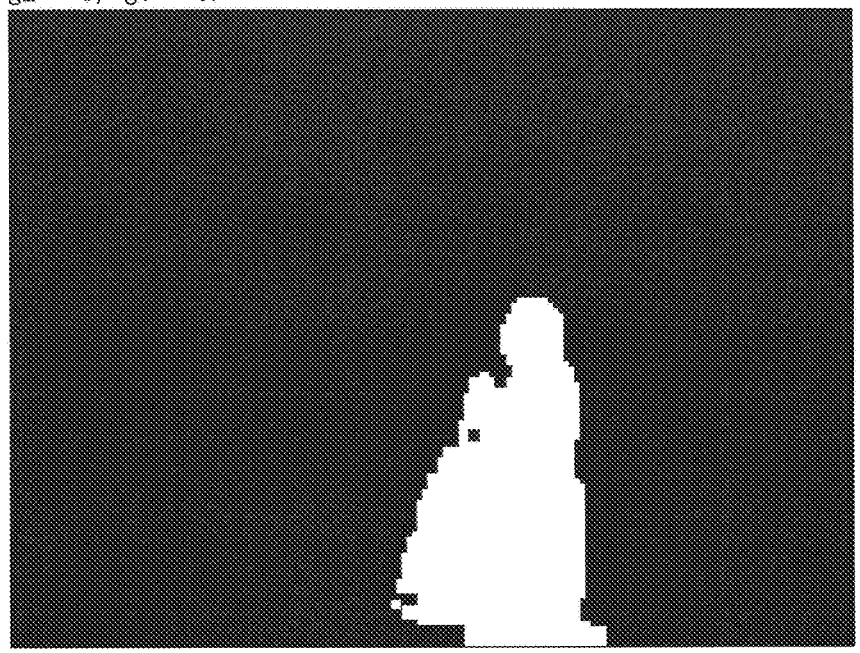
FIG. 77 is a view showing a mask obtained by restoring the externally-acquired mask of FIG. 71 to decomposition level 0.
Figure 78:
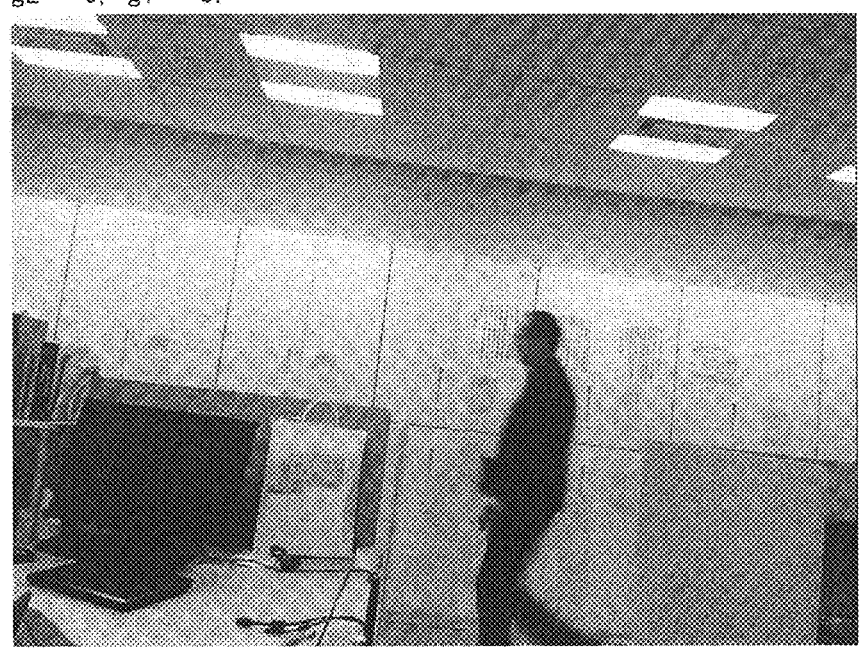
FIG. 78 is a view showing a synthetic image using the mask of FIG. 77.

FIG. 77 shows a mask obtained by restoring the externally-acquired mask of FIG. 71 until the decomposition level becomes 0. The synthetic image using the mask of FIG. 77 is shown in FIG. 78. In FIGS. 77 and 78, g2=0 and g1=5, and therefore g2<g1.

Though it is assumed that the externally-acquired mask is a developed mask having a decomposition level of g1 in the above description, the externally-acquired mask may be an original mask of decomposition level 0. The decomposition level in this case is the same as that of the above-described shaped mask. For this reason, the mask level conversion unit 1255 generates a mask having a decomposition level of g1 and a mask having a decomposition level of g2 from the externally-acquired mask of decomposition level 0 by performing the same Steps as Steps S941 to S971 in the mask preparation flow S900C of FIG. 59.

In accordance with the sixth preferred embodiment, even when the externally-acquired mask is used, it is possible to perform the image synthesis like in the first preferred embodiment and the like.

The Seventh Preferred Embodiment

In the seventh preferred embodiment, an exemplary case where the quantized wavelet coefficient data A22 is in conformity with the Max-shift method. FIG. 79 is a block diagram showing a mask preparation unit 1250I in accordance with the seventh preferred embodiment. Instead of the mask preparation unit 1250, the mask preparation unit 1250I is applied to the synthesizing system 21 of FIG. 17. Further, FIG. 80 is a flowchart showing an operation of the mask preparation unit 1250I.

As shown in FIG. 79, the mask preparation unit 1250I includes the mask level conversion unit 1255 and a Maxshift mask generation unit 1257. The mask level conversion unit 1255 is described above.

Figure 80:
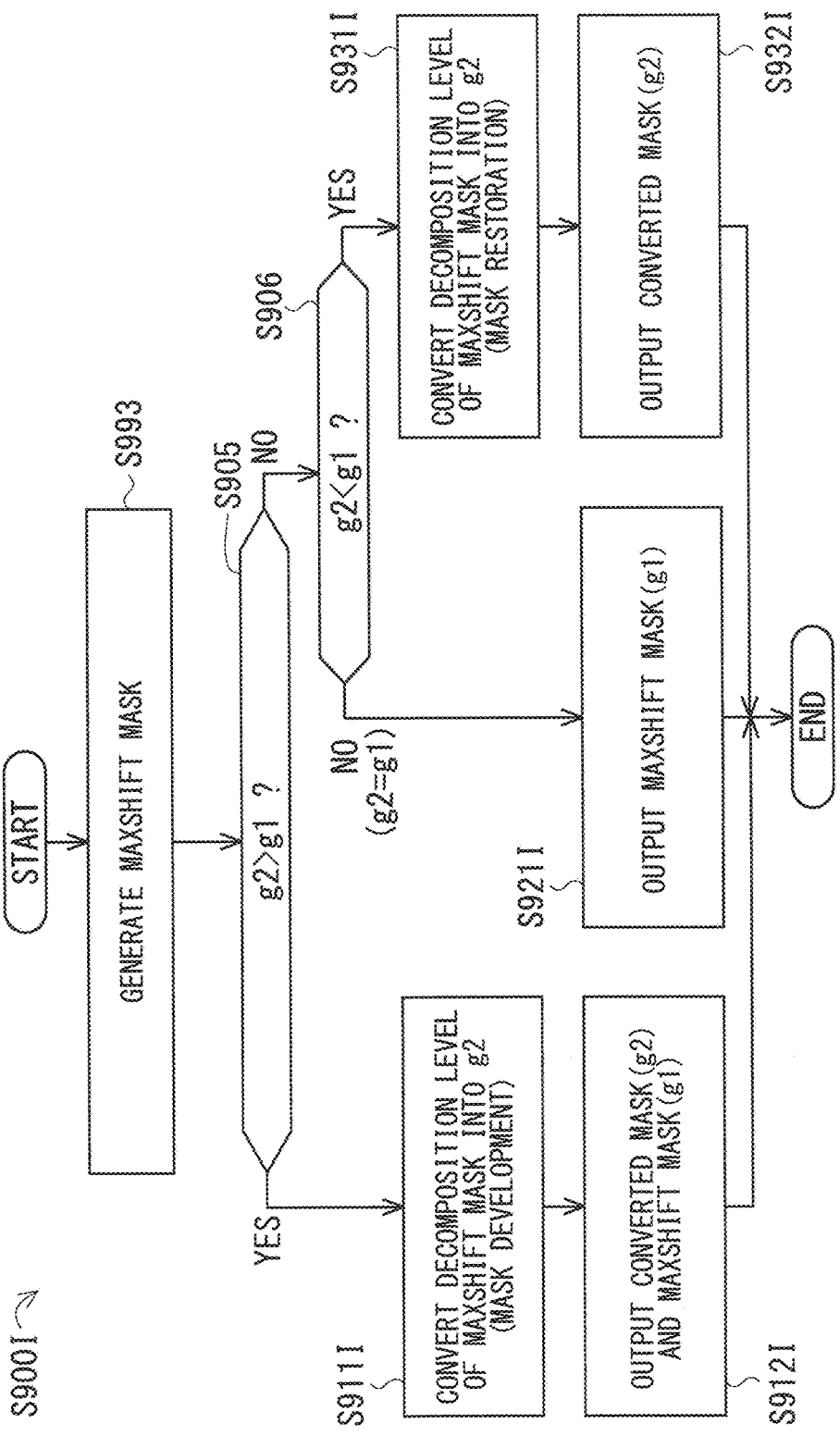
FIG. 80 is a flowchart showing an operation of the mask preparation unit in accordance with the seventh preferred embodiment.

The Maxshift mask generation unit 1257 generates a mask from the quantized wavelet coefficient data A22 in conformity with the Max-shift method (see Step S993 of FIG. 80). Such a mask is sometimes referred to as a Maxshift mask. Herein, it is assumed that the already-known technique is used for the generation of the Maxshift mask and detailed description will be omitted. The generated Maxshift mask is supplied to the mask level conversion unit 1255.

The Maxshift mask is generated with the decomposition level g1 of the quantized wavelet coefficient data A22. Therefore, the decomposition level of the Maxshift mask is the same as that of the above-described merged mask (see FIG. 22). For this reason, the mask level conversion unit 1255 performs the same operation as that in the mask preparation flow S900 of FIG. 34. Specifically, as shown in FIG. 80, the mask level conversion unit 1255 performs Steps S905 and S906 described above and further performs Steps S911I, S9121, S9211, S9311, and S9321 which are the same as Steps S911, S912, S921, S931, and S932 described above.

In accordance with the seventh preferred embodiment, even when the Maxshift mask is used (in other words, even in the case where the quantized wavelet coefficient data A22 is in conformity with the Max-shift method), it is possible to perform the image synthesis like in the first preferred embodiment and the like.

The Eighth Preferred Embodiment

Figure 81:
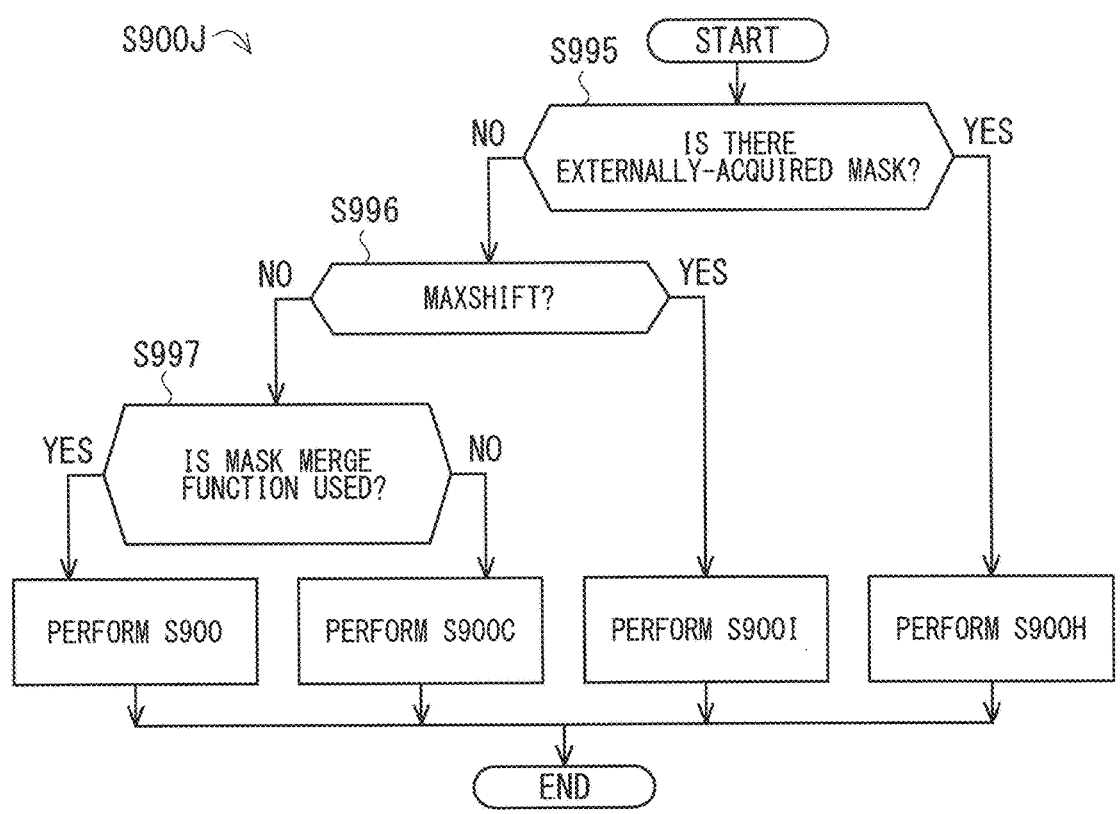
FIG. 81 is a flowchart showing an operation of a mask preparation unit in accordance with an eighth preferred embodiment.

The various mask preparation units described in the first to seventh preferred embodiments may be combined. For example, in the mask preparation unit 1250F (see FIG. 64) described in the fourth preferred embodiment, the enlargement unit 1256 (see FIG. 69) in the sixth preferred embodiment and the Maxshift mask generation unit 1257 (see FIG. 79) in the seventh preferred embodiment may be additionally provided. In this case, determination steps S995 to S997 may be used like in a mask preparation flow S900J of FIG. 81.

Specifically, in Step S995, the mask preparation unit determines whether or not an externally-acquired mask is acquired from the outside of the synthesizing system 21. Further, in Step S996, the mask preparation unit determines whether or not the quantized wavelet coefficient data A22 is in conformity with the Max-shift method. Furthermore, Step S997 is the same as Step S981 shown in FIG. 65, and the user selects whether to use the mask merge function.

In the determination steps S995 to S997, any one of the flow S900 of FIG. 34, the flow S900C of FIG. 59, the flow S900H of FIG. 70, and the flow S900I of FIG. 80 is selectively performed.

In accordance with the eighth preferred embodiment, it is possible to provide a system which can respond to various input information and various image synthesis methods.

<Variations>

The various masks and mask generation techniques described in the first to fifth preferred embodiments can be applied to systems other than the synthesizing system 21. By omitting the mask level conversion unit 1255 from the constitutions shown in FIGS. 21 and 57, for example, the merged mask may be used, without being subjected to the mask level conversion.

Further, even when the bit stream analysis unit 1210, the decoding unit 1220, and the post-processing unit 1290 are omitted from the synthesizing system 21, the various image synthesis techniques described in the first to eighth preferred embodiments can be achieved. Similarly, from the supply system 11, the preprocessing unit 1020, the coding unit 1060, and the bit stream generation unit 1070 can be omitted.

While the invention has been shown and described in detail, the foregoing description is in all aspects illustrative and not restrictive. It is therefore understood that numerous modifications and variations can be devised without departing from the scope of the invention.

What is claimed is:

1. An image processing system comprising:
circuitry configured to
generate first wavelet coefficient data from quantized wavelet coefficient data for a first image having an ROI (Region Of Interest);
generate second wavelet coefficient data from data of a second image to be synthesized with said ROI in said first image;
prepare a mask to be used for determining whether each wavelet coefficient included in said first wavelet coefficient data is an ROI coefficient related to said ROI or a non-ROI coefficient related to a non-ROI;
generate synthesized coefficient data by determining said ROI coefficient and said non-ROI coefficient in said first wavelet coefficient data on the basis of said mask and synthesizing said ROI coefficient and a wavelet coefficient in said second wavelet coefficient data, which is corresponding to said non-ROI coefficient; and
generate synthetic image data by performing inverse wavelet transformation on said synthesized coefficient data until a decomposition level becomes a predetermined end level,
and wherein assuming that the decomposition level of said quantized wavelet coefficient data is g1 and the decomposition level of said first wavelet coefficient data, said second wavelet coefficient data, and said mask which are used in generating said synthesized coefficient data is g2,
said circuitry is configured to,
when g2=g1,
prepare said mask having the decomposition level of g1;
generate said first wavelet coefficient data having the decomposition level of g1 by performing inverse quantization on said quantized wavelet coefficient data; and
generate said synthetic image data by using said mask having the decomposition level of g1 and said first wavelet coefficient data having the decomposition level of g1, which is generated by inverse quantization;
when g2<g1,
prepare said mask having the decomposition level of g2;
generate said first wavelet coefficient data having the decomposition level of g1 by performing inverse quantization on said quantized wavelet coefficient data;
decrease the decomposition level of said first wavelet coefficient data by performing inverse wavelet transformation on said first wavelet coefficient data having the decomposition level of g1 until the decomposition level becomes g2; and
generate said synthetic image data by using said mask having the decomposition level of g2 and said first wavelet coefficient data having the decomposition level of g2, which is generated by decreasing the decomposition level; and
when g2>g1,
prepare said mask having the decomposition level of g2 and said mask having the decomposition level of g1;
generate said first wavelet coefficient data having the decomposition level of g1 by performing inverse quantization on said quantized wavelet coefficient data;
adjust said first wavelet coefficient data having the decomposition level of g1 by performing a coefficient adjustment process using an auxiliary wavelet coefficient data which is wavelet coefficient data for an auxiliary image which can be equated with said first image and has the decomposition level of g1, said coefficient adjustment process being a process of determining said ROI coefficient and said non-ROI coefficient in said first wavelet coefficient data having the decomposition level of g1 on the basis of said mask having the decomposition level of g1 and synthesizing said ROI coefficient and a wavelet coefficient in said auxiliary wavelet coefficient data, which is corresponding to said non-ROI coefficient;
increase the decomposition level of said first wavelet coefficient data by performing wavelet transformation on said first wavelet coefficient data adjusted by said coefficient adjustment process until the decomposition level becomes g2; and
generate said synthetic image data by using said mask having the decomposition level of g2 and said first wavelet coefficient data having the decomposition level of g2, which is generated by increasing the decomposition level.

2. The image processing system according to claim 1, wherein
said circuitry is configured to perform said coefficient adjustment process only on an LL sub-band of said first wavelet coefficient data having the decomposition level of g1.

3. The image processing system according to claim 1, wherein
said circuitry is configured to
generate a non-reference type mask having the decomposition level of g1 from said quantized wavelet coefficient data in accordance with a non-reference type estimation rule when said non-ROI coefficient is set to 0 in said quantized wavelet coefficient data;
generate a reference type mask having the decomposition level of g1 from said quantized wavelet coefficient data in accordance with a reference type estimation rule when said non-ROI coefficient is set to 0 in said quantized wavelet coefficient data;
generate a shaped mask having the same mask size as that of said mask and the decomposition level of 0 by performing a shaping process, from a predetermined sub-band mask in said non-reference type mask or said reference type mask;
generate a provisional mask having the decomposition level of g1 by developing said shaped mask into a sub-band structure having the decomposition level of g1;
generate said mask having the decomposition level of g1 by partially merging said provisional mask and said non-reference type mask in a unit of sub-band; and
generate said mask having the decomposition level of g2 from said mask having the decomposition level of g1, which is generated by merging,
and wherein assuming that under a sub-band coordinate system defined for each of a quantized wavelet image provided by said quantized wavelet coefficient data, said non-reference type mask, and said reference type mask, a quantized wavelet coefficient value and a mask value at the coordinates (i,j) in a sub-band of decomposition level k are $QC_k(i,j)$ and $MV_k(i,j)$, respectively, wherein i, j, and k are positive integers, said non-reference type estimation rule includes a rule defining that when QCk(i,j) is 0, MVk(i,j) of said non-reference type mask is set as a non-ROI indication value indicating that the value is corresponding to said non-ROI, and when QCk(i,j) is not 0, MVk(i,j) of said non-reference type mask is set as an ROI indication value indicating that the value is corresponding to said ROI, and said reference type estimation rule includes:
- a first mask value setting rule defining that when a plurality of sub-bands of decomposition level k are present in said quantized wavelet image and at least one QCk(i,j) is not 0, all the values of MVk(i,j) of said reference type mask are set as said ROI indication value, and
- a second mask value setting rule defining that when a plurality of sub-bands of decomposition level k are present in said quantized wavelet image and all the values of QCk(i,j) are 0, all the values of MVk(i,j) of said reference type mask are set as said non-ROI indication value.

4. The image processing system according to claim 3, wherein
said circuitry is configured to generate said mask having the decomposition level of g1 by adopting said provisional mask for a low decomposition side sub-band of said mask and adopting said non-reference type mask for a high decomposition side sub-band of said mask.

5. The image processing system according to claim 3, wherein
said shaping process includes a morphology processing and an enlargement processing.

6. The image processing system according to claim 3, wherein
said reference type estimation rule further includes;
- a third mask value setting rule defining that when only one sub-band of decomposition level k is present in said quantized wavelet image and QCk(i,j) is not 0, the value of MVk(i,j) of said reference type mask is set as said ROI indication value, and
- a fourth mask value setting rule defining that when only one sub-band of decomposition level k is present in said quantized wavelet image and QCk(i,j) is 0, the value of MVk(i,j) of said reference type mask is set as said non-ROI indication value.

7. The image processing system according to claim 3, wherein
said quantized wavelet coefficient data includes a plurality of pieces of quantized wavelet coefficient data for a plurality of color space components,
said first mask value setting rule is applied when at least one of all the values of QCk(i,j) is not 0, which are present in a plurality of quantized wavelet images for said plurality of color space components, and
said second mask value setting rule is applied when all the values of QCk(i,j) are 0, which are present in said plurality of quantized wavelet images.

8. The image processing system according to claim 7, wherein
said plurality of color space components are a luminance component and two types of color difference components.

9. The image processing system according to claim 1, wherein
said circuitry is configured to
generate a non-reference type mask having the decomposition level of g1 from said quantized wavelet coefficient data in accordance with a non-reference type estimation rule when said non-ROI coefficient is set to 0 in said quantized wavelet coefficient data;
generate a shaped mask having the same mask size as that of said mask and the decomposition level of 0 by performing a shaping process, from a predetermined sub-band mask in said non-reference type mask;
generate a provisional mask having the decomposition level of g1 by developing said shaped mask into a sub-band structure having the decomposition level of g1;
generate said mask having the decomposition level of g1 by partially merging said provisional mask and said non-reference type mask in a unit of sub-band; and
generate said mask having the decomposition level of g2 from said mask having the decomposition level of g1, which is generated by merging,
and wherein assuming that under a sub-band coordinate system defined for each of a quantized wavelet image provided by said quantized wavelet coefficient data, and said non-reference type mask, a quantized wavelet coefficient value and a mask value at the coordinates (i,j) in a sub-band of decomposition level k are QCk(i,j) and MVk(i,j), respectively, wherein i, j, and k are positive integers,
said non-reference type estimation rule includes a rule defining that when QCk(i,j) is 0, MVk(i,j) of said non-reference type mask is set as a non-ROI indication value indicating that the value is corresponding to said non-ROI, and when QCk(i,j) is not 0, MVk(i,j) of said non-reference type mask is set as an ROI indication value indicating that the value is corresponding to said ROI.

10. The image processing system according to claim 9, wherein
said circuitry is configured to generate said mask having the decomposition level of g1 by adopting said provisional mask for a low decomposition side sub-band of said mask and adopting said non-reference type mask for a high decomposition side sub-band of said mask.

11. The image processing system according to claim 9, wherein
said shaping process includes a morphology processing and an enlargement processing.

12. The image processing system according to claim 1, wherein
said circuitry is configured to
generate a basic mask having the decomposition level of g1 by determining whether each wavelet coefficient included in said quantized wavelet coefficient data is 0 or not when said non-ROI coefficient is set to 0 in said quantized wavelet coefficient data;
generate a shaped mask having the same mask size as that of said mask and the decomposition level of 0 by performing a shaping process, from a predetermined sub-band mask in said basic mask; and
generate said mask having the decomposition level of g1 and said mask having the decomposition level of g2 from said shaped mask.

13. The image processing system according to claim 12, wherein
said shaping process includes a morphology processing and an enlargement processing.

14. The image processing system according to claim 12, wherein said circuitry is configured to generate a non-reference type mask having the decomposition level of g1 as said basic mask, from said quantized wavelet coefficient data in accordance with a non-reference type estimation rule, and wherein assuming that under a sub-band coordinate system defined for each of a quantized wavelet image provided by said quantized wavelet coefficient data, and said non-reference type mask, a quantized wavelet coefficient value and a mask value at the coordinates (i,j) in a sub-band of decomposition level k are QCk(i,j) and MVk(i,j), respectively, wherein i, j, and k are positive integers, said non-reference type estimation rule includes a rule defining that when QCk(i,j) is 0, MVk(i,j) of said non-reference type mask is set as a non-ROI indication value indicating that the value is corresponding to said non-ROI, and when QCk(i,j) is not 0, MVk(i,j) of said non-reference type mask is set as an ROI indication value indicating that the value is corresponding to said ROI.

15. The image processing system according to claim 12, wherein said circuitry is configured to generate a reference type mask having the decomposition level of g1 as said basic mask, from said quantized wavelet coefficient data in accordance with a reference type estimation rule, and wherein assuming that under a sub-band coordinate system defined for each of a quantized wavelet image provided by said quantized wavelet coefficient data, and said reference type mask, a quantized wavelet coefficient value and a mask value at the coordinates (i,j) in a sub-band of decomposition level k are QCk(i,j) and MVk(i,j), respectively, wherein i, j, and k are positive integers, said reference type estimation rule includes:
  a first mask value setting rule defining that when a plurality of sub-bands of decomposition level k are present in said quantized wavelet image and at least one QCk(i,j) is not 0, all the values of MVk(i,j) of said reference type mask are set as an ROI indication value indicating that the value is corresponding to said ROI, and
  a second mask value setting rule defining that when a plurality of sub-bands of decomposition level k are present in said quantized wavelet image and all the values of QCk(i,j) are 0, all the values of MVk(i,j) of said reference type mask are set as a non-ROI indication value indicating that the value is corresponding to said non-ROI.

16. The image processing system according to claim 1, wherein when said mask having the decomposition level of g1 is supplied from the outside of said circuitry, said circuitry is configured to generate said mask having the decomposition level of g2 from the externally-acquired mask.

17. The image processing system according to claim 1, wherein when said mask having the decomposition level of 0 is supplied from the outside of said circuitry, said circuitry is configured to generate said mask having the decomposition level of g1 and said mask having the decomposition level of g2 from the externally-acquired mask.

18. The image processing system according to claim 1, wherein when said quantized wavelet coefficient data is in conformity with a Maxshift method, said circuitry is configured to generate said mask having the decomposition level of g1 from said quantized wavelet coefficient data in conformity with the Maxshift method and generate said mask having the decomposition level of g2 from said mask having the decomposition level of g1.

19. An image processing method comprising:
generating first wavelet coefficient data from quantized wavelet coefficient data for a first image having an ROI (Region Of Interest);
generating second wavelet coefficient data from data of a second image to be synthesized with said ROI in said first image;
preparing a mask to be used for determining whether each wavelet coefficient included in said first wavelet coefficient data is an ROI coefficient related to said ROI or a non-ROI coefficient related to a non-ROI;
generating synthesized coefficient data by determining said ROI coefficient and said non-ROI coefficient in said first wavelet coefficient data on the basis of said mask and synthesizing said ROI coefficient and a wavelet coefficient in said second wavelet coefficient data, which is corresponding to said non-ROI coefficient; and
generating synthetic image data by performing inverse wavelet transformation on said synthesized coefficient data until a decomposition level becomes a predetermined end level,
and wherein assuming that the decomposition level of said quantized wavelet coefficient data is g1, and the decomposition level of said first wavelet coefficient data, said second wavelet coefficient data, and said mask which are used in generating said synthesized coefficient data is g2,
said image processing method comprising:
when g2=g1,
  preparing said mask having the decomposition level of g1;
  generating said first wavelet coefficient data having the decomposition level of g1 by performing inverse quantization on said quantized wavelet coefficient data; and
  generating said synthetic image data by using said mask having the decomposition level of g1 and said first wavelet coefficient data having the decomposition level of g1, which is generated by inverse quantization;
when g2<g1,
  preparing said mask having the decomposition level of g2;
  generating said first wavelet coefficient data having the decomposition level of g1 by performing inverse quantization on said quantized wavelet coefficient data;
  decreasing the decomposition level of said first wavelet coefficient data by performing inverse wavelet transformation on said first wavelet coefficient data having the decomposition level of g1 until the decomposition level becomes g2; and
  generating said synthetic image data by using said mask having the decomposition level of g2 and said first wavelet coefficient data having the decomposition level of g2, which is generated by decreasing the decomposition level; and when g2>g1,
- preparing said mask having the decomposition level of g2 and said mask having the decomposition level of g1;
- generating said first wavelet coefficient data having the decomposition level of g1 by performing inverse quantization on said quantized wavelet coefficient data;
- adjusting said first wavelet coefficient data having the decomposition level of g1 by performing a coefficient adjustment process using an auxiliary wavelet coefficient data which is wavelet coefficient data for an auxiliary image which can be equated with said first image and has the decomposition level of g1, said coefficient adjustment process being a process of determining said ROI coefficient and said non-ROI coefficient in said first wavelet coefficient data having the decomposition level of g1 on the basis of said mask having the decomposition level of g1 and synthesizing said ROI coefficient and a wavelet coefficient in said auxiliary wavelet coefficient data, which is corresponding to said non-ROI coefficient;
- increasing the decomposition level of said first wavelet coefficient data by performing wavelet transformation on said first wavelet coefficient data adjusted by said coefficient adjustment process until the decomposition level becomes g2, and
- generating said synthetic image data by using said mask having the decomposition level of g2 and said first wavelet coefficient data having the decomposition level of g2, which is generated by increasing the decomposition level.

* * * * *